(12) United States Patent
Tilley

(10) Patent No.: US 8,499,696 B2
(45) Date of Patent: Aug. 6, 2013

(54) CABLE TRANSPORT SYSTEM

(75) Inventor: Martin C. Tilley, Sevierville, TN (US)

(73) Assignee: Zip Holdings LLC, Boise, ID (US)

( * ) Notice: Subject to any disclaimer, the term of this patent is extended or adjusted under 35 U.S.C. 154(b) by 220 days.

(21) Appl. No.: 12/994,009

(22) PCT Filed: May 26, 2009

(86) PCT No.: PCT/US2009/045192
§ 371 (c)(1),
(2), (4) Date: Nov. 22, 2010

(87) PCT Pub. No.: WO2009/143529
PCT Pub. Date: Nov. 26, 2009

(65) Prior Publication Data
US 2011/0083577 A1    Apr. 14, 2011

Related U.S. Application Data

(60) Provisional application No. 61/055,563, filed on May 23, 2008.

(51) Int. Cl.
*B61B 3/00* (2006.01)
(52) U.S. Cl.
USPC .......................................................... 104/87
(58) Field of Classification Search
USPC ................. 104/53, 87, 89, 90, 96, 112–117.1
See application file for complete search history.

(56) References Cited

U.S. PATENT DOCUMENTS

| | | | |
|---|---|---|---|
| 3,750,591 A | 8/1973 | Makinster et al. | |
| 5,113,768 A | 5/1992 | Brown | |
| 5,224,425 A | 7/1993 | Remington | |
| 5,901,651 A * | 5/1999 | Boyd | 104/112 |
| 6,427,601 B2 * | 8/2002 | Albrich | 104/87 |
| 6,666,773 B1 | 12/2003 | Richardson | |
| 2002/0007758 A1 | 1/2002 | Albrich | |
| 2002/0162477 A1 | 11/2002 | Palumbo | |
| 2006/0157298 A1 | 7/2006 | Beggrow et al. | |
| 2008/0011181 A1 | 1/2008 | Troy et al. | |

* cited by examiner

*Primary Examiner* — R. J. McCarry, Jr.
(74) *Attorney, Agent, or Firm* — Your Intellectual Property Matters, LLC; Robert A. Frohwerk

(57) ABSTRACT

A method and system of devices facilitate the uninterrupted transport of a payload of persons (110) or cargo along a multi-segmented guide cable (180), or zip line, suspended from a series of support structures (120). Transfer mechanisms (800, 810) allow the cable to loop to a starting location or to transport between discrete endpoints. A trolley (200) carrying the payload may be powered by gravity alone, or a motorized assist may allow the cable course to be traversed without regard to relative elevations of cable supports. Safety mechanisms (300) prevent the trolley from leaving the cable (180) unintentionally. The system enables one or more riders (110) to travel along the guide cable (180) at velocities desired for recreational purposes while assuming many body positions, such as prone, sitting or standing, to provide the sensation of flying like a bird.

28 Claims, 57 Drawing Sheets

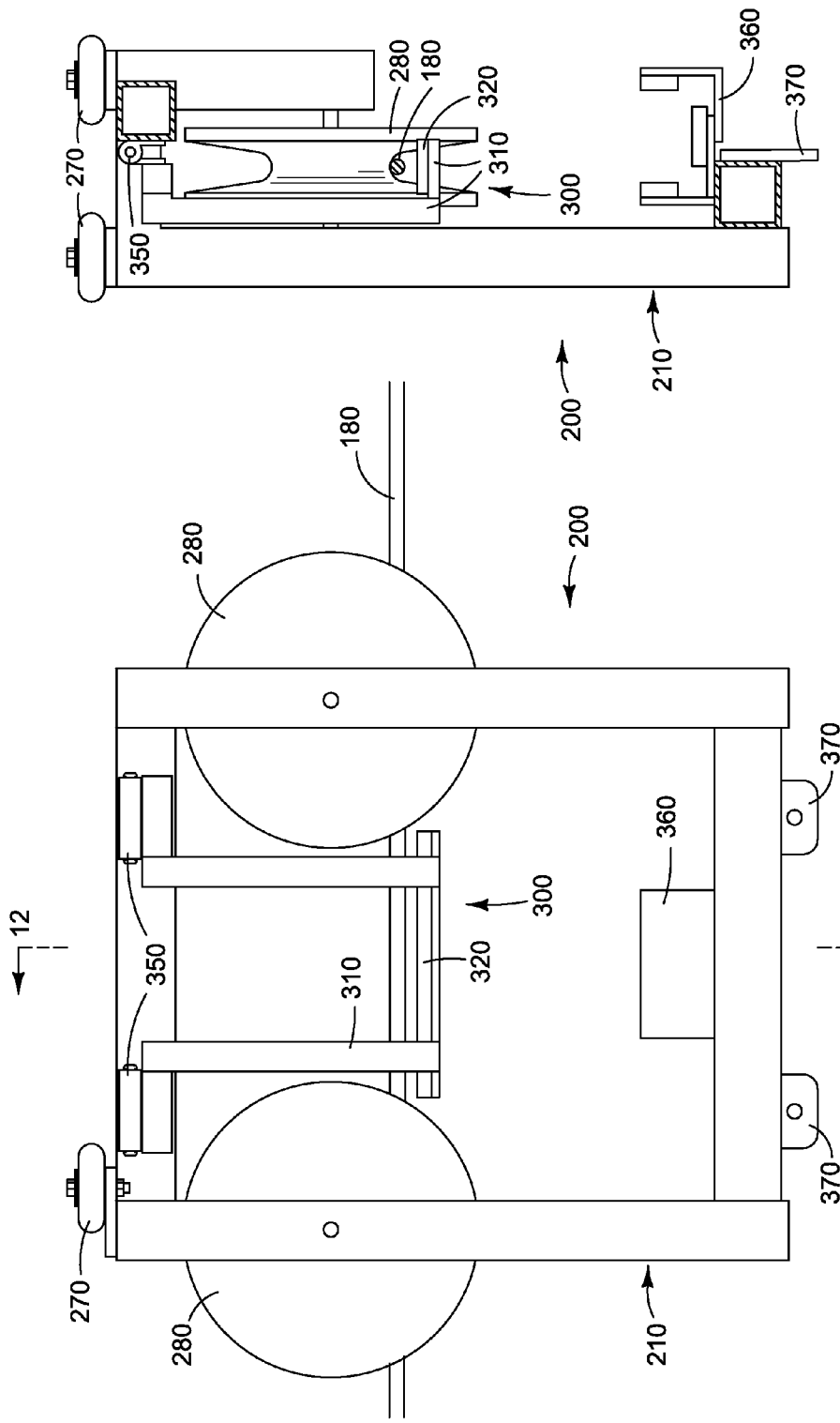

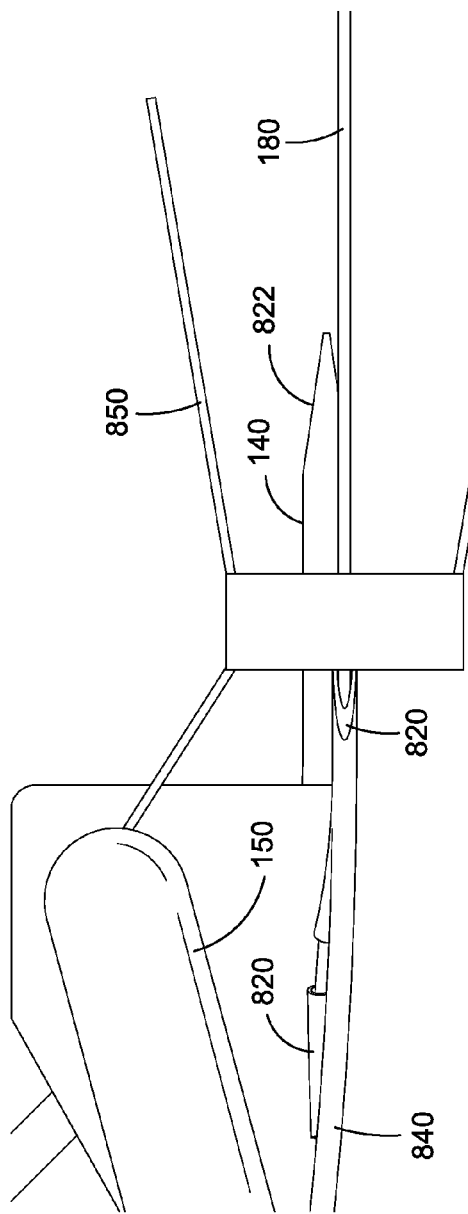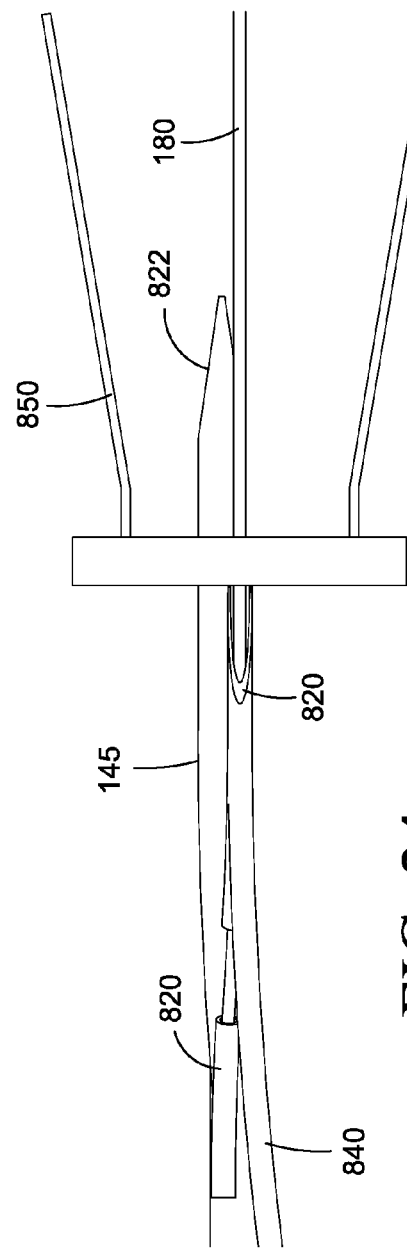

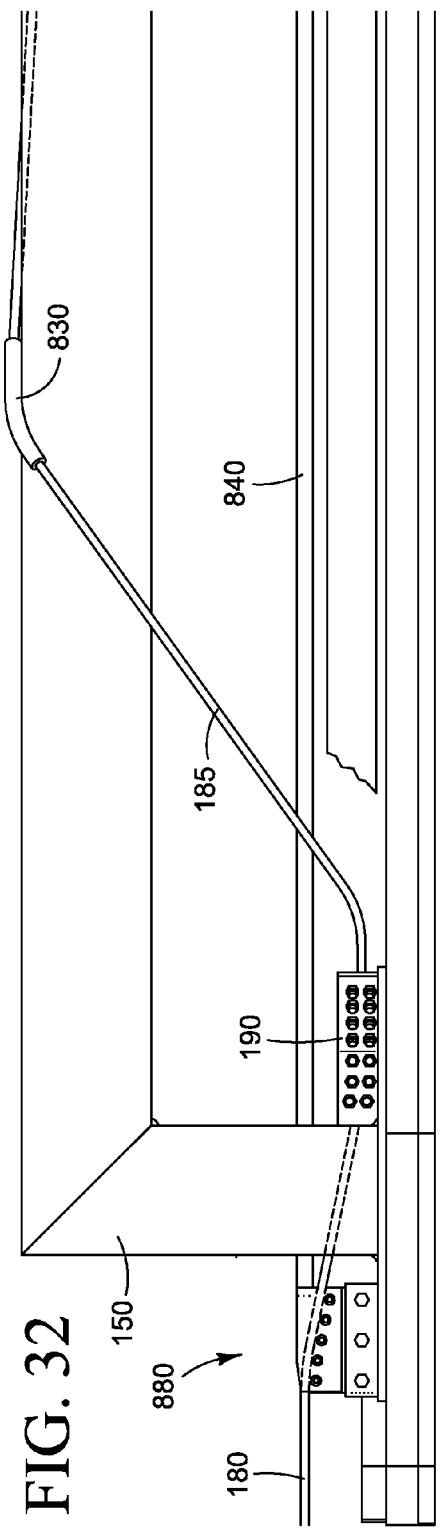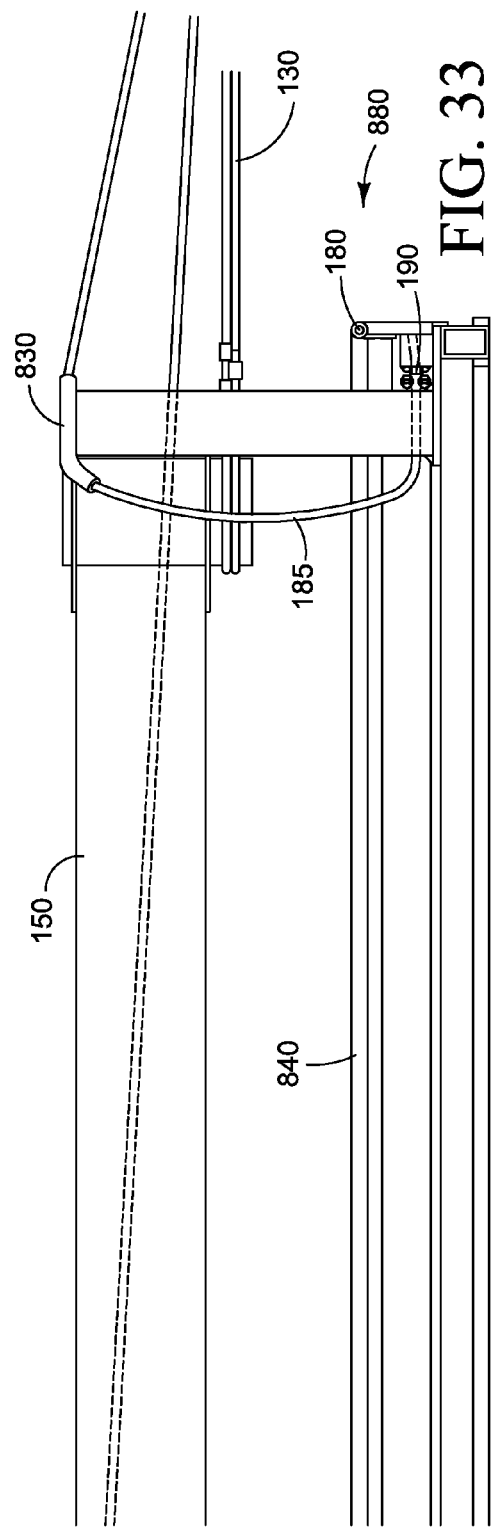

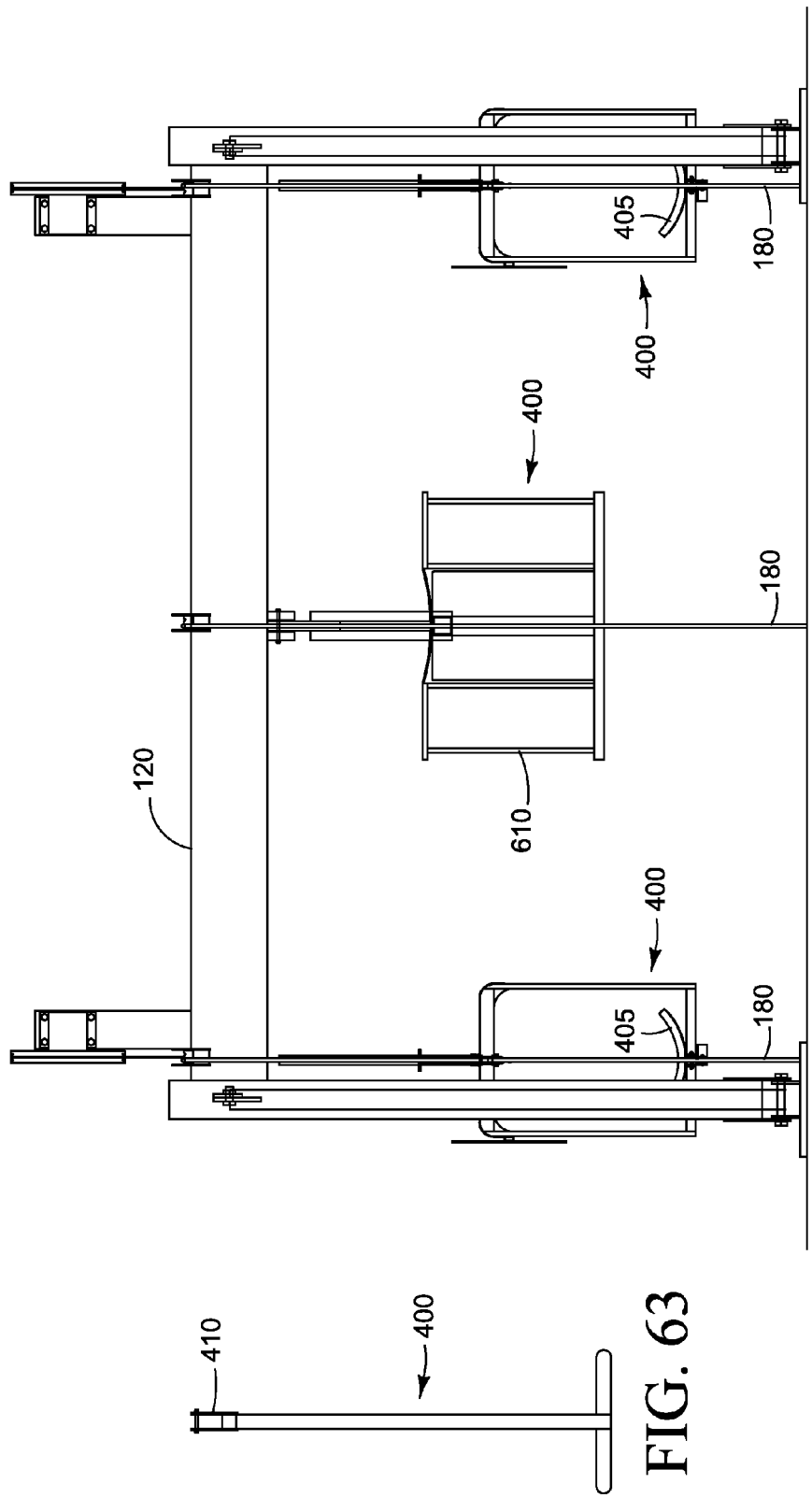

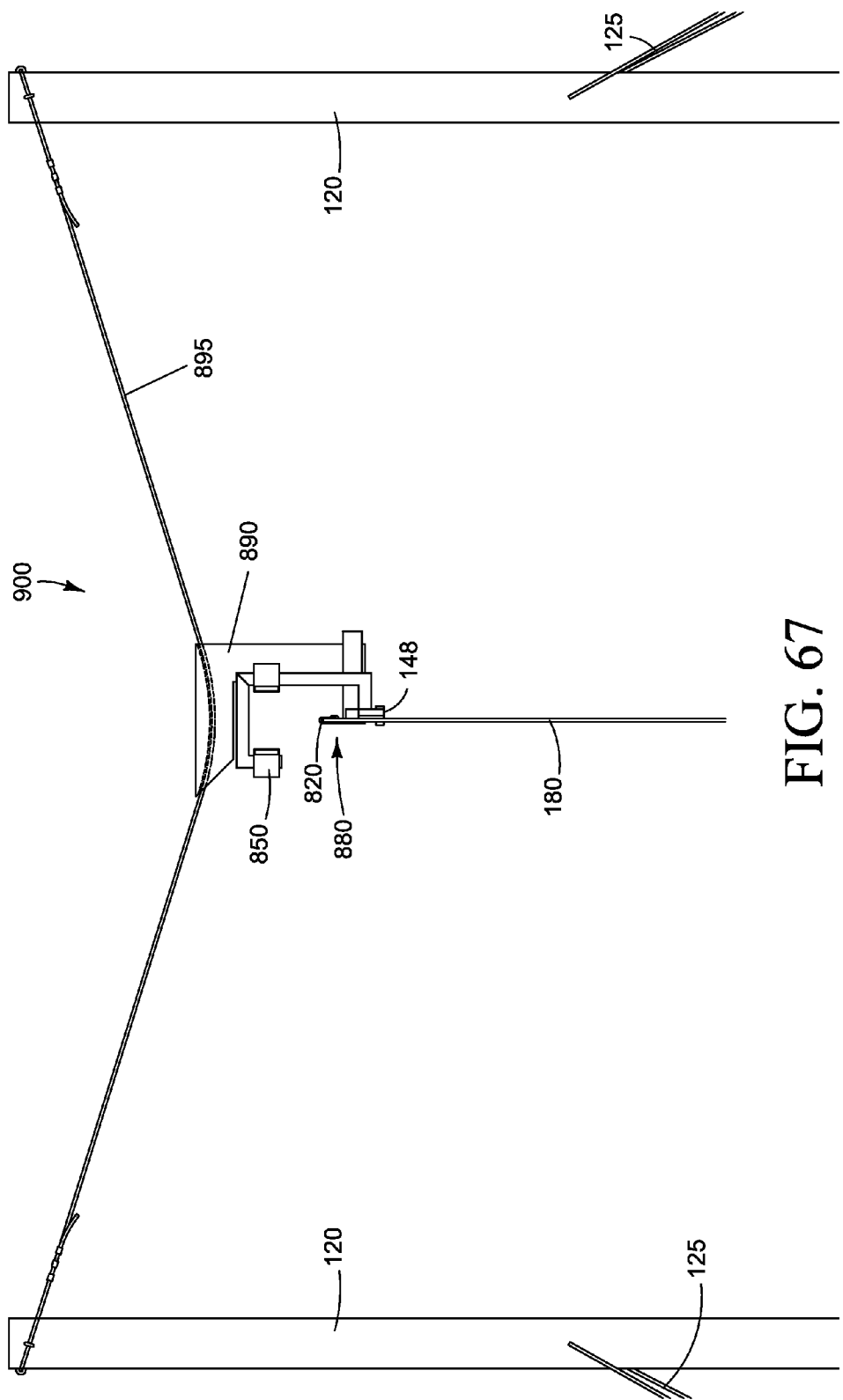

CABLE TRANSPORT SYSTEM

TECHNICAL FIELD

The present invention relates generally to transport systems using a suspended cable. More specifically, the present invention relates to a specialized trolley system operating on a multi-segmented cable in which the trolley may be motorized or gravity-powered. When such a trolley system is gravity-powered, it is commonly known as a zip-line and often used for amusement or recreation.

BACKGROUND ART

In its simplest form a zip-line consists of a pulley that rides upon a suspended cable. The cable is generally stretched between a pair of vertical mounts serving as cable supports. Preferred supports include large trees, which may be selected from those growing on a slope, and towers, which may be erected upon a hillside or in a field. Generally one mounting point will be selected to be higher than the other by a suitable differential of elevation. Since the cable determines the trajectory of the pulley, it may be referred to as a guide cable.

For most applications the simple pulley is replaced by a trolley that rests upon the cable and is fitted to carry a payload as it moves freely along the length of the guide cable. When adapted for amusement purposes, a simple zip-line enables a user propelled by gravity to traverse from one end of the guide cable to the other, generally from the upper end to the lower end along an incline, by holding on or attaching to the freely moving trolley. The cable is usually made of high tensile steel, as would be used for a tram, with the cable thickness being sized according to the length of the run and size of the load. While some zip-lines are used in the logging industry, there is a growing interest in zip-lines for amusement or entertainment purposes, especially as a means to access unusual areas, such as a rainforest canopy, or in outdoor adventure camps.

In its extended form the presently described system relates to overhead trolleys, especially zip-lines and other cable-supported tram-like systems. A typical recreational setting, such as a park, will often use multiple cables to carry passengers down, or up, a slope with each cable being generally straight, having no mid-line turns. When the direction of a zip-line within a course is to be altered, the riders must disembark at the end of one cable segment and re-embark at the start of another, with alternate transportation, such as foot traffic or motorized cart between those two endpoints. Such discrete segmented operation is required by conventional cable systems because of the problems associated with guide cable supports or terminations interfering with the unobstructed movement of a trolley as it passes from one segment to the next.

SUMMARY OF INVENTION

The disclosed system enhances the common cable transport system, or zip-line, by replacement of the passive pulley with a powered carriage. To a limited extent, this has been done by others. The carriage described here, however, extends the capability of a conventional powered carriage with the addition of computerized control to the drive motor. Enhancements presented in the disclosed system include the following.

1. A computerized motor serves as part of a regenerative braking system.

2. The carriage supports the user on a variety of platforms in any of several positions, including seated, standing, or lying face up, or the most often preferred face-down prone position.

3. Partial rotation of the platform is under control of the user by means of aerodynamic enhancements to enable the sensation of flying like a bird.

4. A rudder may be added to stabilize or control rotation of the platform, even to the extent of producing a 180-degree reversal of direction.

5. Energy used by an electric drive motor to overcome friction is drawn from a power pack or other source. Regenerative braking can be utilized to minimize the loss of energy.

6. Computerized control of the carriage and its supported platform provides control of speed, distance, deceleration, stopping, and docking, including reversal of the carriage by a 180-degree rotation as it approaches the terminal at the far end of the cable in preparation for the user's head-first return trip.

7. The platform may also be controlled to provide for takeoff and/or landing in a horizontal or in an upright position.

Additional features of the presently described system allow a zip-line course to be multi-vectored by using multiple concatenated segments with each segment being firmly anchored at both of its ends. The equivalent of a single long zip-line is then created by terminating the end of one segment at or near the same anchored support point as the beginning of the next. When the segments are concatenated in this manner by use of the invented trolley transfer mechanism, there is no need for a rider to leave the cable. This allows an entire course to be run non-stop while removal of a number of intermediate setup operations between cable segments considerably reduces the risk of operator error.

When entering the trolley transfer mechanism, the trolley effectively rides off of the cable onto the equivalent of a rail which runs throughout the transfer, and then the trolley transitions back onto the next cable section. Transfer mechanisms may lie in a vertical or horizontal plane or in both. They may be an integral part of the guide cable support towers, on rigid mounts, or float on the guide cables themselves near the guide cable termination zones. Additionally, the transfer mechanisms may be suspended from one or more support cables stretched between support towers.

Expansion of a single-segment system into a multi-vectored one requires that a means of trolley alignment be added to the essential components. Trolley alignment guides keep the trolley properly oriented as it encounters the transfer device. The transfer mechanism is designed to perform five essential tasks:

1. The transfer mechanism provides a smooth transition for the trolley as it disengages from one guide cable and engages another, without regard to the change in vectors from one cable to the next.

2. The disengagement of the trolley's lock-on safety device is facilitated by the transfer device.

3. The transfer mechanism takes over the function of the safety device while it is disengaged.

4. Emergency stopping devices as well as passive or active speed control devices are incorporated into the transfer device when deemed necessary.

5. Alignment guides are incorporated into the transfer mechanism to interface with the alignment guides on the trolley so that the trolley is gently forced into the proper attitude to safely encounter the remainder of the transfer device.

With a segmented cable system, replacement of a worn or damaged cable may be done piecemeal as needed for each section of cable. The described transfer mechanisms are secured to the guide cable by means of cable deflection plates or tubes, as well as by a series of clamping devices. The clamping devices can be loosened to allow the transfer mechanism to be shifted with respect to the guide cables. This allows for inspection of the guide cables in the areas that are hidden from view during normal operation by the deflection plates or tubes and by the clamping devices themselves.

The primary trolley enables high-performance rides to amusement seekers. Extensions of the basic design of the primary trolley allow a pair of amusement seekers to ride either side-by-side or fore/aft in-line with very little limitation to their independent freedom of motion. Beyond the primary trolley, other specialized trolleys serve as maintenance and rescue vehicles along the transport cable and as safety catches at the endpoints.

Other additions to the described system provide for multiple parallel cables with associated advantages. A second transport cable may be installed parallel to a first high-performance zip-line to provide a means of rescue or to deliver maintenance services. Furthermore, in a three cable installation a rescue/maintenance transport cable may be located between and parallel to two high-performance zip-lines to provide services to either side.

Additional aspects and advantages of this invention will be apparent from the following detailed description of preferred embodiments, which proceeds with reference to the accompanying drawings.

BRIEF DESCRIPTION OF DRAWINGS

The particular features and advantages of the invention briefly described above as well as other objects will become apparent from the following description taken in conjunction with the accompanying drawings, in which:

FIG. 11 shows a side view of a top-mounted derailment safeguard mechanism.

FIG. 12 is a sectioned end view of a top-mounted derailment safeguard mechanism taken from FIG. 11.

FIG. 23 shows in plan view the details of the guide cable routed through a transfer mechanism for an inside turn.

FIG. 24 shows in plan view the details of the guide cable routed through a transfer mechanism for an outside turn.

FIG. 32 is a detailed elevation view of the entry into the transition region of a transfer mechanism for an inside turn.

FIG. 33 is a detailed end view of the exit from the transition region of a transfer mechanism for an inside.

FIG. 63 is an end view of the platform shown in FIG. 62.

FIG. 64 shows an end view of an arrangement of three parallel zip-lines with a maintenance trolley on the center zip-line flanked by two cable-driven bidirectional trolleys.

FIG. 67 shows an end view of a vertical transfer mechanism supported by a cable stretched between two support towers.

Figure 1:
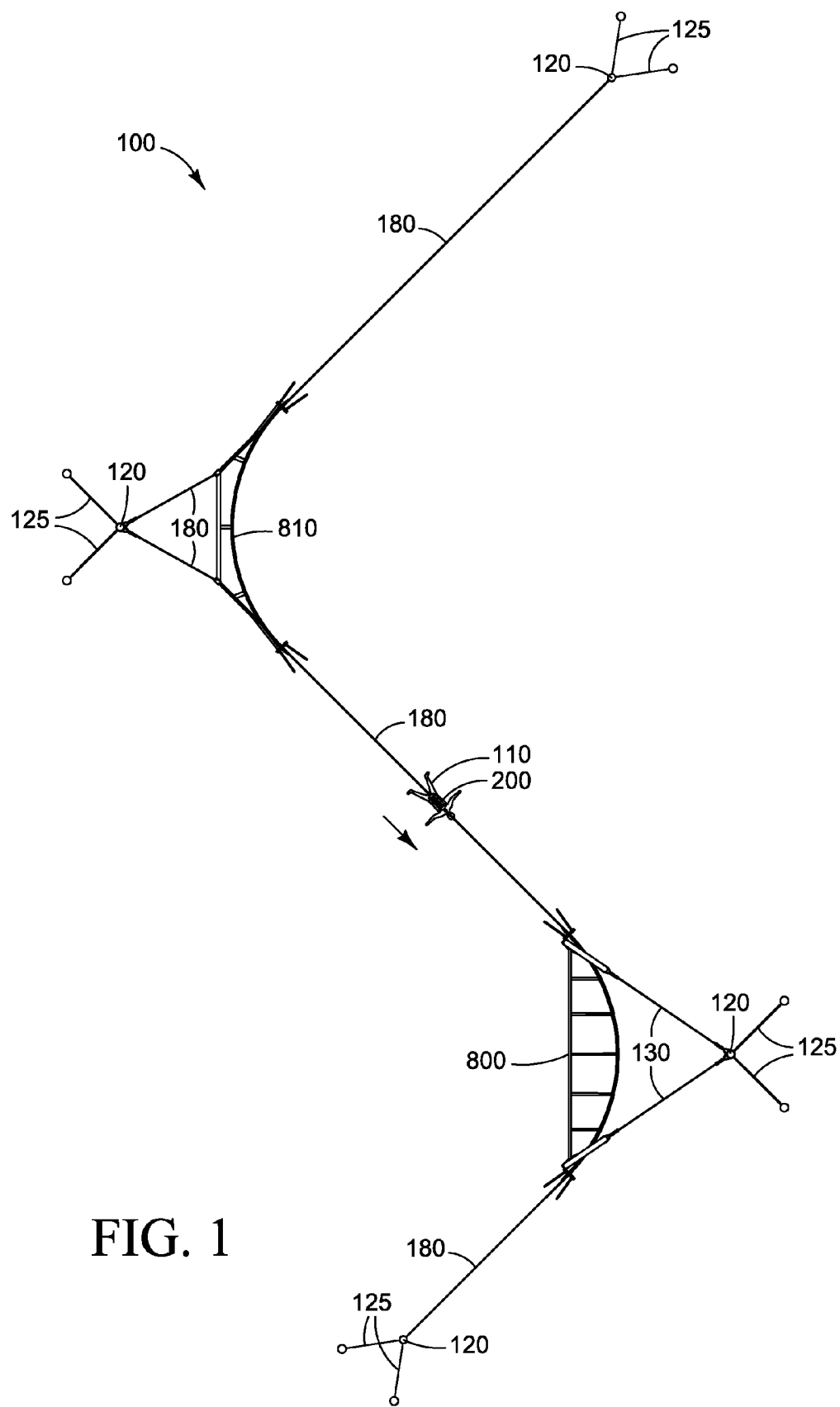
FIG. 1 is a simplified plan view of a system showing a rider on a three-segment zip-line.

The following Reference Numbers may be used in conjunction with one or more of the accompanying FIGS. 1-67 of the drawings.

100 Cable Transport (Zip-line) System
110 Rider, User
120 Support Tower
125 Guy Wire (Tower Support Cable)
126 Anchor, Tower
128 Brace, Tower
130 Support Cable
135 Support cable ring clamp
140 Framework assembly, right (inside)
145 Framework assembly, left (outside)
148 Curved Frame member
150 Bridge, Force Transfer, inside curve
170 Drive Cable
175 Bullwheel
180 Guide Cable
185 Cable segment, safety
190 Clamp, binding, strain relief
200 Trolley Assembly, generic
202 Trolley, Entering
205 Trolley, Exiting
210 Frame, Trolley
212 Wheel mount, upper frame Member
215 Spine, Vertical Support Member of Structural framework
230 Lower frame member
260 Travel Limiting Stop for Derailment safeguard mechanism
270 Alignment guide rollers, or pads
280 Wheel, deep-grooved
285 Bearing, wheel
290 Spindle
300 Derailment safeguard mechanism
310 Frame, Derailment safeguard mechanism
320 Wear Surface, protective pad, for Derailment safeguard mechanism
340 Disengagement deflection roller or pad
350 Hinge, Derailment safeguard mechanism
360 Trolley Alignment Guide, primary, roller or pad
370 Payload Anchor Flange
400 Payload support structure
405 Platform, flying seat
410 platform support joint
430 Vertical support member, hollow core
435 Hose, rubber, steel reinforced
440 Shock absorber
445 Collar, mounting, shock absorber
455 Bolt, horizontal axis friction adjustment, for fore-aft swing
460 Friction pads for damping of fore-aft motion
465 Bearing, thrust, vertical axis, 360-degree low-friction rotation
475 Ball, cable stop
480 Safety cable, pass-through, system failure
490 Loop, passenger safety lanyard attachment
510 Rudder assembly
550 Adjuster, seat position
560 Leg rest or backrest, adjustable position
570 Pivot pin, seat back
600 Trolley, maintenance or powered
610 Gondola
620 Frame member
625 Gondola support, rigid
630 Engine or Power Source compartment
640 Drive motor, hydraulic or electric
645 Hydraulic or electric drive motor supply
650 Drive wheel
660 Brace, top
670 Tension wheel, adjustable
675 Bracket, tension wheel support
680 Guard, derailment prevention, nylon
700 Catch Trolley
720 Guide wheels
730 Hook assembly, spring-loaded
735 Latch hold mechanism
740 Cushion block
750 Loop, release pull
770 Bumper, rubber
780 Damping cord, bungee to soften rebound
800 Transfer Device, inside (right)
810 Transfer Device, outside (left)
811 Cable deflector assembly
812 Cable deflection plate, lower
813 Groove in lower cable deflection plate
814 Cable deflection plate, upper
815 Groove in upper cable deflection plate
816 Support plate
817 Cable passage in track 818 Support member
819 Guide cable ring clamp
820 Cable deflection tube
821 Nose piece
822 Guide Track Bevel on nose piece
825 Cable support clamp
830 Cable Guide
840 Guide Track
845 Guide Track Support
850 Alignment Guide, initializing funnel
860 Cable deflection plate
862 Groove, cable guide
864 Plate, guide cable cover with fasteners
880 Transition Zone
890 Transition Track Hanger
895 Suspension cable, Transition Track Hanger
900 Transfer Device, angle of elevation (vertical)

BEST MODE FOR CARRYING OUT THE INVENTION

Figure 2:
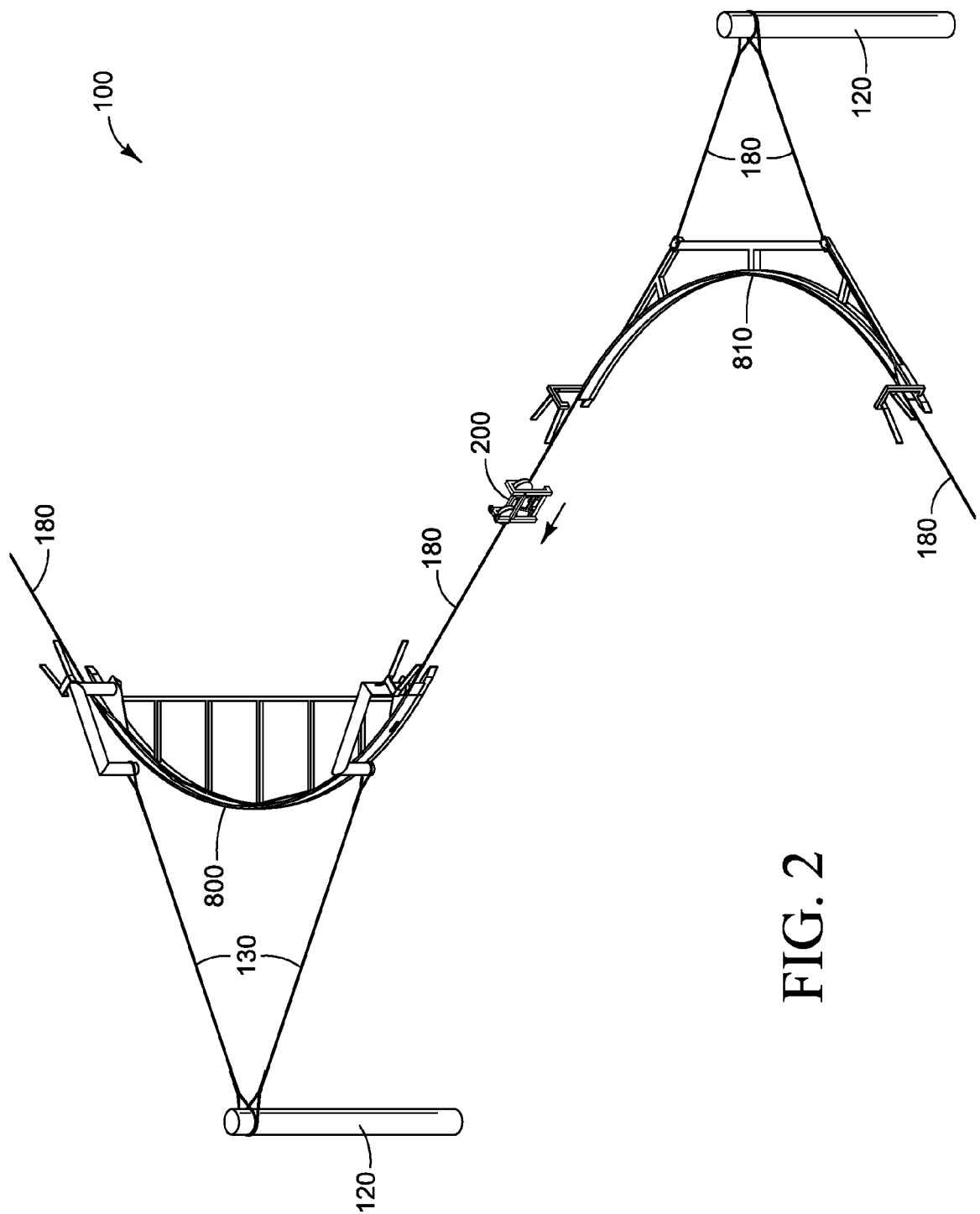
FIG. 2 is a perspective view of a three-segment zip-line.
Figure 3:
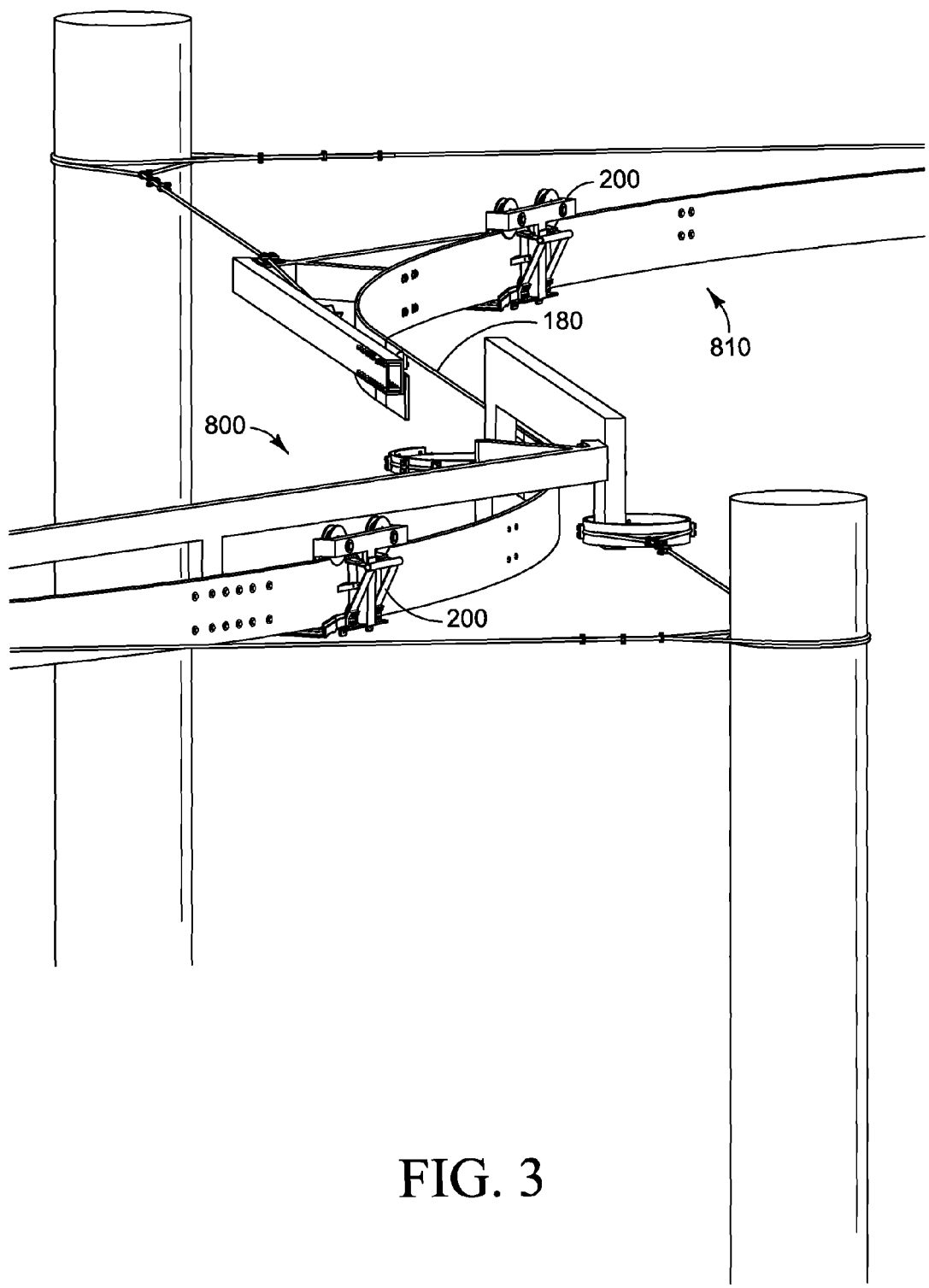
FIG. 3 is a foreshortened perspective view of a three-segment transport system showing one trolley on a transfer mechanism for an outside turn (upper) and another trolley negotiating an inside turn (lower).

The presently disclosed system, as depicted in FIGS. 1-3, builds upon the basic elements of a simple zip-line system 100, namely, guide cables 180 suspended from cable support towers 120 which are stabilized by guy wires 125. A user 110 is carried by a cable-borne trolley (200) for a ride on the system. Additional mechanisms are provided for trolley detachment and transfer. A complete system requires one or more guide cables 180, a plurality of cable support towers 120, one or more transfer devices (800, 810 or 900), and one or more specialized trolleys 200. It is the design of the trolley and transfer devices, and their interactions to each other that distinguishes the presently disclosed system from previous zip-line systems. The resulting system is capable of transporting persons or goods safely along a series of multi-vectored guide cables, without stopping and without operator assistance or intervention.

A segment of cable stretched between a pair of support towers will naturally follow a catenary curve, the sag that is noted when viewed from the side, in a vertical plane that contains the support points. Since such a segment of cable stretched between a pair of support towers necessarily follows a straight line when viewed from above, in a projection onto a horizontal plane, such portion of a zip-line system will be considered as a single vector. A multi-vectored system comprises multiple segments of cable supported by multiple towers. A change in direction, either horizontal or vertical, from one segment to the next, is facilitated by a transfer device 800 (or 810 or 900) mounted on or near an intermediate support tower 120. For illustration, the views shown here depict a cable forming a 90-degree arc as it swings around a support post. It should be noted that any arc or even a straight line may be used in the transfer.

Figure 4:
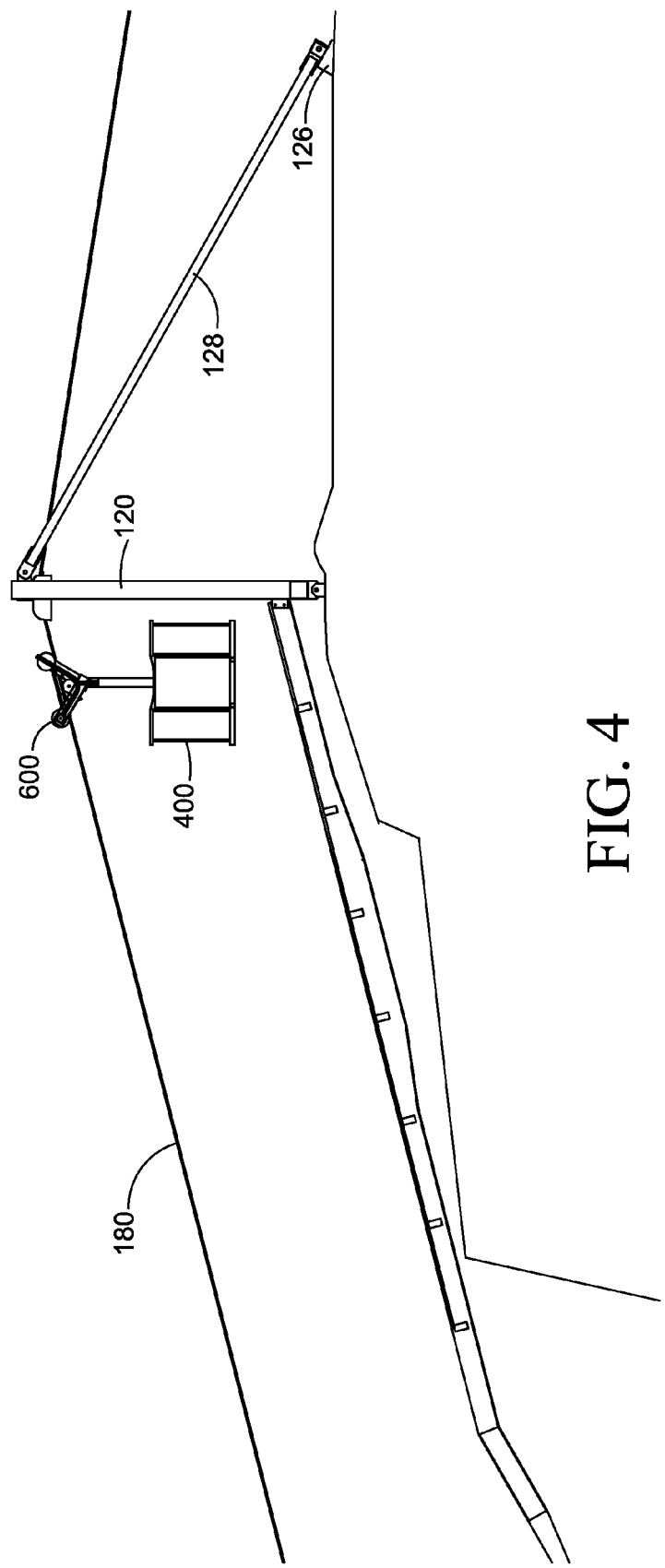
FIG. 4 depicts an elevation view of a powered trolley on a single-segment zip-line supported by a tower.
Figure 5:
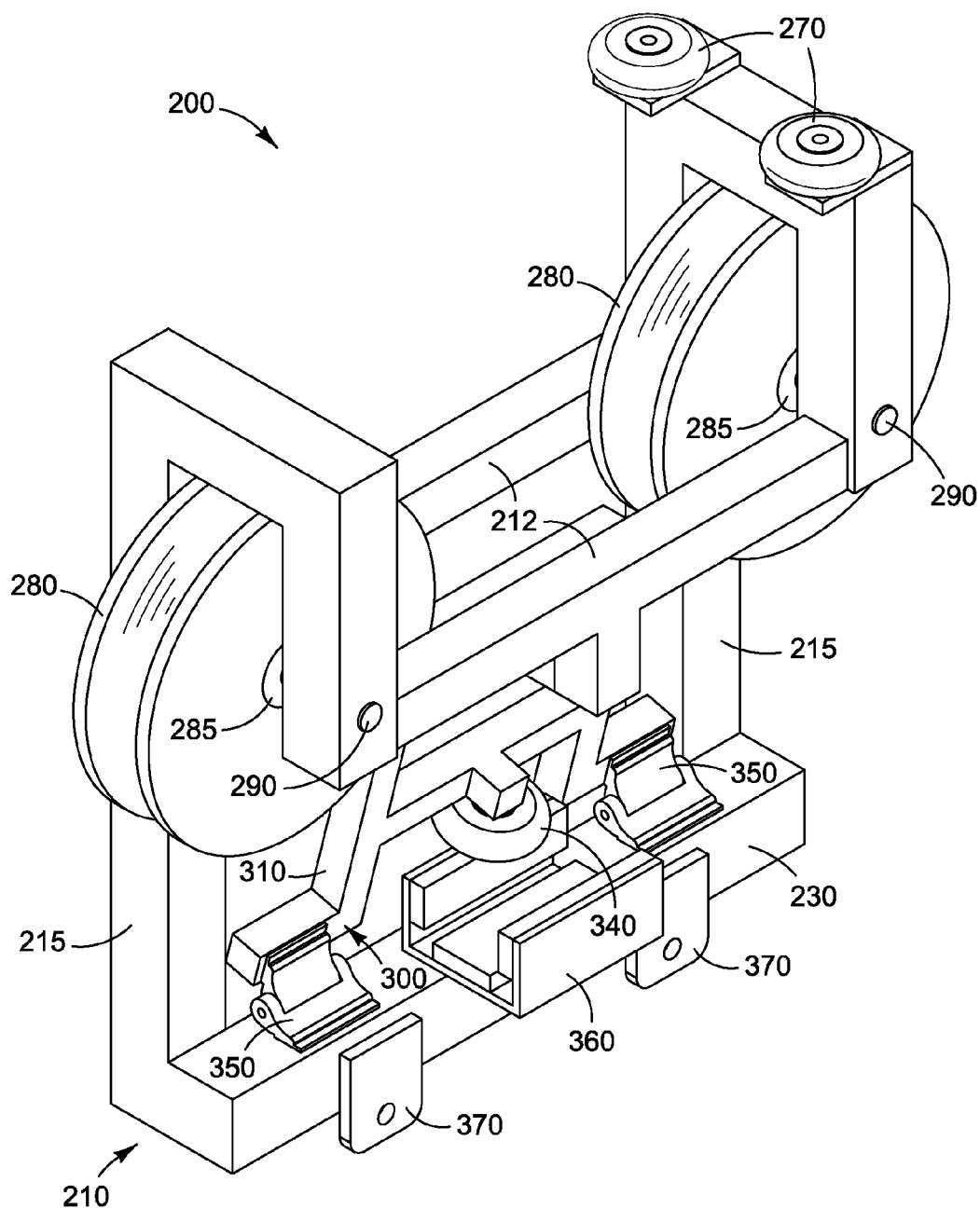
FIG. 5 shows a perspective view of the open side of a trolley.

The guide cable support towers 120 may be simple structures stabilized by guy wire 125 that support the ends of one or more guide cables 180. Those skilled in the art will recognize various means of stabilizing the guide cable support towers 120, such as (FIG. 4) by anchored braces 128 and deadmen 126. In some embodiments the guide cable support towers 120 may also be an integral part of a transfer device (800, 810, 900). Loading and unloading platforms, or a variety of man-made or natural structures, may be substituted for the support towers.

The presently disclosed system will be described first in terms of the mechanical components of the system. The major components are: a guide cable 180 with its support rigging, a trolley 200 capable of supporting some form of payload 400, and a transfer device (800, 810, 900).

Guide Cable and Support Rigging

For purposes of the present disclosure the cable and its support rigging, for the most part, follow standard practices within the tram industry. A typical guide cable has a diameter of ⅜"-½". Other cable thicknesses may be used as appropriate to the overall cable length, the length of unsupported spans and anticipated loads. The presently described system may be used with a variety of support towers or other mounting structures, including suitable trees and rocks, as long as provision is made for adequate clearance and control of load-bearing attributes. Guide cable support towers 120 will typically be secured by guy wires 125 using commonly known techniques to maintain stability of the towers. A guide cable 180 may be secured between a pair of support towers 120 using any of several techniques. The method of securement may vary for each end of a guide cable 180 depending upon whether it is to be terminated, as at the end of a single segment zip-line, or if the mount point is intermediate within a multi-segment zip-line system. The simpler terminations will not be described here as they utilize common industry practice. The more complex securements relate to various transfer mechanisms, and specialized trolleys, that will be detailed in the corresponding following sections.

Trolley with Payload

In its simplest form, a trolley may be nothing more than a pulley with a bearing mounted to a rod as a spindle. For purposes of home-based, backyard recreation, a user could place the groove of the pulley onto a rope that is stretched taut between support points, support himself by holding on to the rod, and then rolling along the rope. However, the high speed and high performance of the presently described zip-line system requires a much more sophisticated trolley.

The trolley that is to bear upon the guide cable of the presently described system comprises at least three essential components, namely, a frame, one or more wheels, and safety locks. One embodiment of a trolley for use with the present invention is shown in the various views of FIGS. 5-8.

The frame structure 210 supports the payload and properly orients and supports the other trolley components. At least one wheel 280 having a deep groove in its circumference serves the rolling function of the pulley in the simplest zip-line format as it rides upon a guide cable 180. The deep groove in the trolley pulley is given a special angle and notch width to accommodate smooth travel throughout transition zones that will be described later. The wheel 280 turns freely on a bearing 285 that is mounted on a spindle 290. In one embodiment, the wheel 280 is formed of a flexible material which is appropriately rigid and resistant to wear, but is sufficiently compliant to minimize slippage as it travels along the guide cable 180. The wheel 280 must be sufficiently wide and deeply grooved so as to resist derailment from the cable.

For added stability, two wheels 280 are used in the trolley 200 as shown. The wheels 280 are mounted into a frame 210 constructed from wheel mount frame members 212 and a spine of vertical support members 215 which are preferably welded together. Alternate methods of constructing the frame will be recognized by those skilled in the art, including assembly by bolting support members to one another, or construction as a molded component. As seen from the end in FIG. 5 (and later in the end view of FIG. 9), the frame has an inverted U-shape in which one vertical member, shown here as the right side, has been foreshortened to provide clearance for installation of the trolley onto, or removal from, the guide cable 180. Attached to the lower frame member 230 is a pair of Payload Anchor Flanges 370. This completes the basic structure of the trolley 200.

Figure 6:
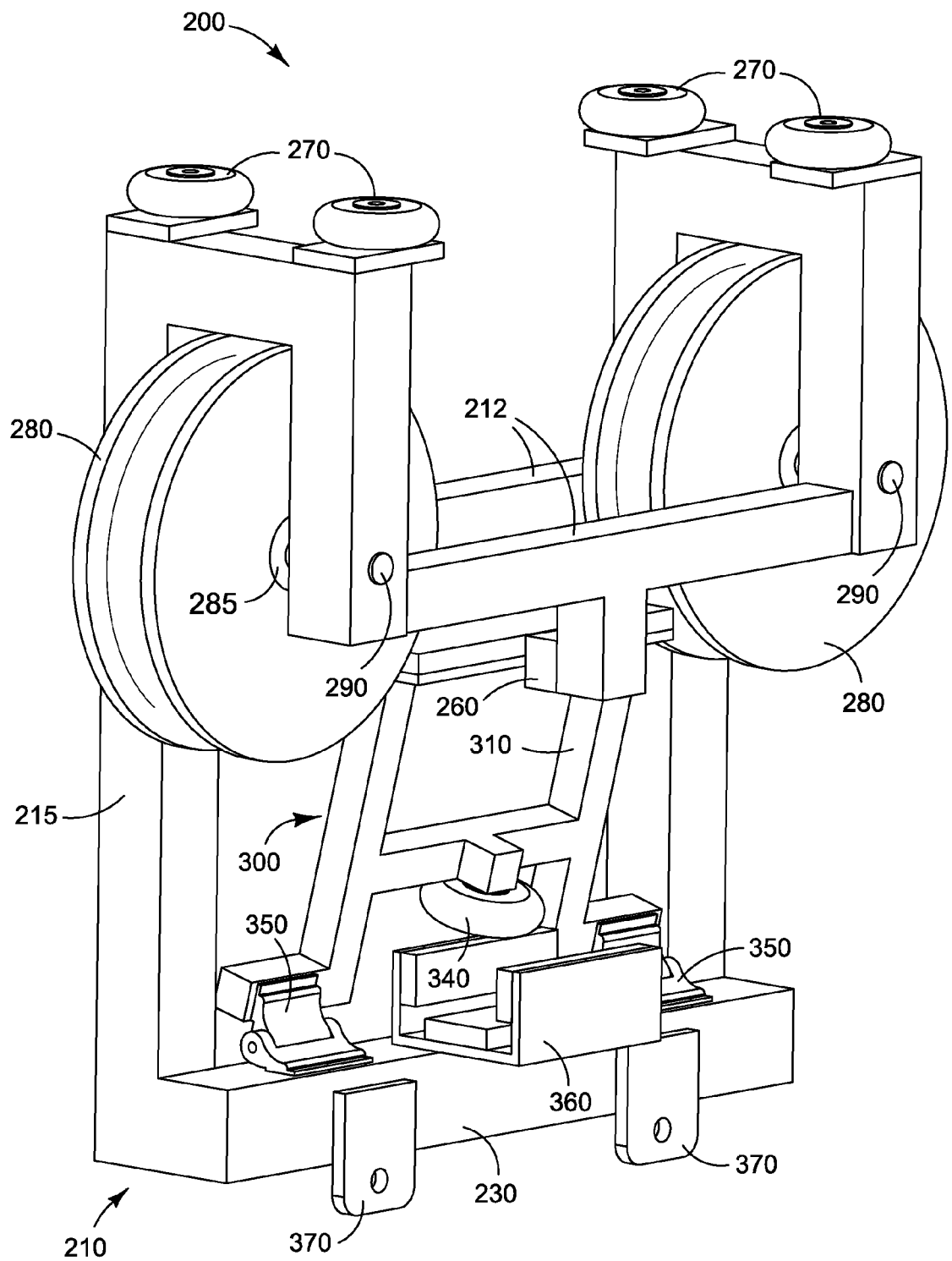
FIG. 6 is a perspective view of the open side of an alternate embodiment of a bidirectional trolley.
Figure 7:
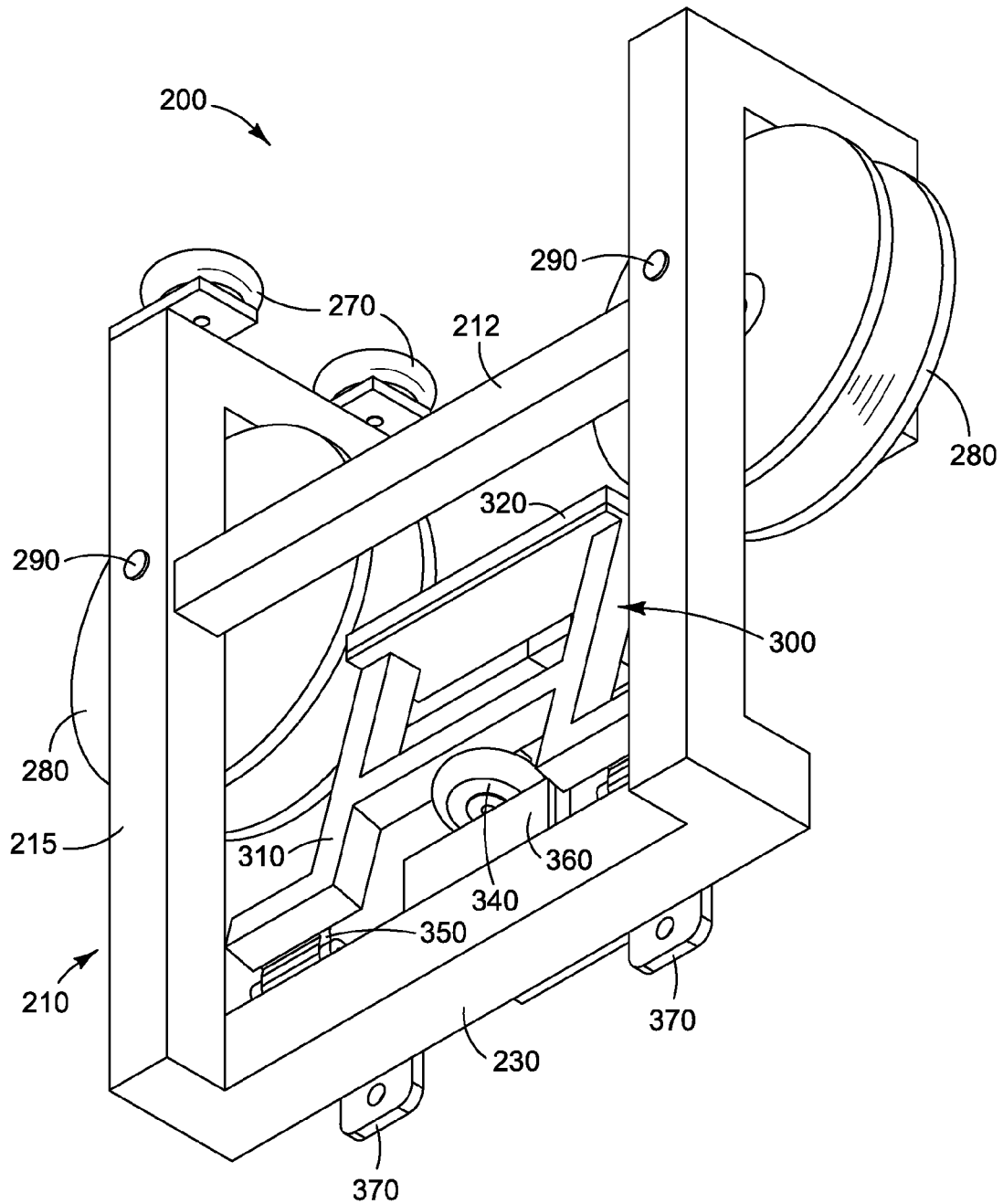
FIG. 7 shows a perspective view of the closed side of a trolley.
Figure 8:
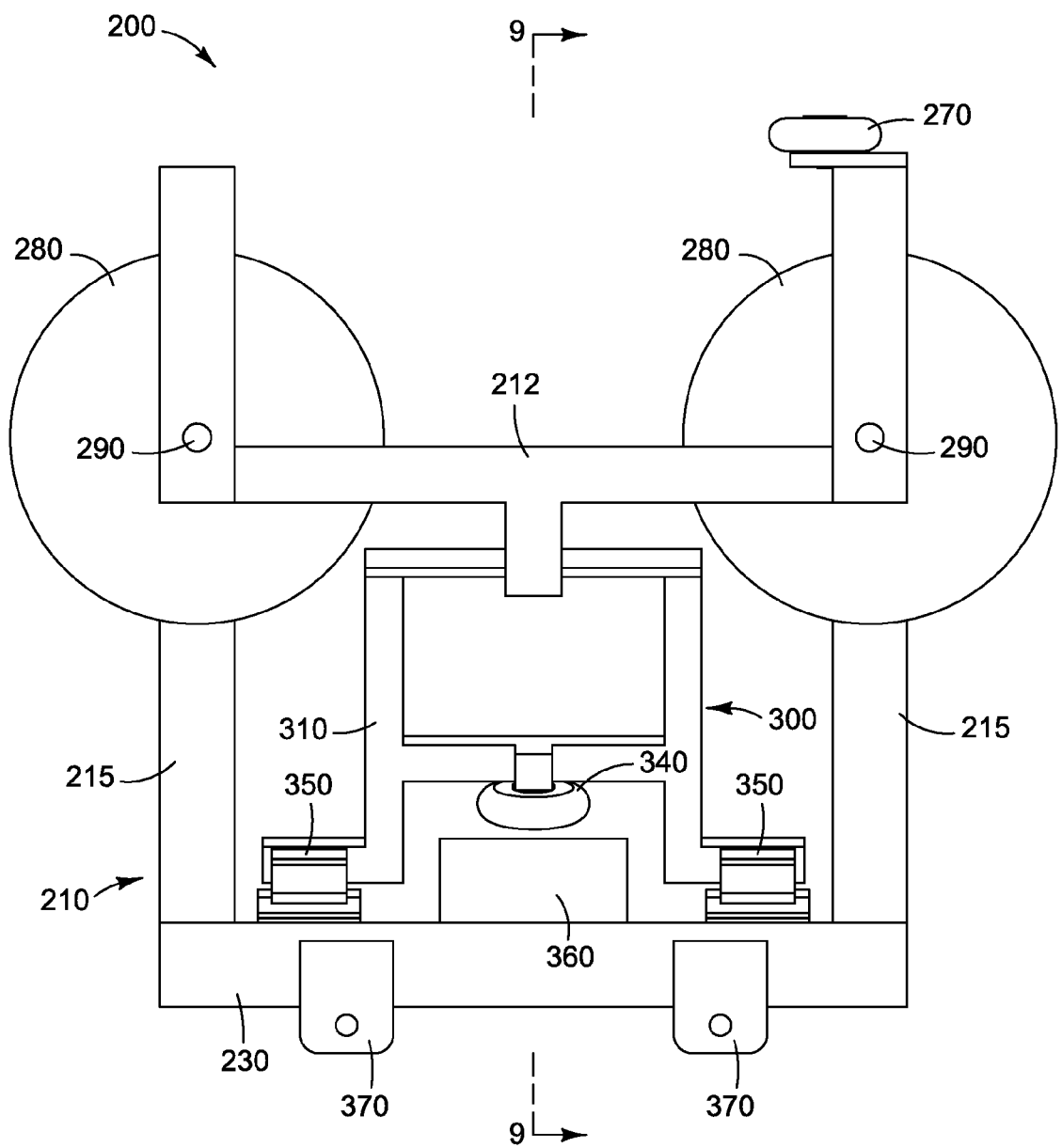
FIG. 8 is a side view of a trolley from the open side.

Other features of the trolley will be covered in detail as the subsystems are developed below. It is noted here, however, that a pair of alignment guide rollers 270 are mounted at the top of the frame 210 of a typical trolley. One alternative embodiment 201, shown in FIG. 6, is specifically designed for bidirectional travel and has two pairs of alignment guide rollers 270.

A lock-on safety device, in the form of Derailment Safeguard Mechanism 300, is added to the trolley 200 to prevent accidental derailment from the guide cable 180. A derailment prevention assembly may be as simple as a boomerang-shaped arm acting as a safety catch. It is positioned to prevent the trolley 200 from bouncing off of the cable over open space. As the trolley enters a transition zone 880, this safety catch is forcibly rotated to clear the supports at the underside of the guide. Upon exit from the transition zone 880 the safety catch is again forcibly rotated back into position below the new section of cable.

In another embodiment, an alternate mechanism is mounted to the lower horizontal support member 230, as shown here, or to the upper member 212, which is shown in FIGS. 11 and 12. It is located between the wheels 280 and in such a location that it will be beneath the guide cable (180). This works in conjunction with the deeply grooved wheels 280 to prevent derailment from the cable (180) in the unlikely event that the trolley 200 is subjected to negative g-forces.

The derailment safeguard mechanism 300 comprises a frame 310 mounted on a set of hinges 350. The hinges may be of the pin-type or may be made of a flexible resilient material. They also may be spring-loaded. A Travel Limiting Stop 260 is attached to the frame 210. A wear surface 320 is affixed to the face of the frame 310 that is nearest the guide cable (180).

Figure 9:
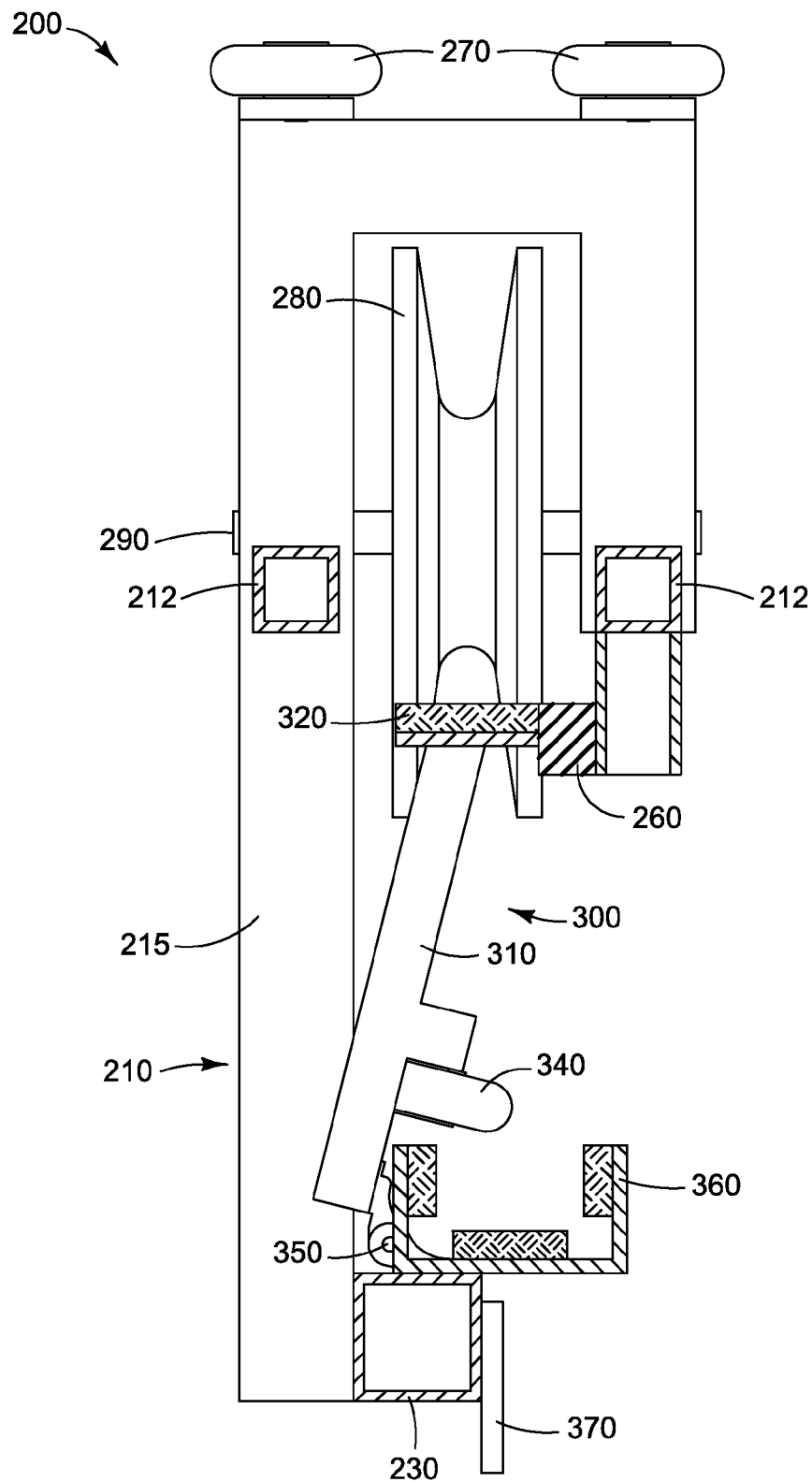
FIG. 9 is a sectioned end view of the trolley of FIG. 8 showing a derailment safeguard device in its closed and locked position.

As shown in FIG. 9 the derailment safeguard mechanism 300 has pivoted in response to the resilience of hinge 350 so that its frame 310 is holding the protective wear surface 320 in close proximity to the underside of the guide cable 180 to prevent derailment. The resilience of the hinge 350 may be derived either by being spring-loaded or by being constructed of a flexible belt material. The hinges 350 of the derailment safeguard mechanism 300 are located such that their axis of rotation is slightly off center relative to the grooved wheels 280 so that downward forces caused by an encounter with the guide cable 180 invoke a bias toward the closed, protected position.

Figure 10:
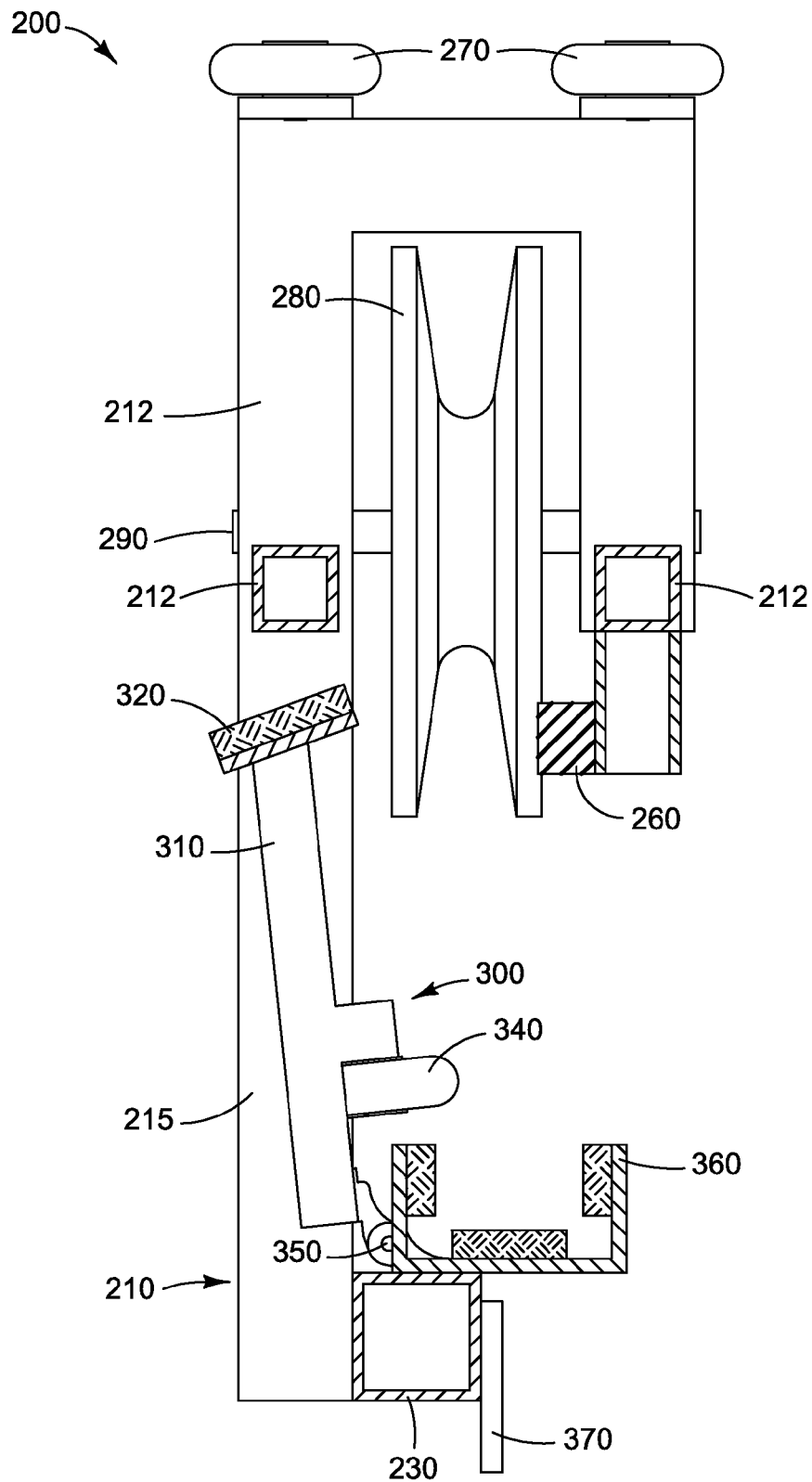
FIG. 10 is a sectioned end view of the trolley of FIG. 8 trolley with a derailment safeguard device in its open, unlocked position.

In FIG. 10, the disengagement deflection roller 340 has been deflected by an external force so as to cause the derailment safeguard mechanism 300 to be rotated to be clear of the guide cable 180. One purpose for this rotation is to provide clearance for removal of the trolley 200 from the guide cable 180. Another purpose, the primary motivation for this deflection, is to avoid collision with the transfer device (800, 810, 900) between segments of a multi-vectored trolley system. In the alternate embodiment of the trolley depicted in FIGS. 37-44, the disengagement deflection function is provided by a pad 340 rather than a roller.

To accommodate a multi-vectored system, the safety derailment safeguard mechanism 300 moves out of the way as it approaches a transfer device. Its spring-loaded hinges 350 then move it back into the locked position as the trolley 200 departs the transfer device 800 (810, 900) and engages the next in the series of concatenated guide cables. If deemed necessary a latching device may be incorporated to ensure that the spring tension which holds the derailment safeguard mechanism 300 closed cannot be overcome except when the trolley encounters a transfer device (800, 810, 900).

The primary trolley alignment guides 360 mounted to the lower frame member 230 (FIGS. 9-10) serve to restrict lateral motion so as to provide vertical stabilization within a range of safety as a trolley 200 traverses a transfer mechanism (800, 810) from one segment of guide cable 180 to another. Mounted to the upper frame member 212 is a pair of alignment guide rollers 270 for initial alignment of the trolley 200 as it enters a turn.

Transfer Device

Figure 13:
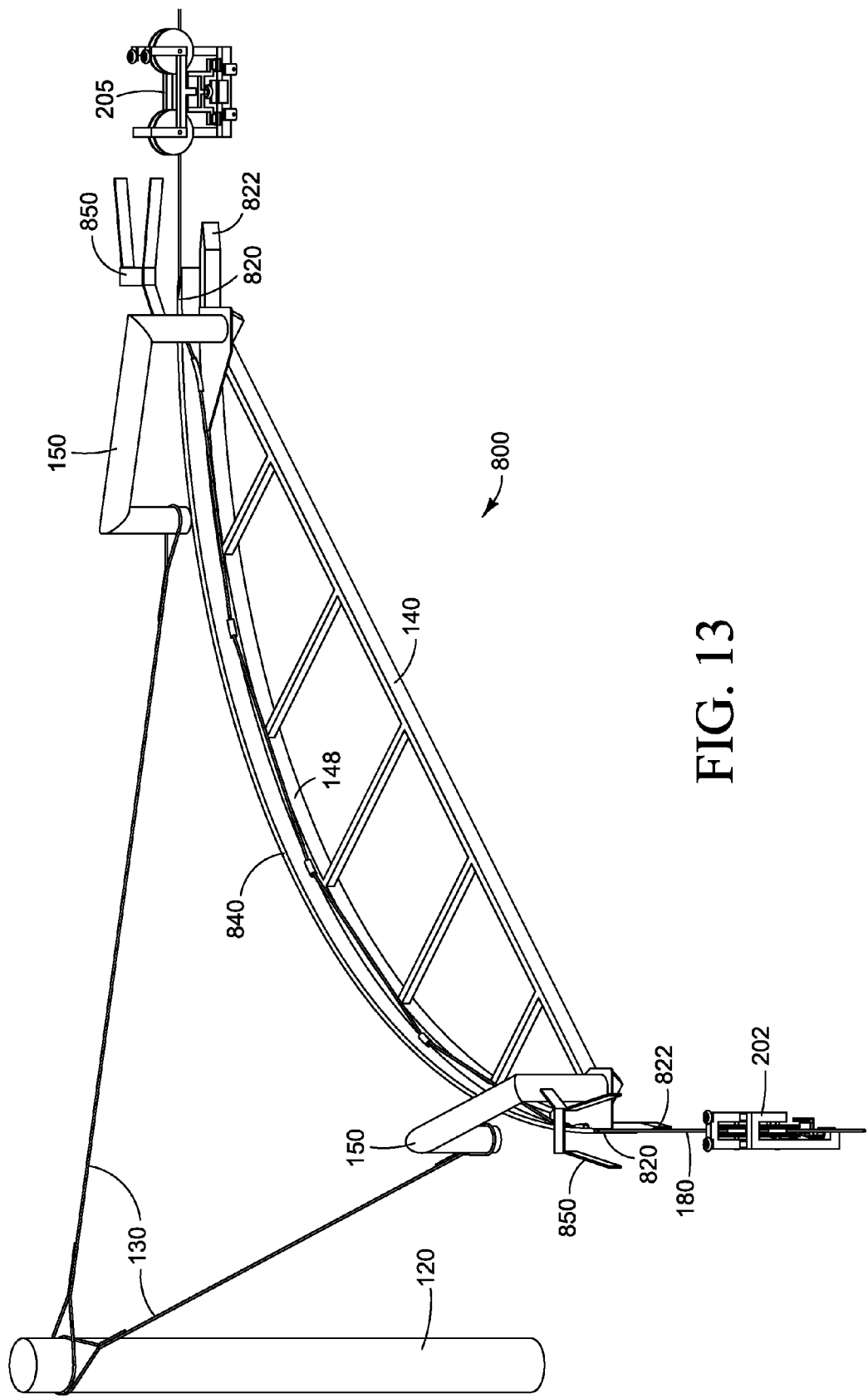
FIG. 13 shows a perspective view of a transfer mechanism for an inside turn.
Figure 14:
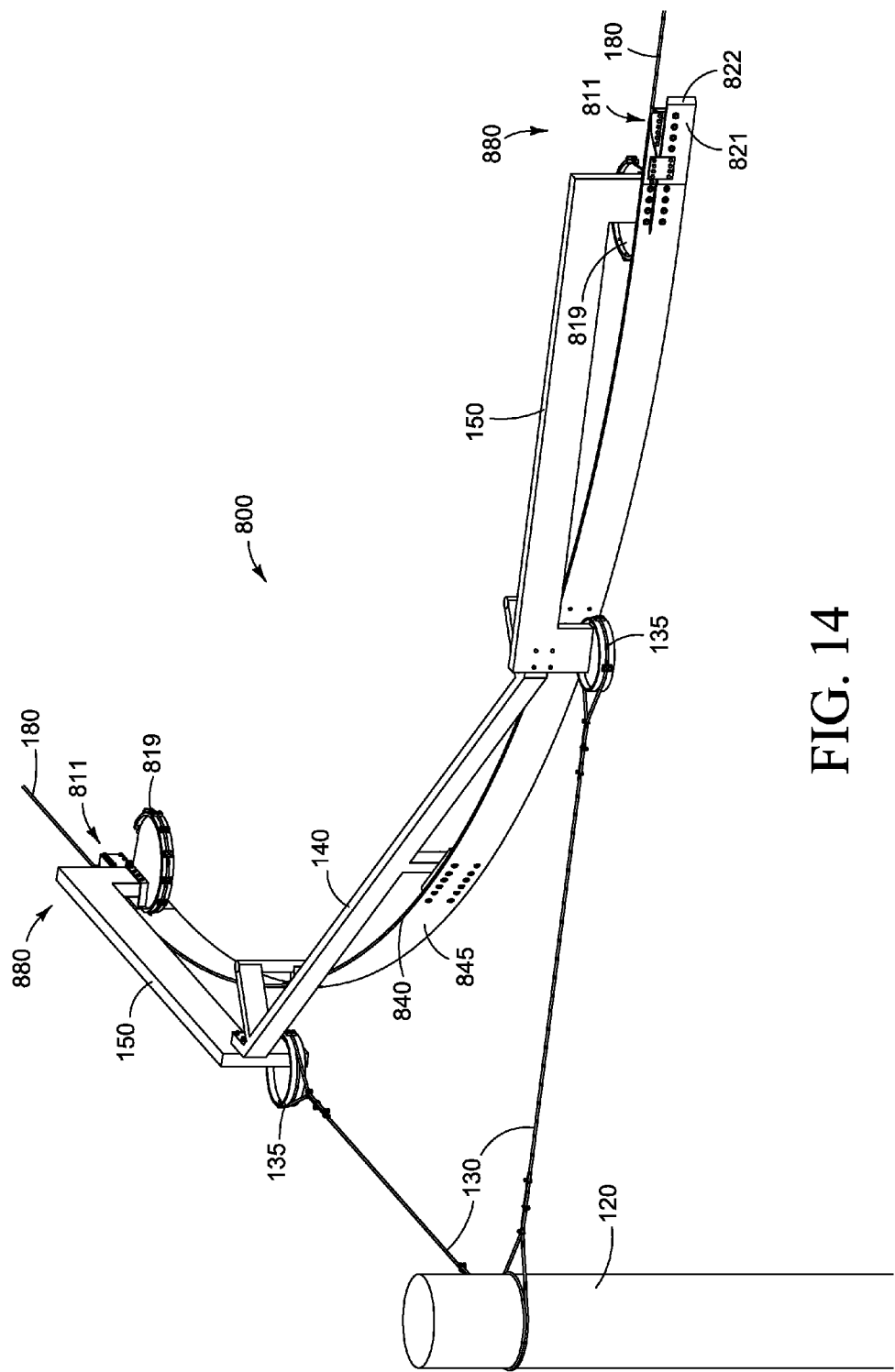
FIG. 14 is a perspective view of an alternate embodiment of a transfer mechanism for an inside turn.
Figure 15:
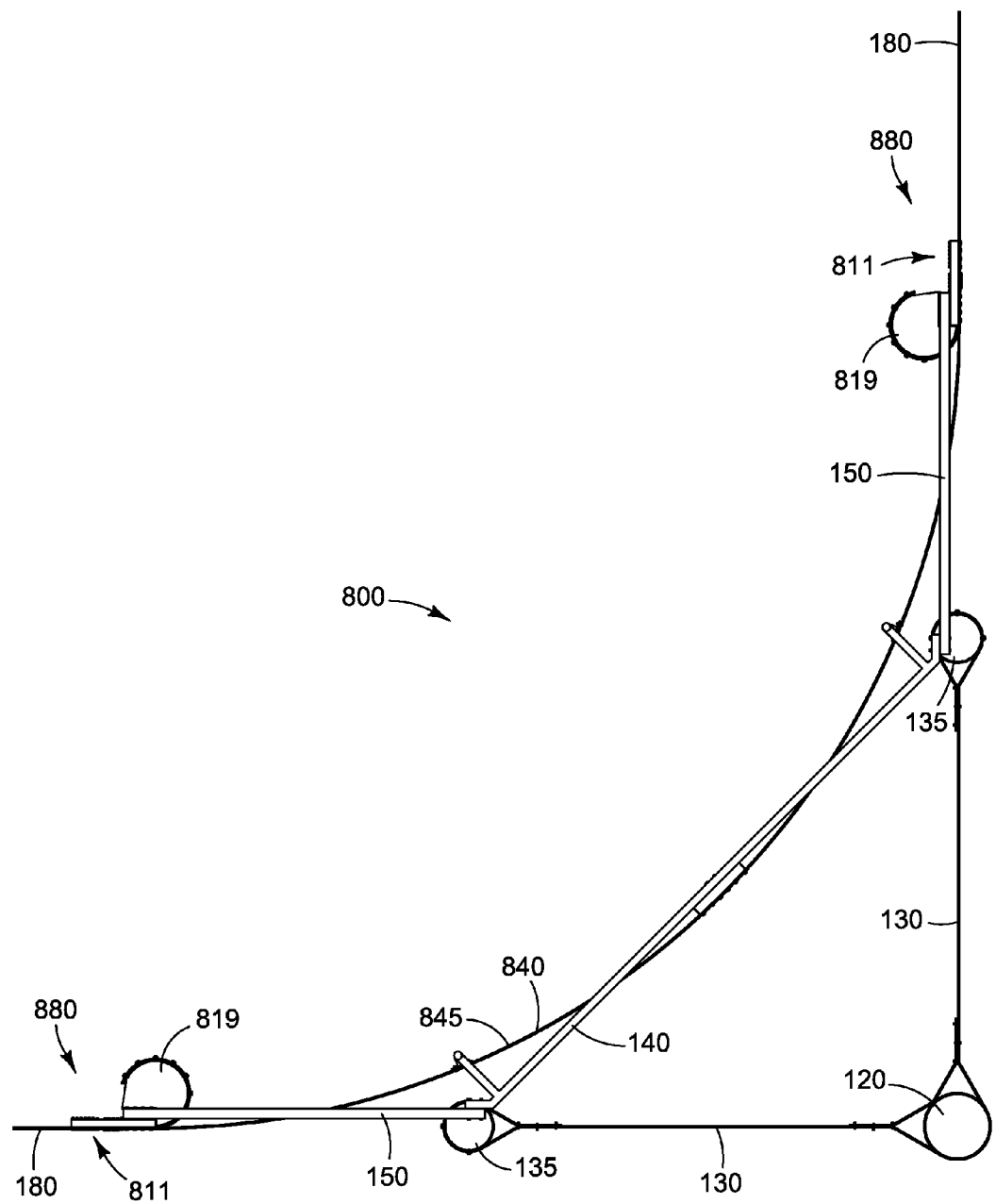
FIG. 15 is a plan view of an alternate embodiment of a transfer mechanism for an inside turn.
Figure 16:
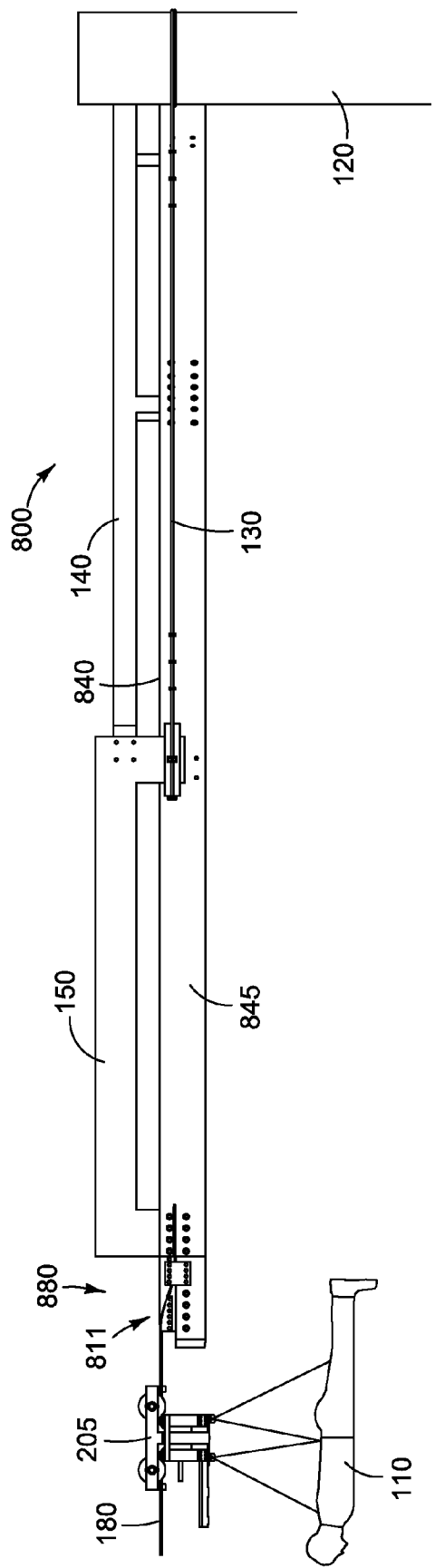
FIG. 16 shows an elevation view of a transfer mechanism with a rider exiting an inside turn.
Figure 17:
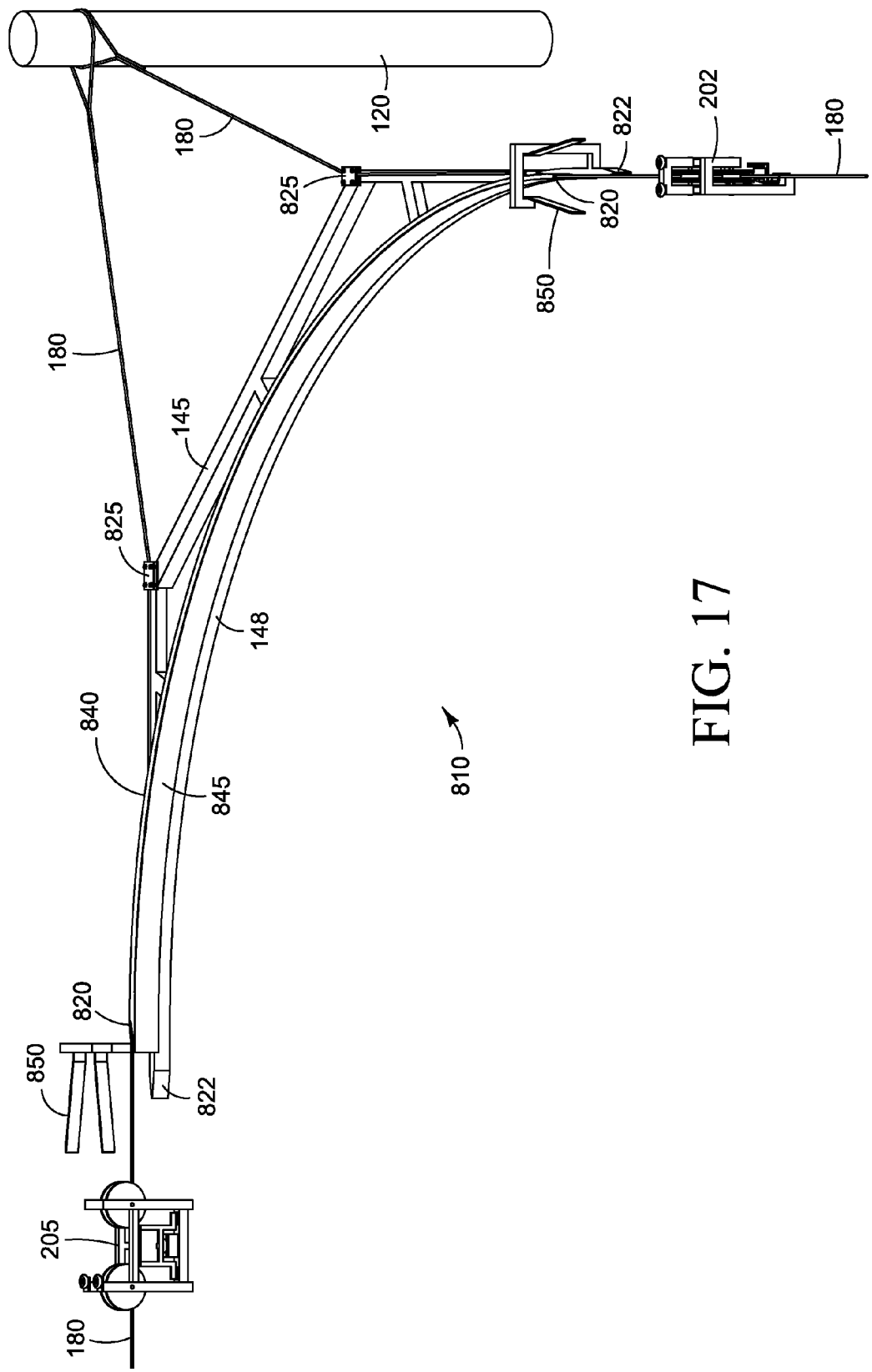
FIG. 17 shows a perspective view of a transfer mechanism for an outside turn.
Figure 18:
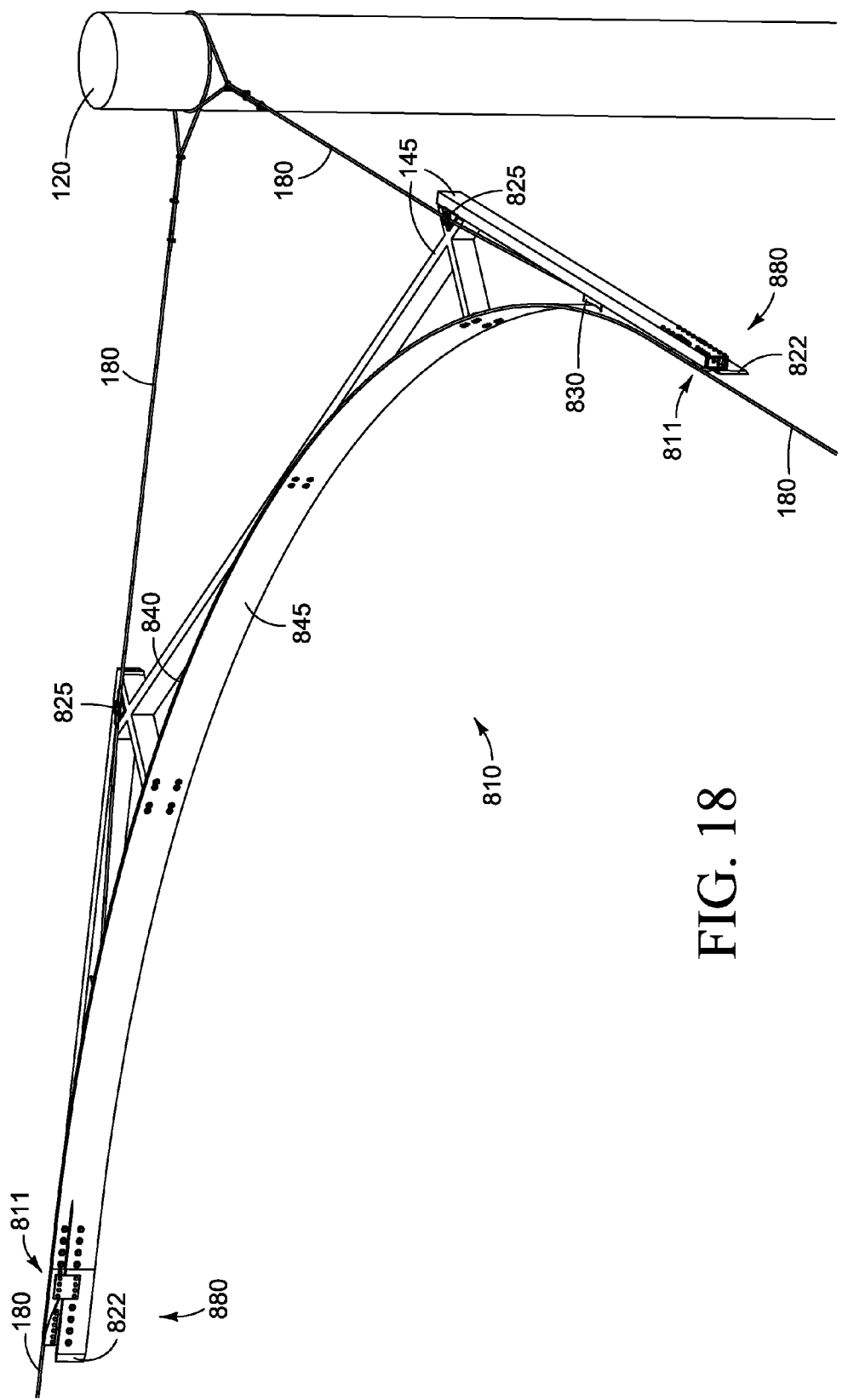
FIG. 18 shows a perspective view of an alternate embodiment of a transfer mechanism for an outside turn.
Figure 19:
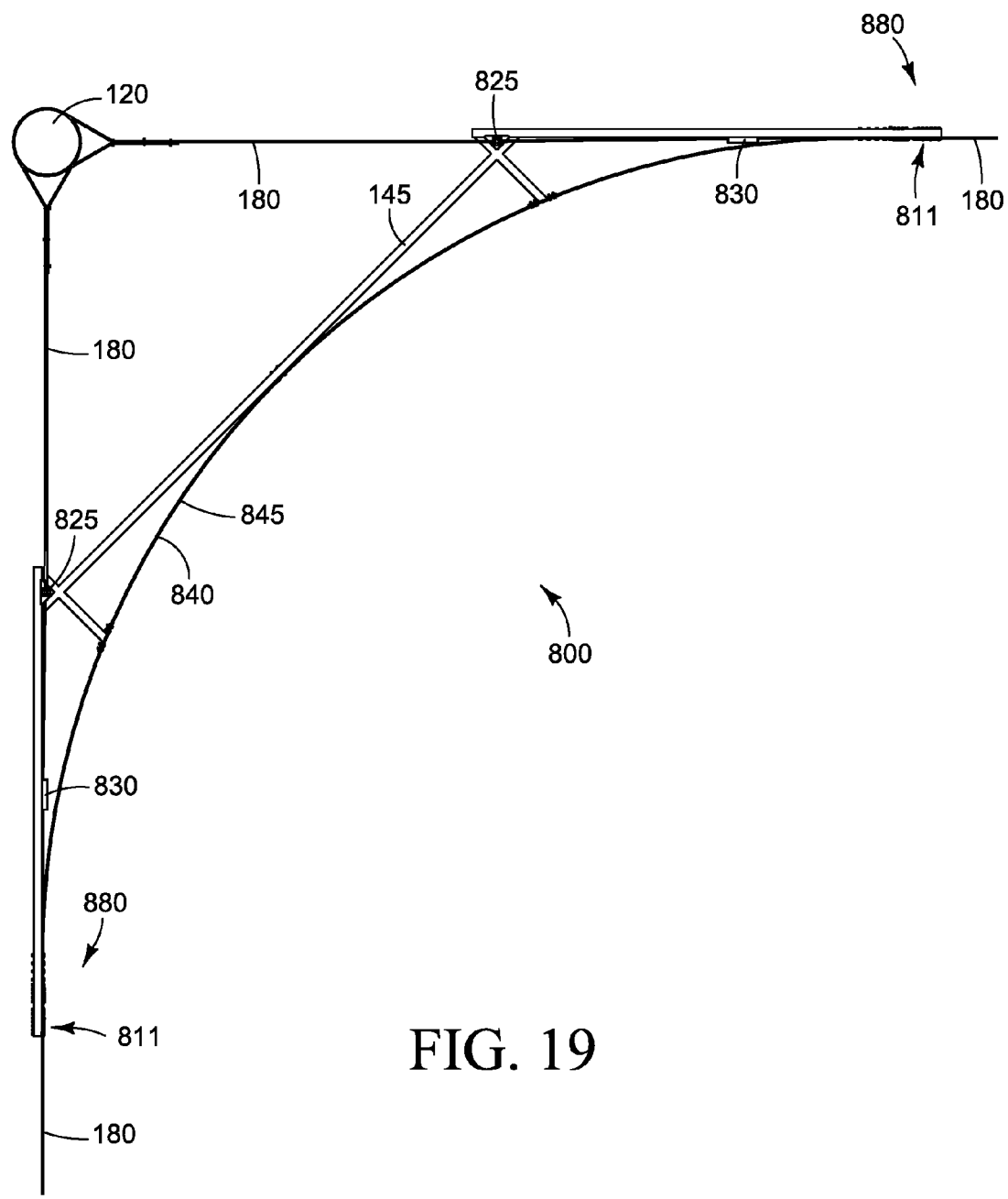
FIG. 19 is a plan view of a transfer mechanism for an outside turn.
Figure 20:
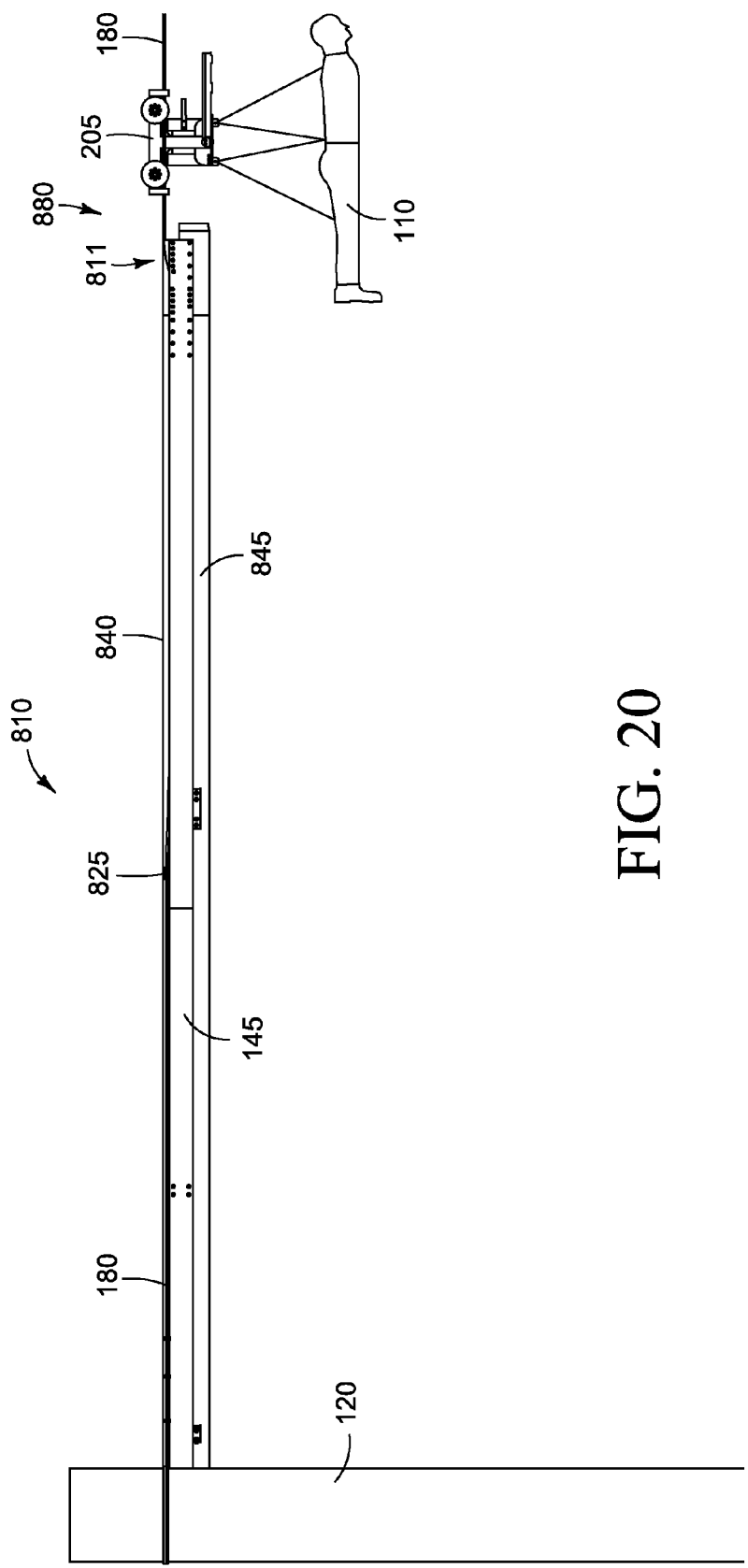
FIG. 20 is an elevation view of a transfer mechanism with a rider exiting an outside turn.

The transfer device 800 shown in FIG. 13 is designed to carry a trolley 200 around a right-hand turn at a support tower 120 between two segments of a zip-line system. FIG. 14 shows an alternate version of the apparatus of FIG. 13. A left-hand turn is depicted in FIG. 17, enabled by transfer device 810. It will be recognized that the support structures for right-hand and left-hand turns are necessarily different. This is in order to accommodate the fact that the trolley frame must be open on one side in order to provide clearance for all cable support structures but can only be open on one side and not the other. The sense of left-hand or right-hand is interchangeable. To reduce confusion the terms inside and outside will be used here rather than right-hand and left-hand, respectively. An inside turn is one in which the open side of the trolley 200 faces into the direction of the turn, that is, toward the inside of the curve when negotiating a turn. On the other hand, a trolley 200 whose open side faces away from the direction of a turn will be making an outside turn. With a trolley 200 having a frame 210 that is open on its right when facing in the direction of normal (say, downhill) motion, a right-hand turn is a turn to the inside, whereas a left-hand turn is a turn to the outside. For a trolley frame 210 with an open left side, the sense of inside and outside turns is reversed which requires that the transfer devices be mirrored. In all cases it will be seen that the framework of the support structure for an inside curve is inside of the curve of the track, and the support structure framework for an outside curve is outside of the curve of the track. This follows from the fact that the open side of the trolley must face the support structure framework which must be on the side of the track opposite the trolley in order to avoid interference.

As shown in the embodiment of the transfer device 800 of FIG. 13, the guide cable 180 is contiguous between the incoming segment, at the lower left of the figure which carries an incoming trolley 202, and the outgoing segment at the upper right supporting an exiting trolley 205. Although the guide cable 180 may or may not continue through the curve as shown here, the trolley is carried around the bight by a guide track 840.

The guide track 840 is allowed to float as it is suspended from the support tower 120 by a pair of support cables 130, seen in the perspective view of FIG. 13. The support cables 130 connect to force transfer bridges 150 which in turn tie to a trussed framework 140 that defines and maintains the curve of the guide track 840.

It will be recognized by those skilled in the art that the transfer bridges 150 shown in the support structure of FIG. 13 could be eliminated by rigidly attaching the transfer mechanism to one or more support towers. In such an arrangement, the towers would need to be located a suitable distance away from the guide cable 180 to provide sufficient clearance for the trolley 200 and its payload 400. The greater this distance, the greater the torsional load that is exerted on the support tower (or towers) as the trolley 200 passes through the transition region. For this reason, a floating support system, as shown, is preferred.

Figure 21:
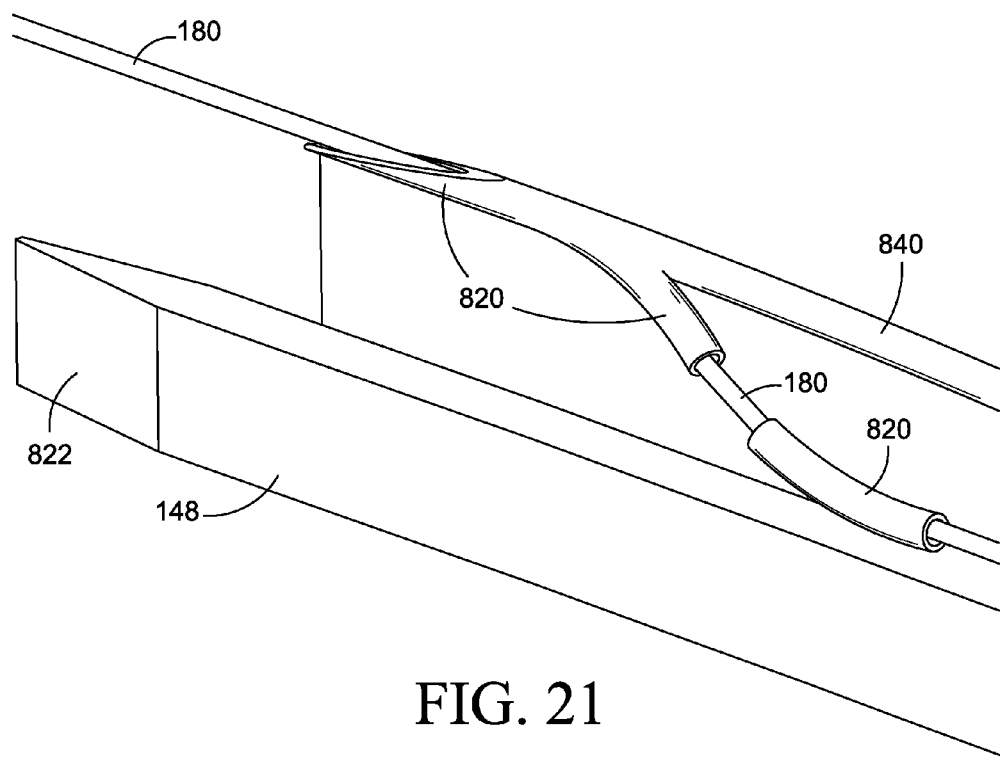
FIGS. 21 and 22 depict in perspective the details of routing the guide cable into a transfer mechanism using either a segmented or continuous diversion tube.
Figure 22:
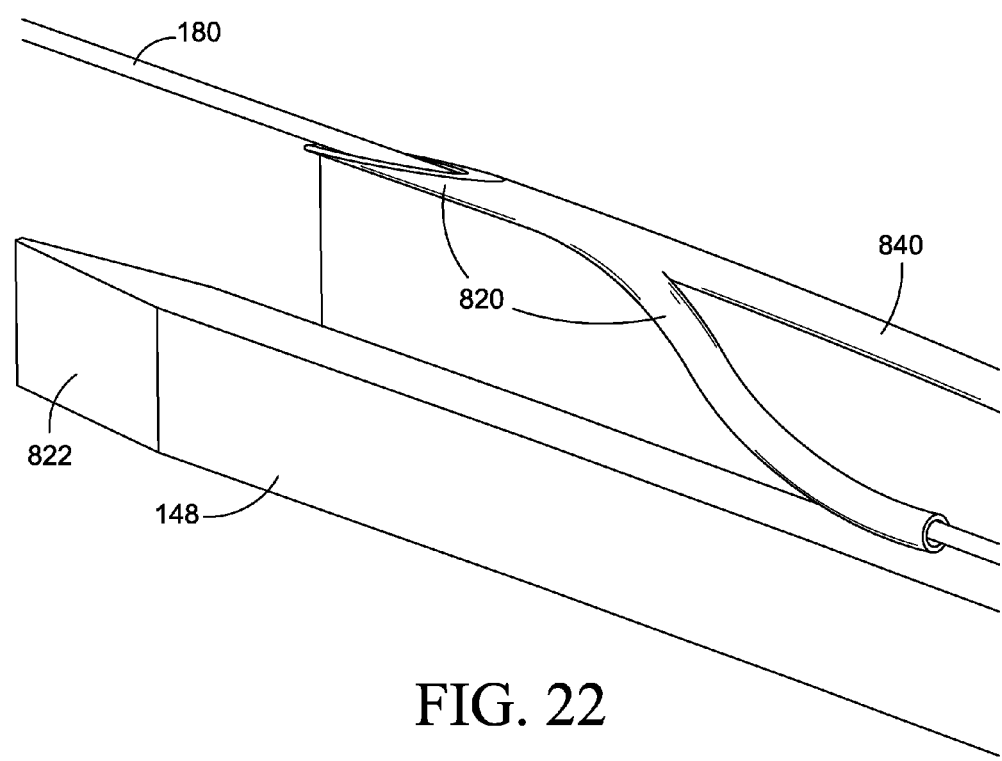

The guide track 840 (FIGS. 13-20) forms a rigid curve, having a transition tube 820 at each end to enable smooth entry of a trolley into and exit from a turn, even during bidirectional travel. As seen in the detail of FIGS. 21 and 22 an upwardly facing bevel on the transition tube 820 is sufficiently graded for smooth trolley movement between the guide cable 180 and the guide track 840. The transition tube 820 has a bore that is sufficient to pass cable 180 as it is diverted generally downward, away from the guide track 840, in the direction of the open side of the trolley as required for unobstructed passage of the trolley. The guide cable 180 is supported and manipulated by one or a series of tubes as it is forced around the curve until it completes the curve and is deflected upward by another cable deflection tube 820 to realign with the far end of the guide track 840. FIG. 23 shows in plan view the details of routing a guide cable 180 through a transfer mechanism for an inside turn, while FIG. 24 depicts the features of an outside turn.

To reiterate, the transition tube 820 serves a dual purpose. First, it serves as an initial part of the guide track 840. A tapered end of the transition tube 820 provides a smooth transition to gently lift a trolley off of the guide cable 180 onto the guide track 840 while minimizing any bump in the path of the trolley as it passes. To provide for a smooth transition, the bevel on the transition tube 820 must be cut at a very shallow angle, one having a length equivalent to several diameters of the tube.

A second purpose of the transition tube 820 is to support the guide cable 180 while displacing it away from the path of the trolley. As the trolley exits the guide track 840 at the other end, another transition tube 820 lifts the guide cable 180 to be rejoined with the guide track 840.

While the guide track 840 is shown here as round rod, it will be recognized by those skilled in the associated arts that the solid rod may be replaced by hollow pipe in order to reduce weight. Furthermore, flat bar with a fully rounded upper edge, or even a half pipe section are usable.

With the guide cable 180 properly displaced from the guide track 840, the guide cable 180 may be secured by cable clamps 190 (see FIG. 32). A series of cable guides 830 (seen in FIG. 32) may optionally be used to route the guide cable 180 (or 185) adjacent to the guide track 840 for subsequent termination. In this embodiment, the strain relieving cable clamps 190 keep the cable from moving relative to the transfer mechanism due to the significant stresses encountered as the trolley passes over the local region. Any movement to the transfer mechanism would likely cause chafing against the guide cable 180. One alternate embodiment may route a contiguous guide cable 180 through a transfer mechanism using cable clamps 825 to trace the bight adjacent to the guide track 840. For maintenance purposes in configurations where cable clamps 825 are used, cover plates 864 may be removed to allow the guide cable 180 to be inspected without relieving tension from the cable.

Figure 28:
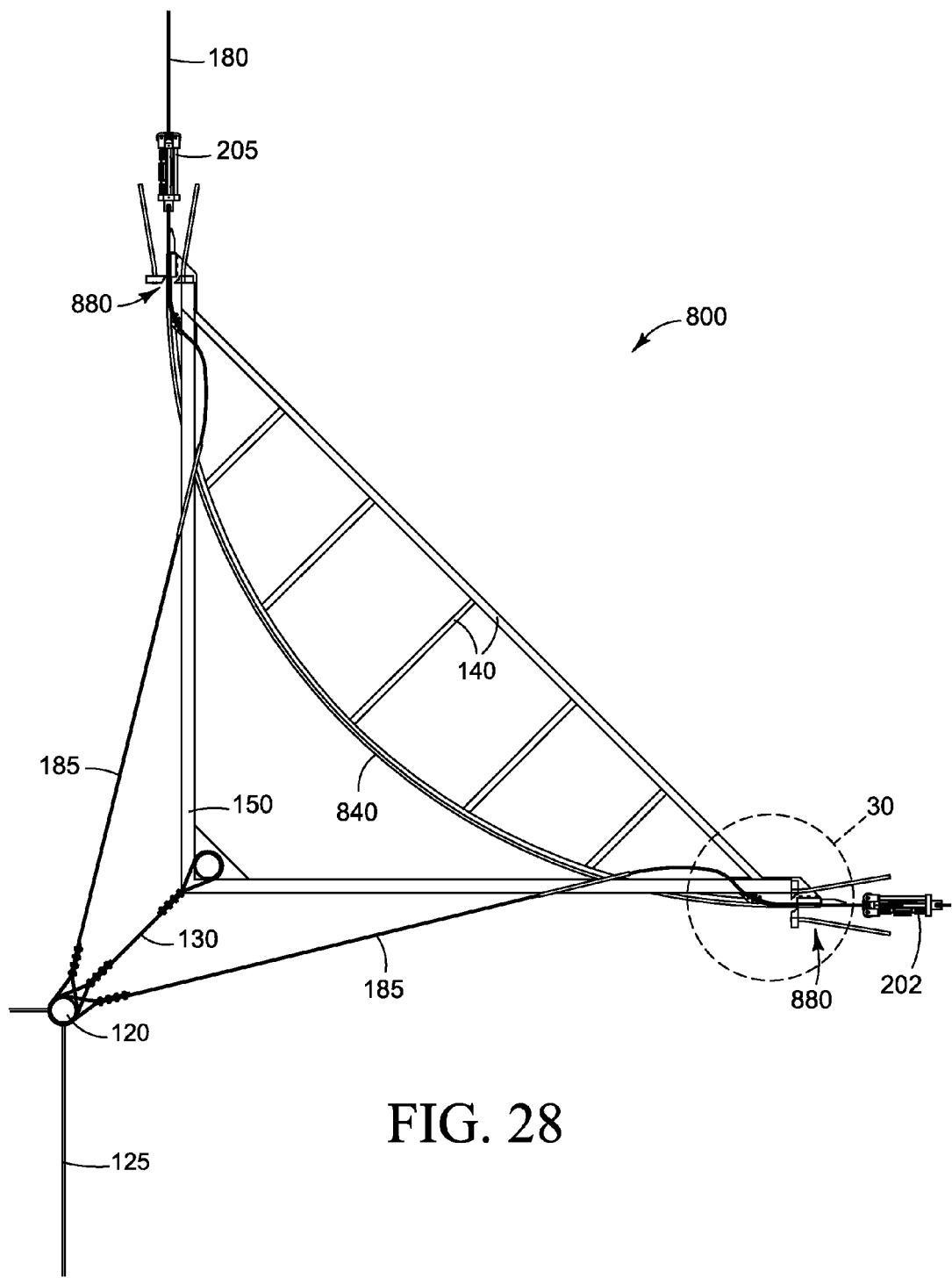
FIG. 28 shows a plan view of a plate transition for an inside turn.
Figure 29:
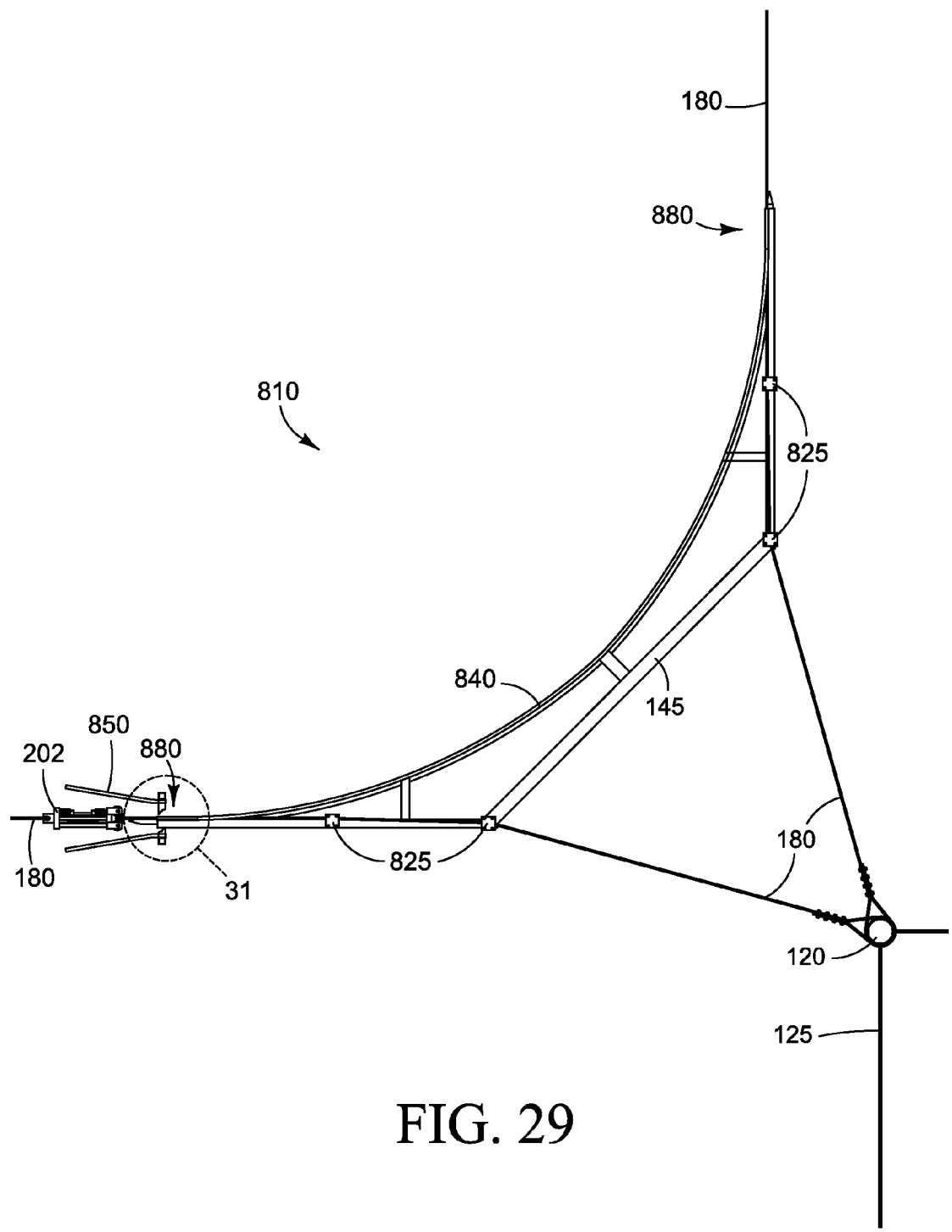
FIG. 29 is a plan view of an outside turn where a plate transition is used to implement the transfer mechanism.

In an alternate embodiment, the guide cable 180 may be terminated beyond the cable clamps 190. When sufficient length of cable remains beyond the clamps 190, the cable can be routed further away from the trolley's pathway toward a support tower 120 where it can be connected to serve as a safety cable 185 as shown in FIG. 28. Where desirable, the cable may be routed along the force transfer bridge 150 as a safety backup in case of failure of the bridge. Though not shown in FIG. 13 (for inside curve mechanisms) these safety backup cables 185 would follow support cables 130. In all cases, the array of clamps 190 must be capable of carrying the full load of the cable under stress.

Figure 43:
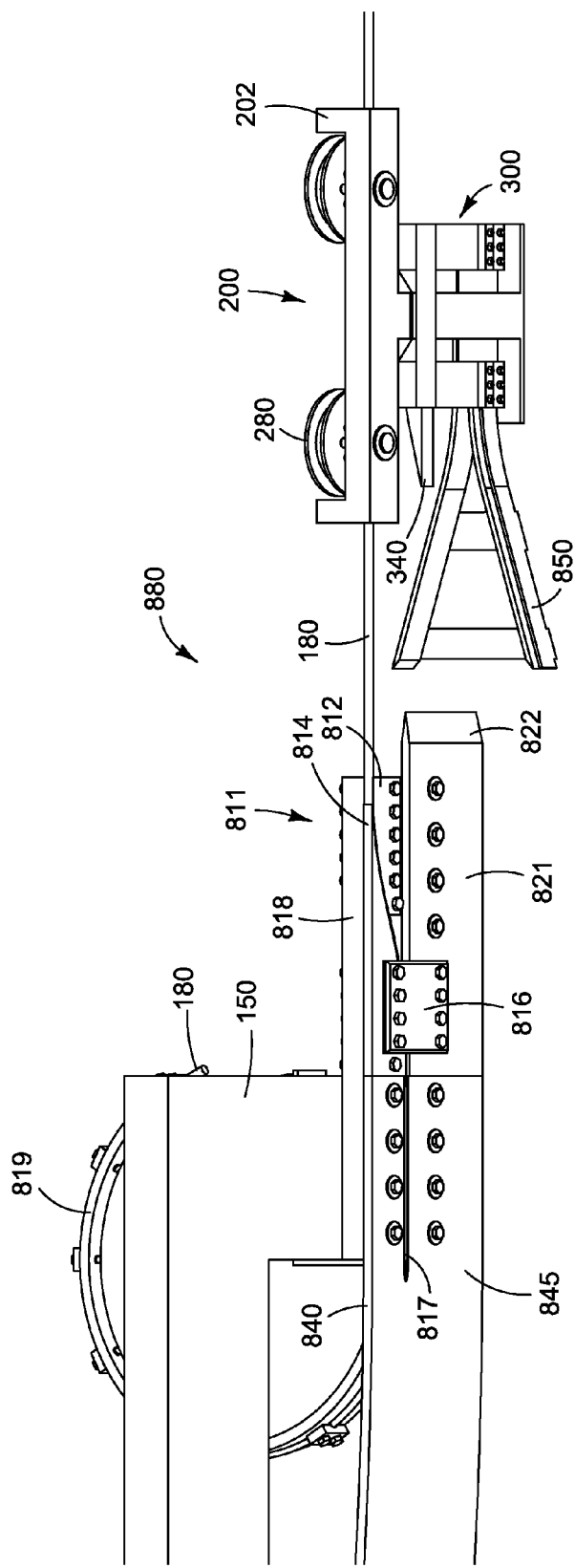
FIG. 43 is a perspective view of a trolley near the entrance of a transfer mechanism for an inside turn.
Figure 44:
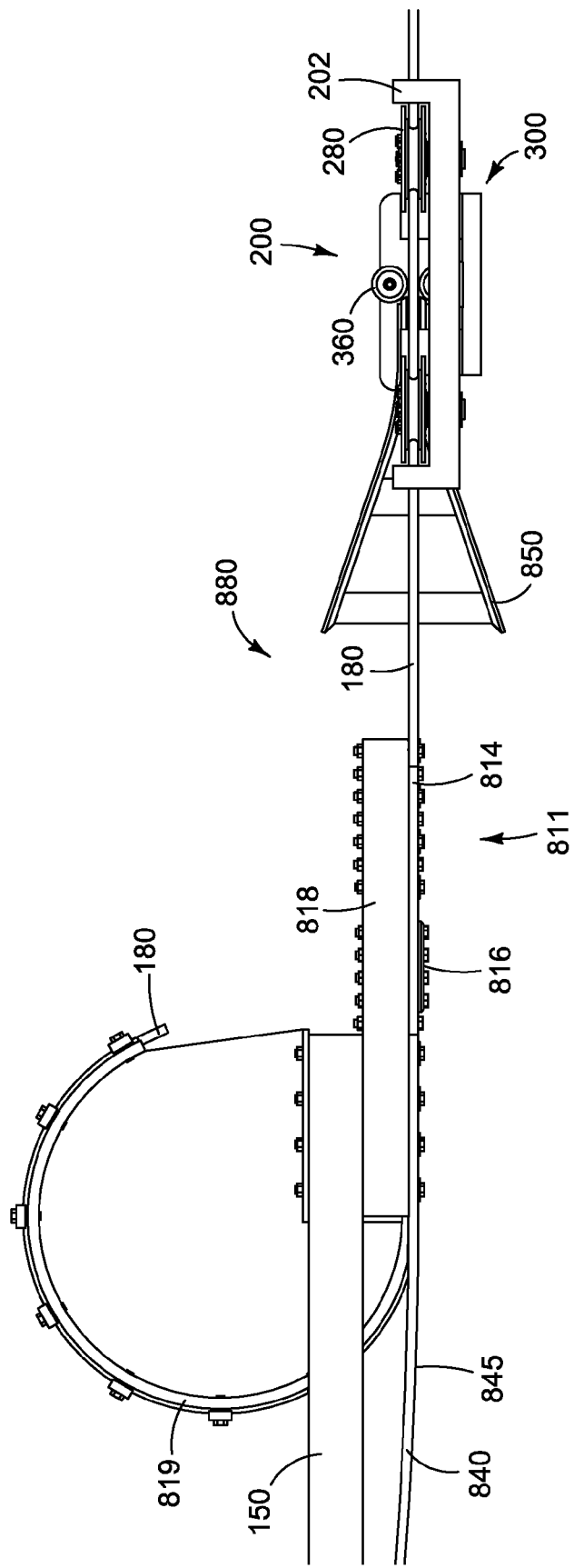
FIG. 44 is a top view of a trolley near the entrance of a transfer mechanism for an inside turn.
Figure 45:
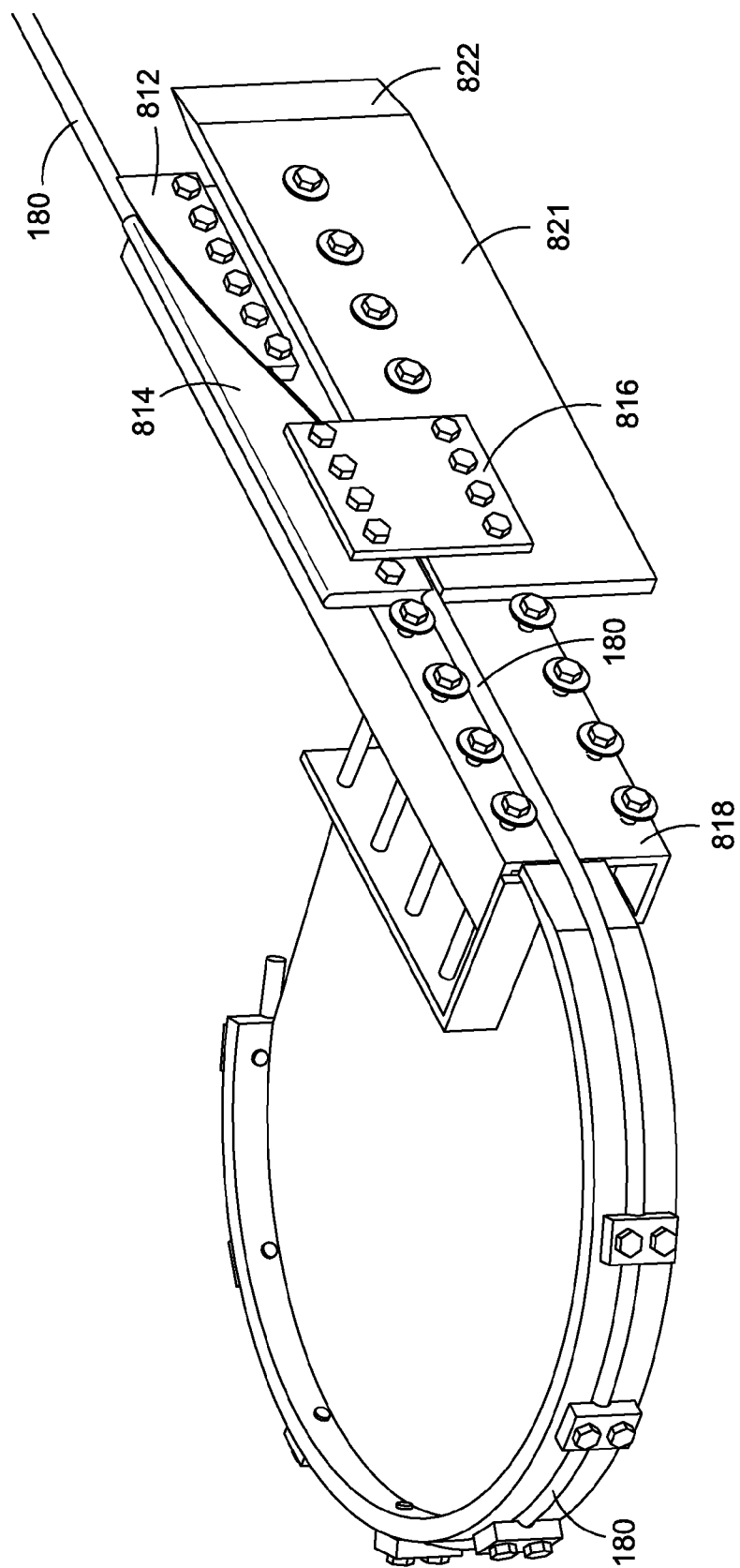
FIG. 45 is a perspective view showing cable routing at an end of a transfer mechanism for an inside turn.
Figure 46:
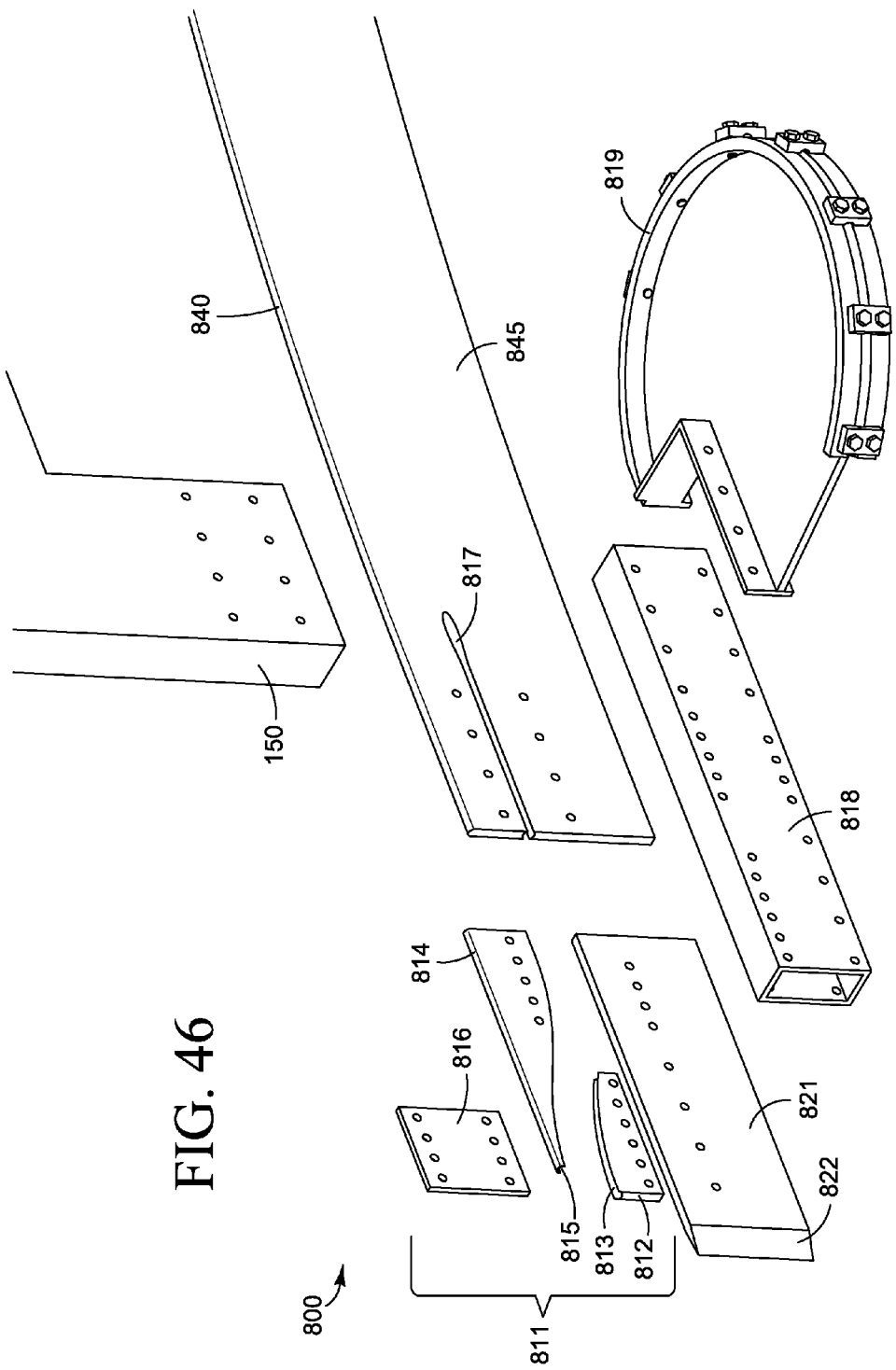
FIG. 46 shows the component details in an exploded view of FIG. 45.
Figure 47:
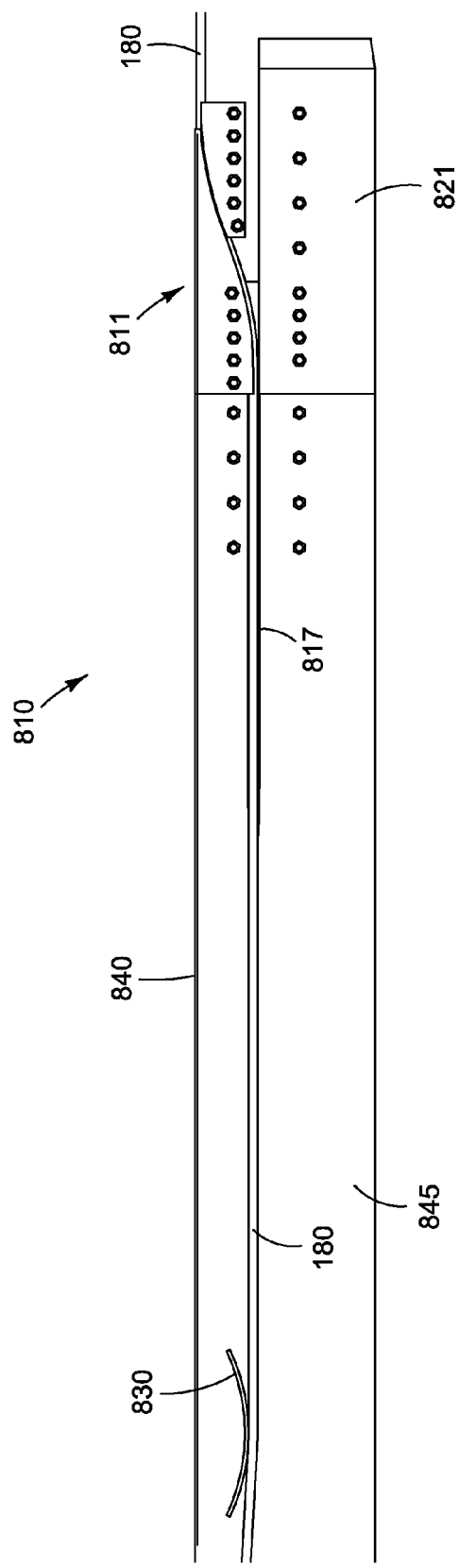
FIG. 47 is a side view of an end of a transfer mechanism showing cable routing.
Figure 48:
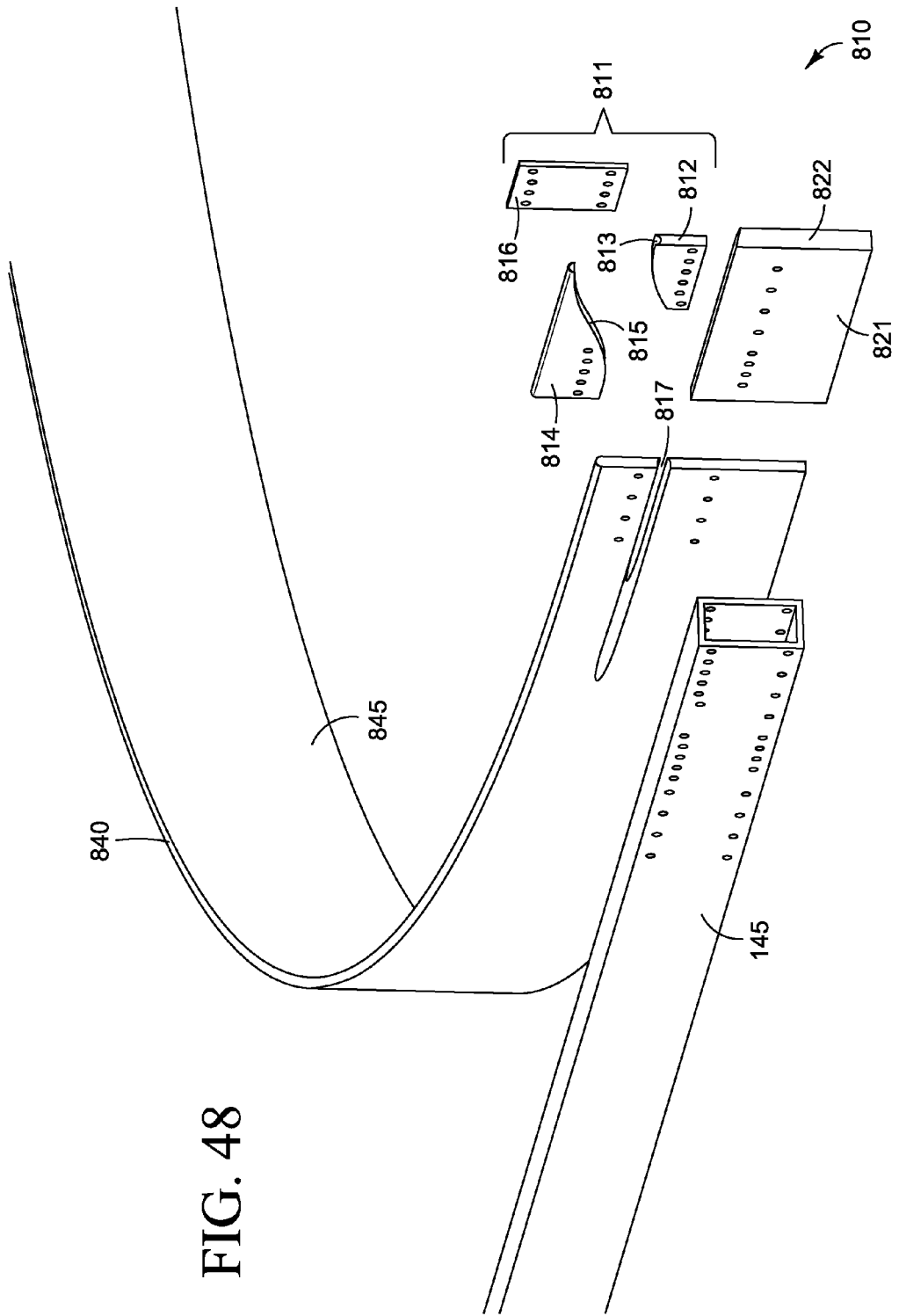
FIG. 48 shows in a perspective view the components of a transfer mechanism.

An alternate means of cable deflection is shown in FIGS. 43-48. In this embodiment, the cable 180 is deflected along a groove bounded by 813 and 815 which is formed between lower and upper deflection plates 812 and 814, respectively. After being deflected away from the guide track, the guide cable 180 is routed through a passage 817 in the guide track support 845 and then wrapped around and secured in the ring clamp 819. With the guide cable 180 secured, a series of cable guides 830 (FIG. 47) may position the cable as appropriate. When used with the alternate embodiment of the trolley 200 shown in FIGS. 37-44, the bevel 822 at the end of nose piece 821 interfaces throughout the transition zone 880 with the trolley alignment funnel guide 850 to initialize alignment of the trolley 200 for entry into a transfer device as shown in FIGS. 43 and 44.

Figure 65:
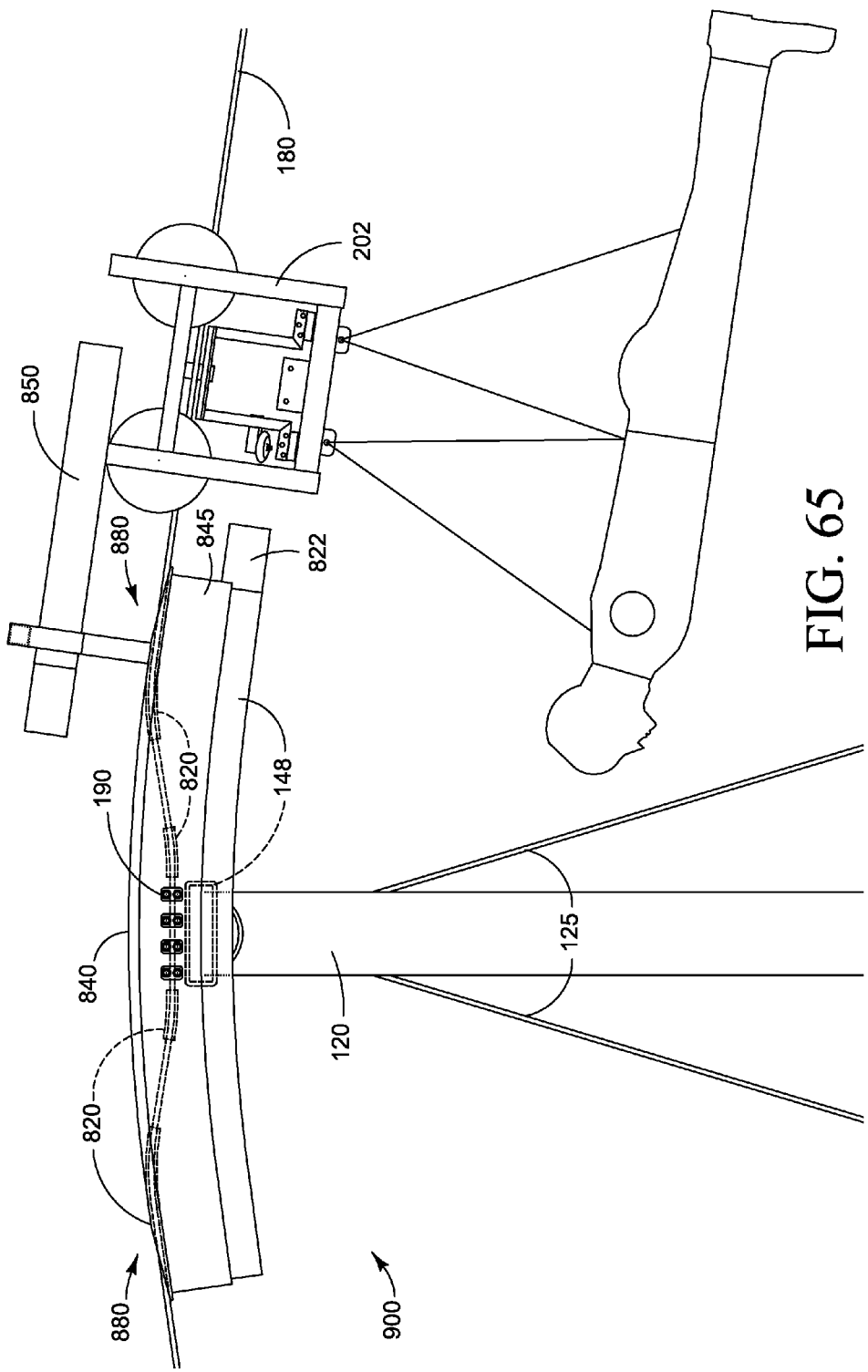
FIG. 65 is a side view of a vertical transfer mechanism for redirecting an incoming trolley about a horizontal axis.
Figure 66:
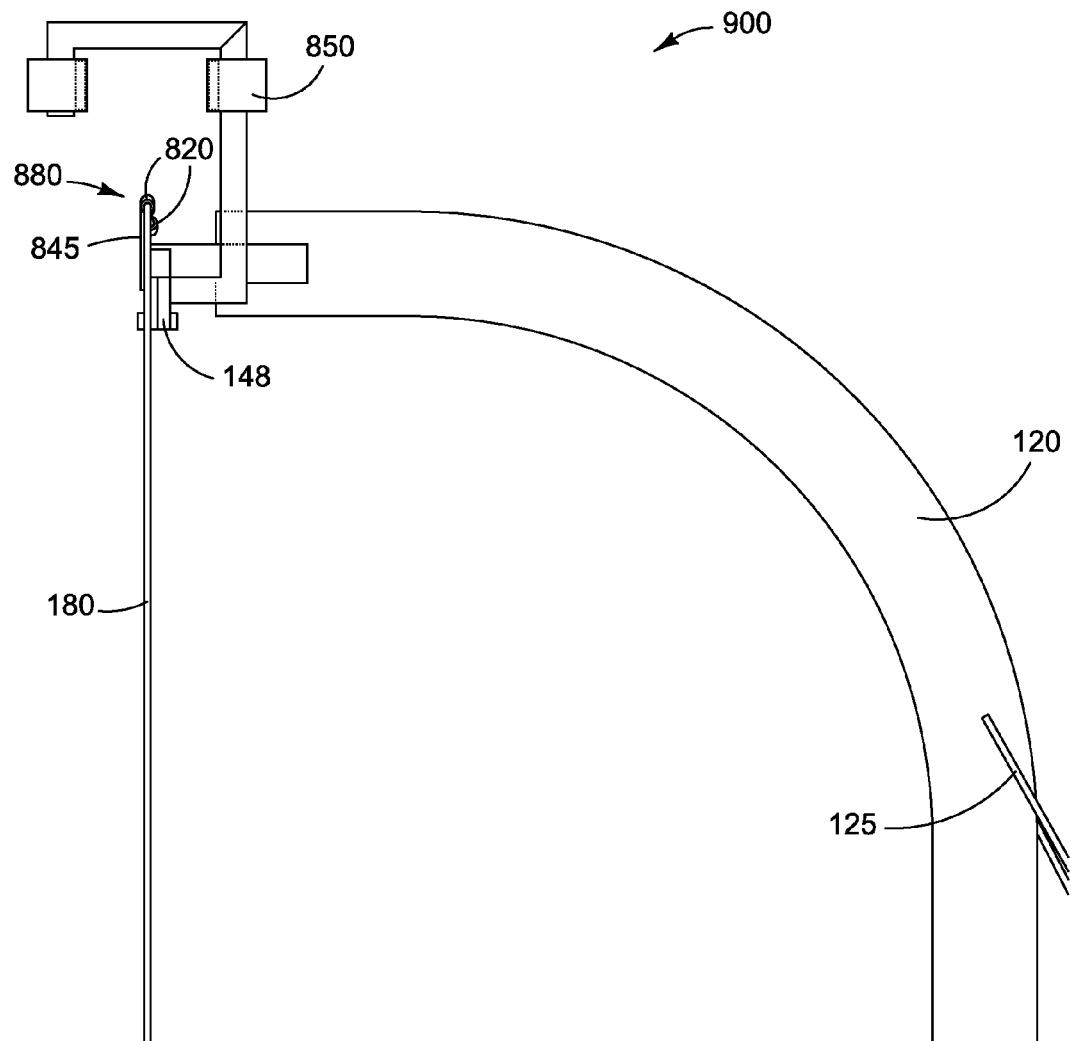
FIG. 66 is an end view of a vertical transfer mechanism as shown in FIG. 65 supported by an associated support tower with the trolley removed for clarity.

The foregoing discussion of the details of the present system has been based on illustrations that have shown horizontal transfers between cables that lie generally in the same horizontal plane. As can be seen in FIGS. 65-67, vertical transfers between cables are readily accommodated as well. These transfer mechanisms provide for transitions about a horizontal axis in order to change vertical orientations as at a peak of a hill. The side view of FIG. 65 shows a trolley entering such a transfer zone 880 at a vertical transfer mechanism. The mechanism itself may be supported directly at the end of an angled tower 120 as shown in FIG. 66. Alternately, referring to FIG. 67, the vertical transfer mechanism may be supported by a transition track hanger 890 suspended from a support cable 895 that is stretched between a pair of towers 120.

In any orientation, the described mechanism provides for unmanned transfer points that enable non-stop operation.

Operation of Trolley on Multi-vectored Cable Transport System

The journey of a trolley 200 along a straight open length of zip-line, guide cable 180, is straightforward. The two deep-grooved wheels 280 ride on guide cable 180. Derailment safeguard mechanism 300 assumes the position shown in FIGS. 5-9 due to the spring force of hinge 350. The frame 310 is oriented, as best seen in FIG. 9, so that the end of the arm that is covered with protective wear surface 320 is pressed against the travel limiting stop 260. This effectively locks the wheels 280 onto the guide cable 180 to prevent them from bouncing off due to shock along the cable or severely exaggerated motion of the trolley 200 and its payload. The protective wear surface 320 protects the derailment safeguard mechanism 300 against potential abrasion in the unlikely event of contact with the guide cable 180 as the trolley passes.

Figure 25:
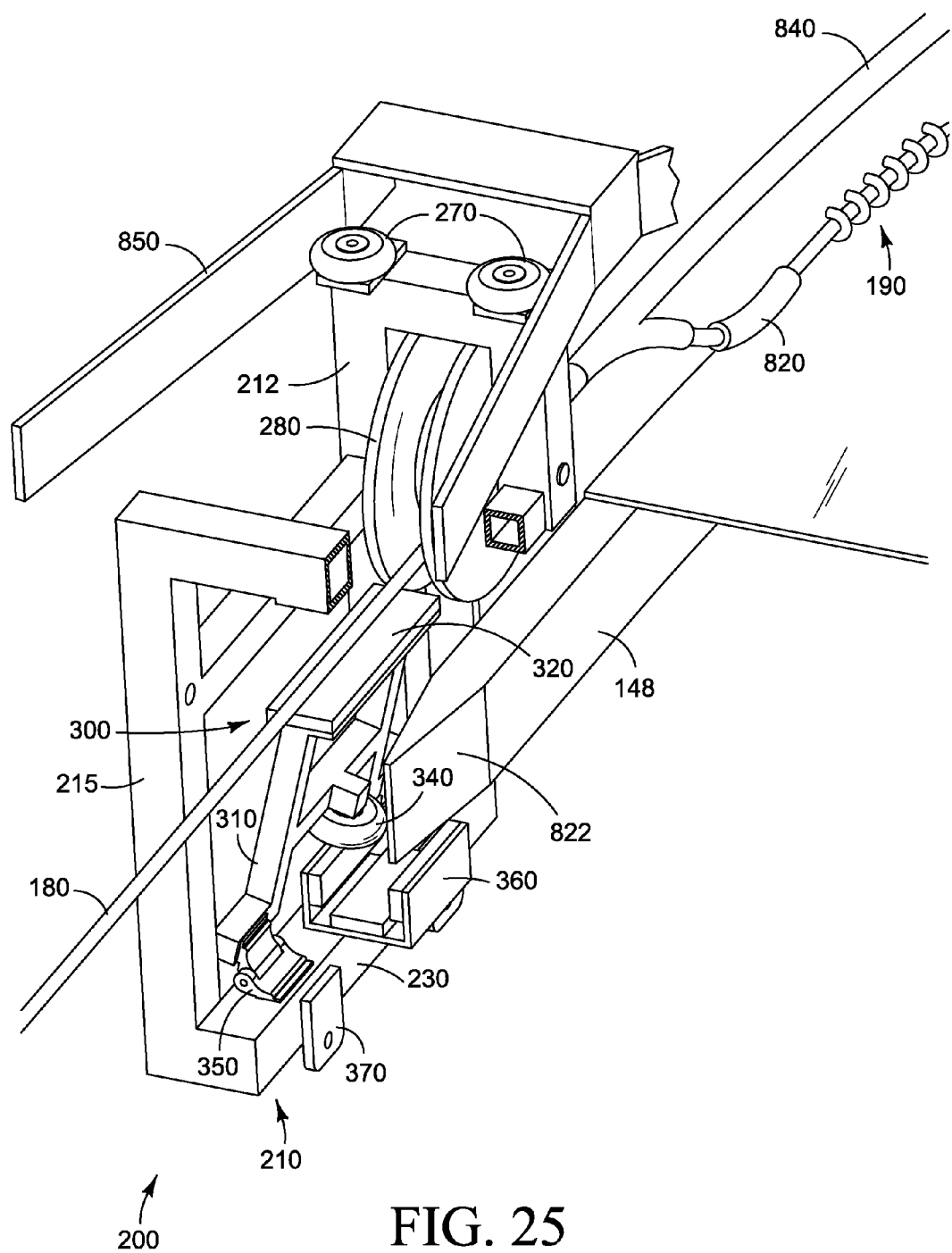
FIG. 25 is a cutaway view of a trolley entering a transfer mechanism for an inside turn.
Figure 26:
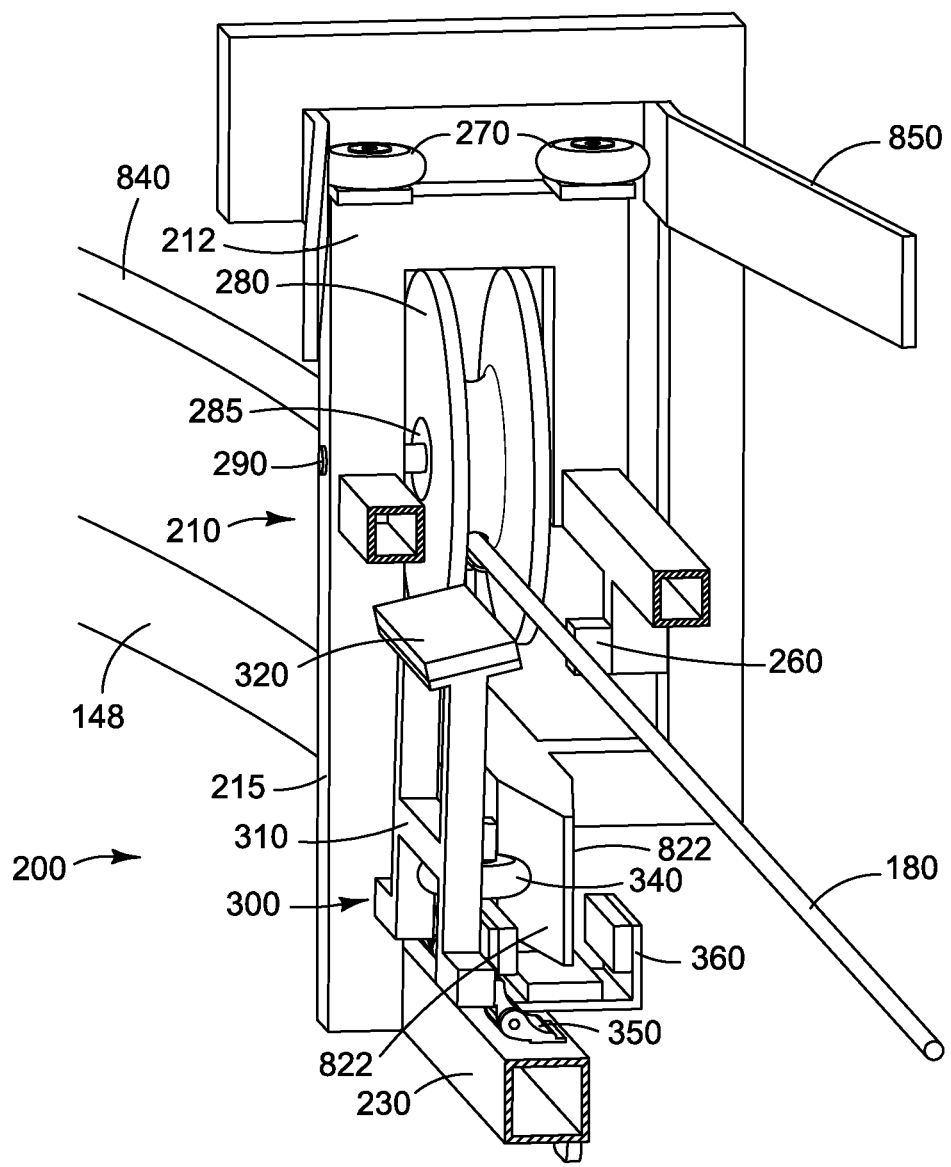
FIG. 26 is a cutaway view of a trolley entering a transfer mechanism for an outside turn.
Figure 27:
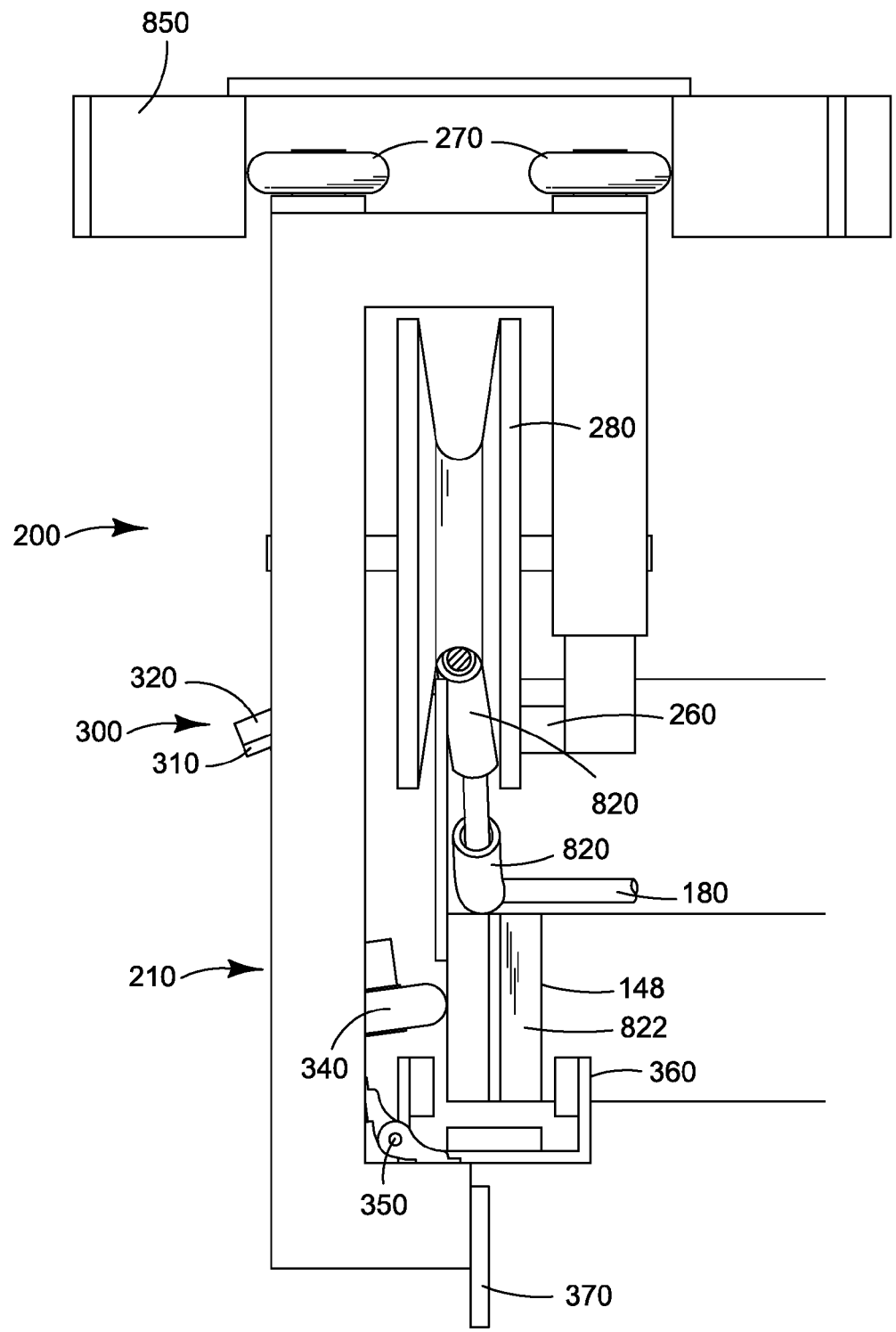
FIG. 27 is an end view of a trolley approaching the transition point of a transfer mechanism.

As the trolley 200 approaches a transition (800, 810), a pair of trolley alignment guides acting as a funnel 850 (FIGS. 13 and 17) will engage the initializing alignment guide rollers, or pads, 270 (FIGS. 5-12) atop the leading edge of the trolley frame 210. This interaction, described in the sequence of FIGS. 25-27, provides initial stabilization to align the trolley 200 within a range of safety to be received by the transfer mechanism (800, 810). Following the detail of FIG. 10, deflection roller 340 will then be pushed aside as it encounters (FIG. 26) the beveled end 822 of curved frame member 148 which supports the guide track 840 through the bight. Working against spring hinges 350, the derailment safeguard frame 310 will be deflected out of the path of the oncoming transfer mechanism 800 moving the arm and its protective wear surface 320 away from the travel limiting stop 260 out of the path of the wheels 280, to the position shown in FIG. 10. This allows the guide cable 180 to drop clear of the wheels 280 as their support is provided by the guide track 840. Meanwhile, the channel formed by the primary trolley alignment guides 360 will have taken position to straddle the guide track bevel 822 and the curved frame member 148 which follows. This action holds the trolley 200 at the proper attitude throughout the bight. It is to be noted that these alignment guides 360 may be used to provide a braking effect to counter excessive speed in the curve. Enhanced embodiments of the trolley 200 may modify alignment guides 360 to enable them to be controlled as calipers in an active braking system. Alternately, alignment guides 360 may be constructed with rollers to minimize friction against the passing trolley.

As the trolley 200 proceeds to depart from the far end of the guide track 840, the disengagement deflection roller 340 leaves the curved frame member 148 as it follows the guide track bevel 822. The hinges 350 return the derailment safeguard frame 310 to its resting position against derailment stop block 260 repositioning the protective wear surface 320 to lock the wheels 280 onto the guide cable 180. The primary trolley alignment guides 360 run clear of the curved frame member 148, and the trolley 200 proceeds toward the next transition or stopping point.

Figure 30:
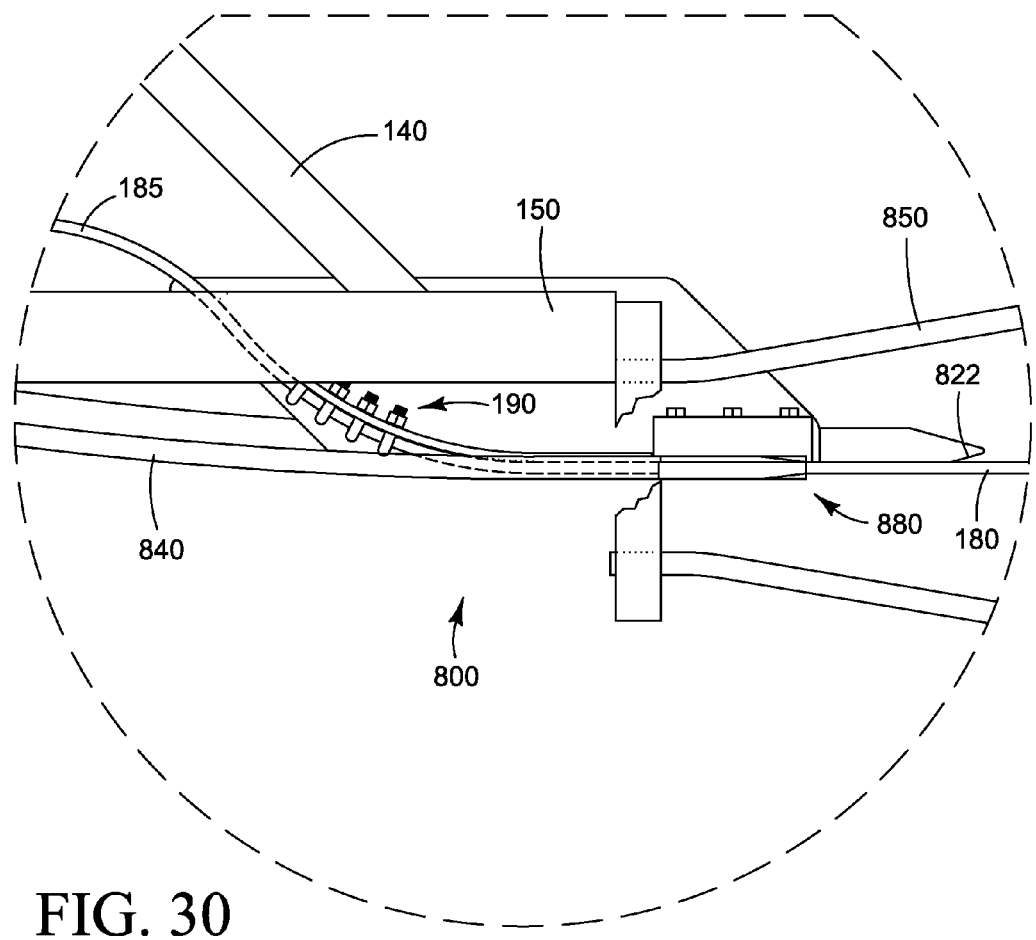
FIG. 30 is a detail at the end of a plate transition for an inside turn called out from FIG. 28.

For an inside transfer mechanism 800, guide cable 180 is securely bound by strain relief clamps 190 as shown in the detail of FIG. 25. With tension relieved from the guide cable 180, it may be routed out of the way of the trolley path, possibly over a force transfer bridge 150, and the remaining cable segment 185 may serve as a safety cable by being tied in parallel with support cables 130 to a support tower 120. In FIG. 30 the interplay in the transition zone 880 can be seen of the various trolley alignment guides (822 and 850), guide cable routing (150, 180, 185 and 190) and guide track 840.

Figure 31:
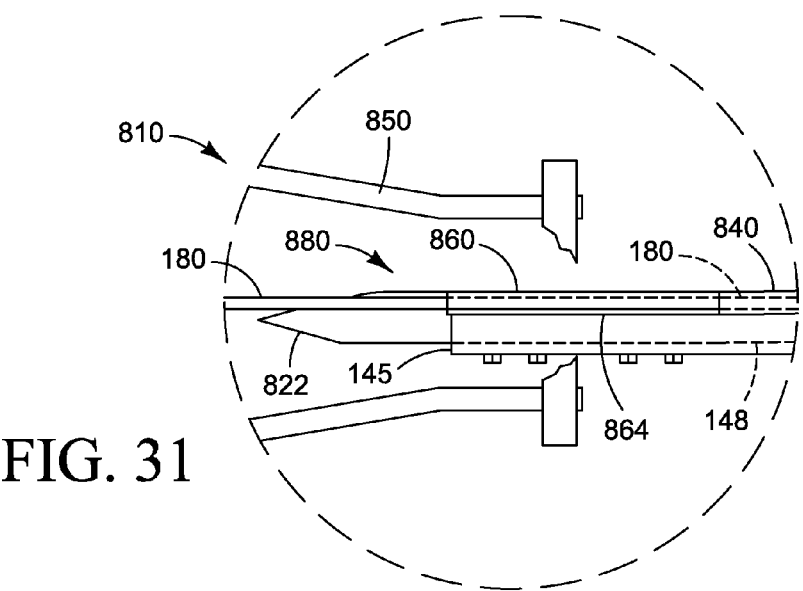
FIG. 31 is a detail at the end of a plate transition for an outside turn called out from FIG. 29.
Figure 35:
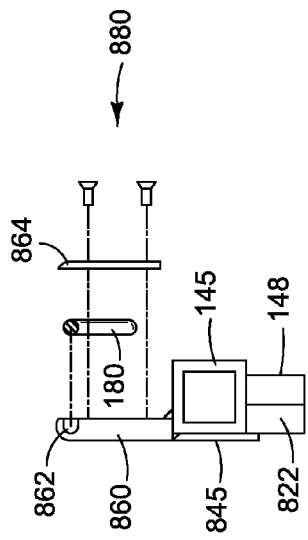
FIG. 35 is an end view showing clamping of a guide cable and plate.
Figure 34:
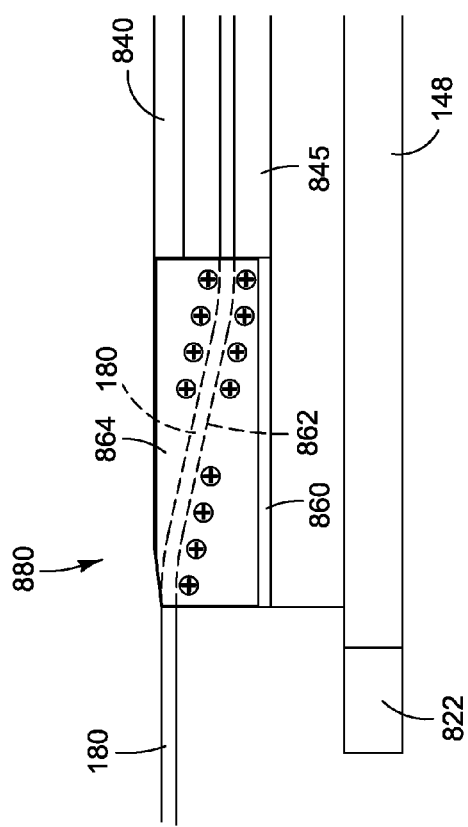
FIG. 34 is a side view of guide cable routing at an end of a plate transfer mechanism.
Figure 36:
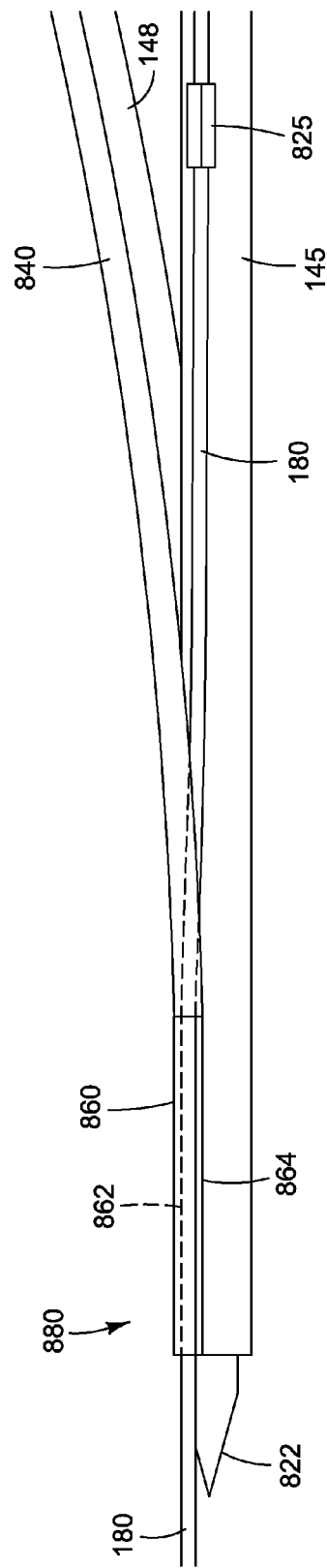
FIG. 36 depicts in a plan view the transition region of a plate transfer mechanism.
Figure 37:
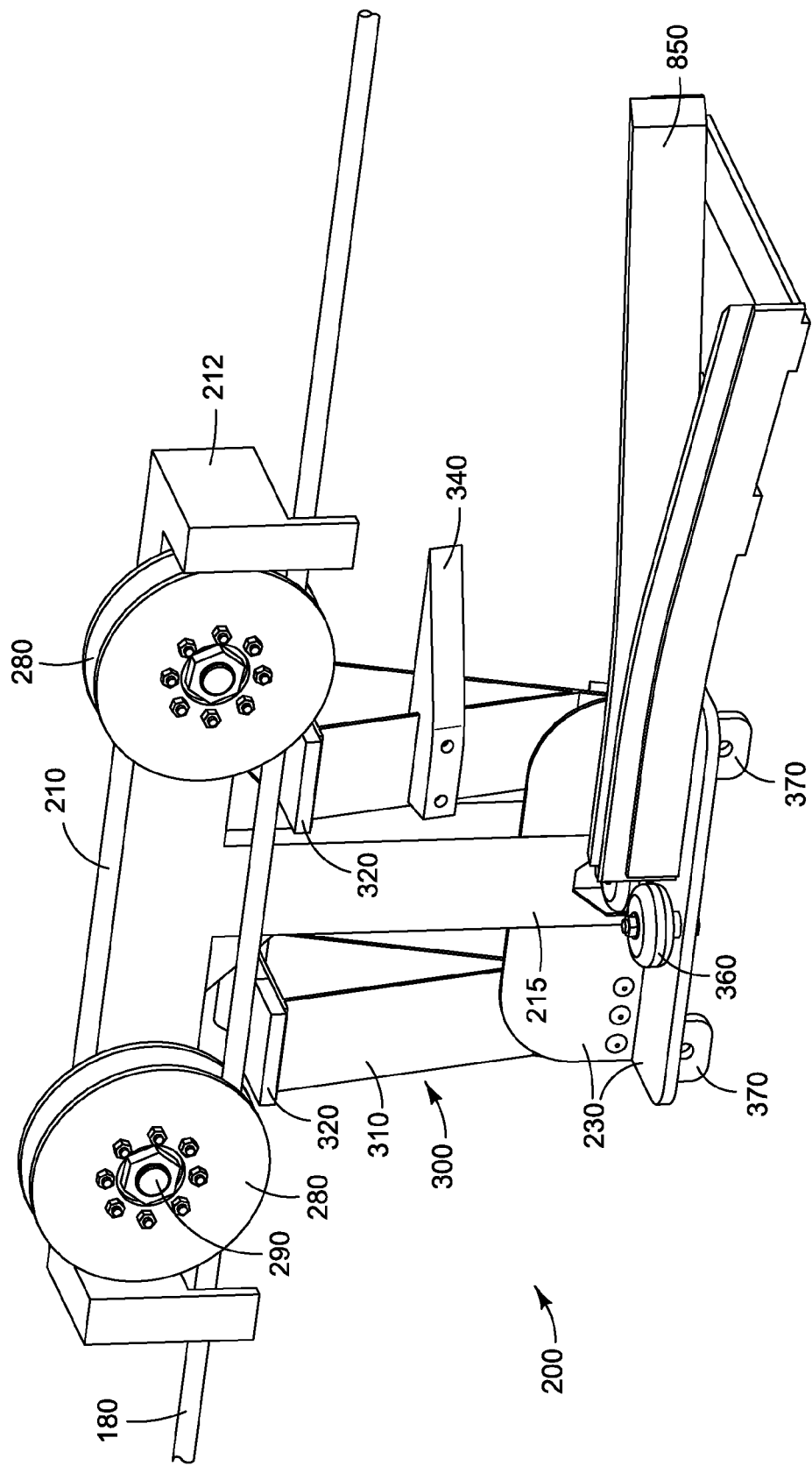
FIG. 37 shows a perspective view of the open side of a trolley in an alternate embodiment when supported on a cable.
Figure 38:
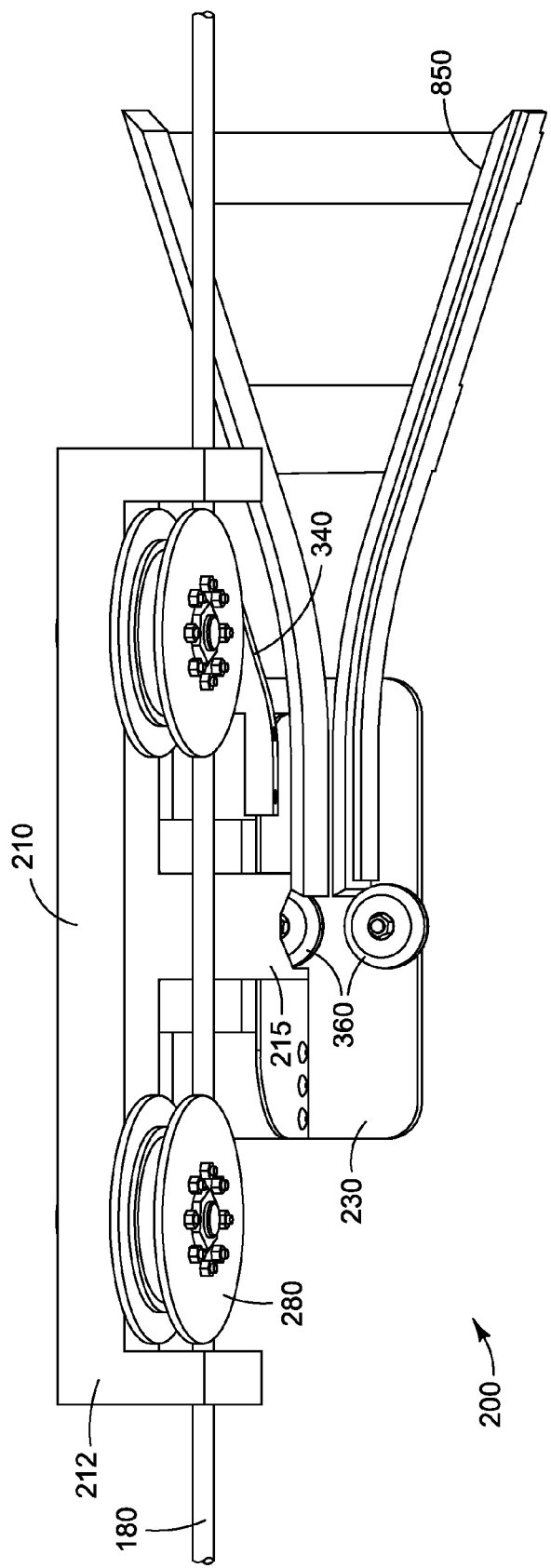
FIG. 38 is a perspective view of the top of the open side of an alternate embodiment of a trolley.
Figure 39:
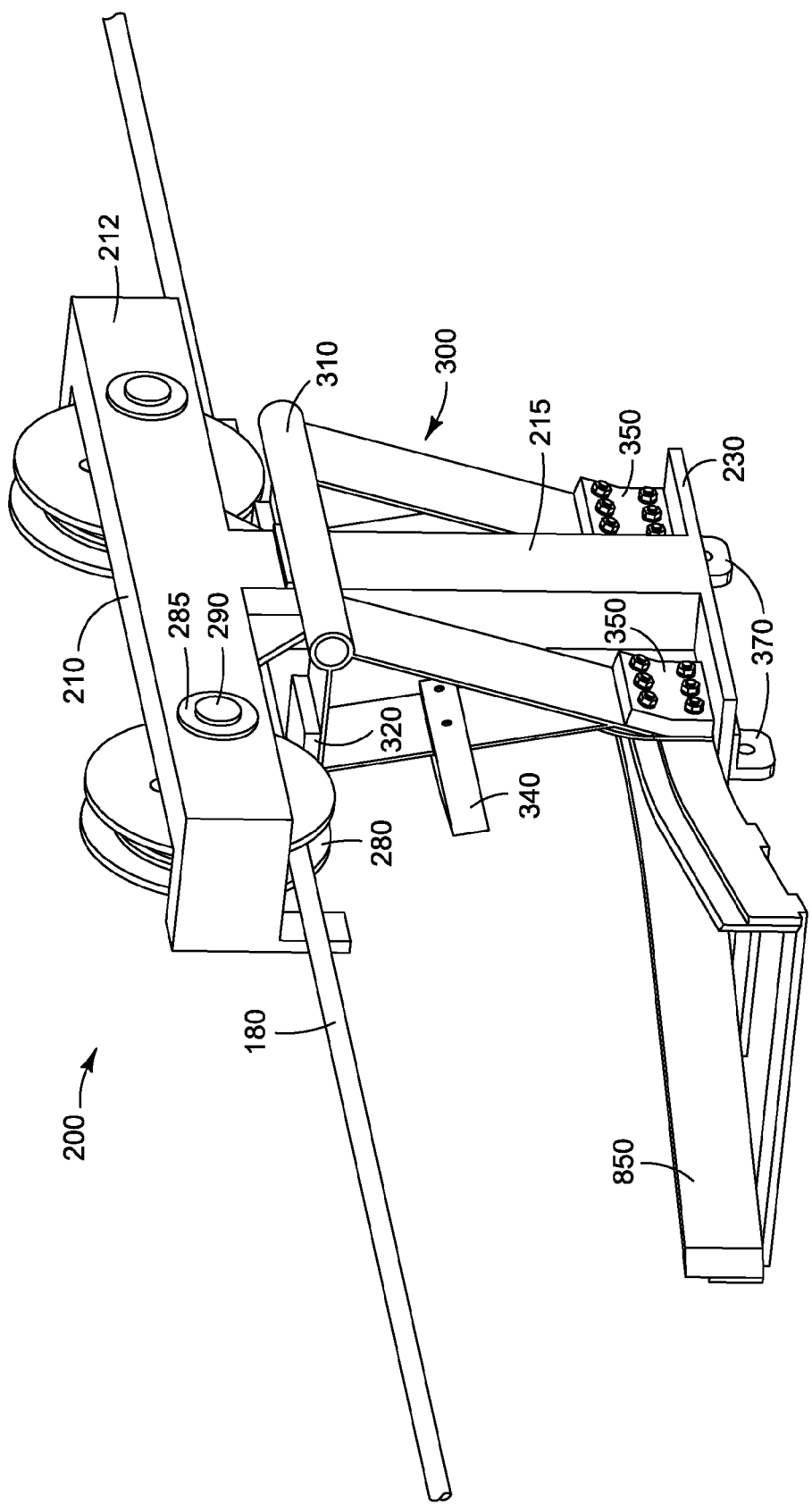
FIG. 39 shows a perspective view of the closed side of an alternate embodiment of a trolley.
Figure 40:
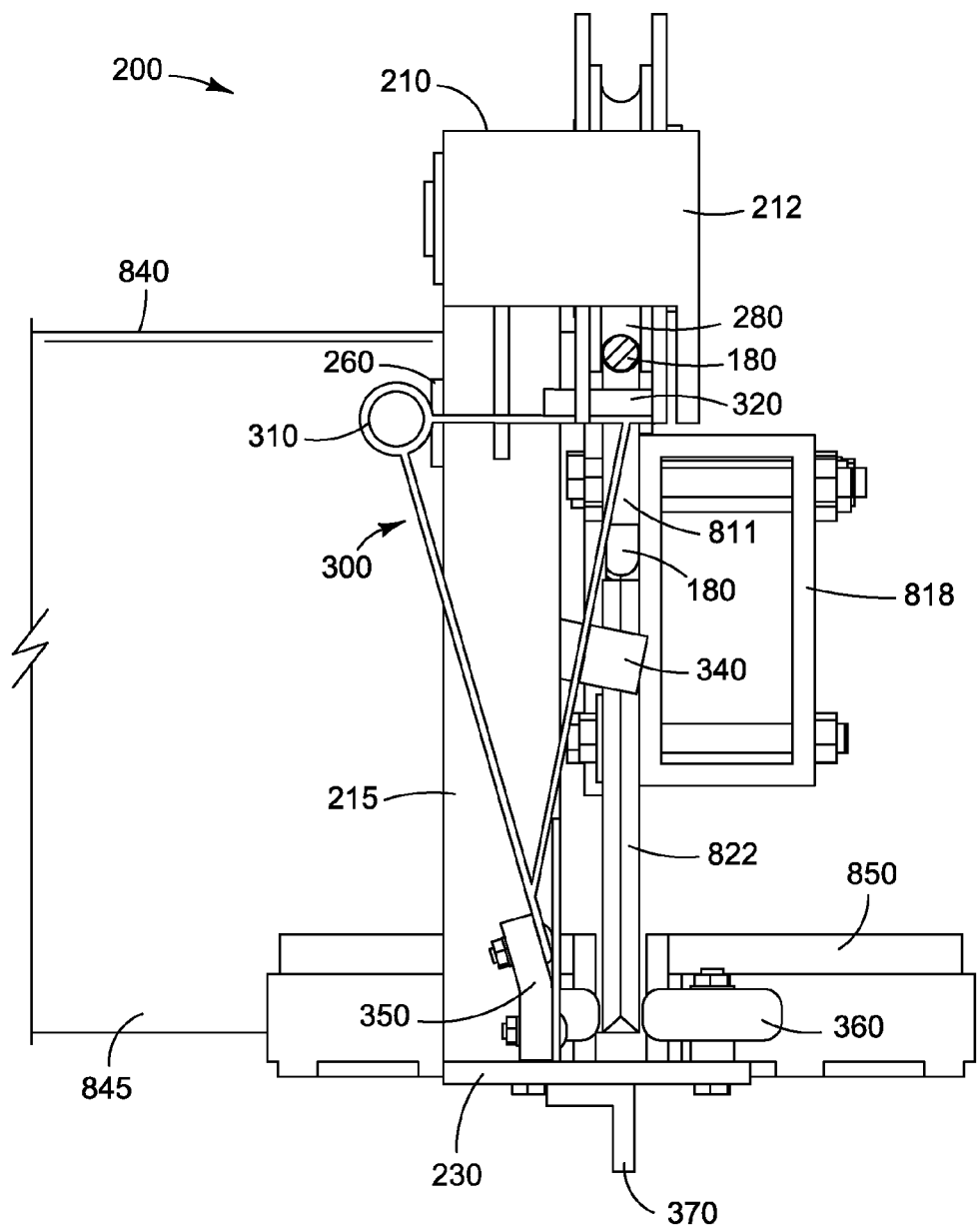
FIG. 40 is a sectioned end view of the trolley of FIG. 39 showing a derailment safeguard device in its closed and locked position.
Figure 41:
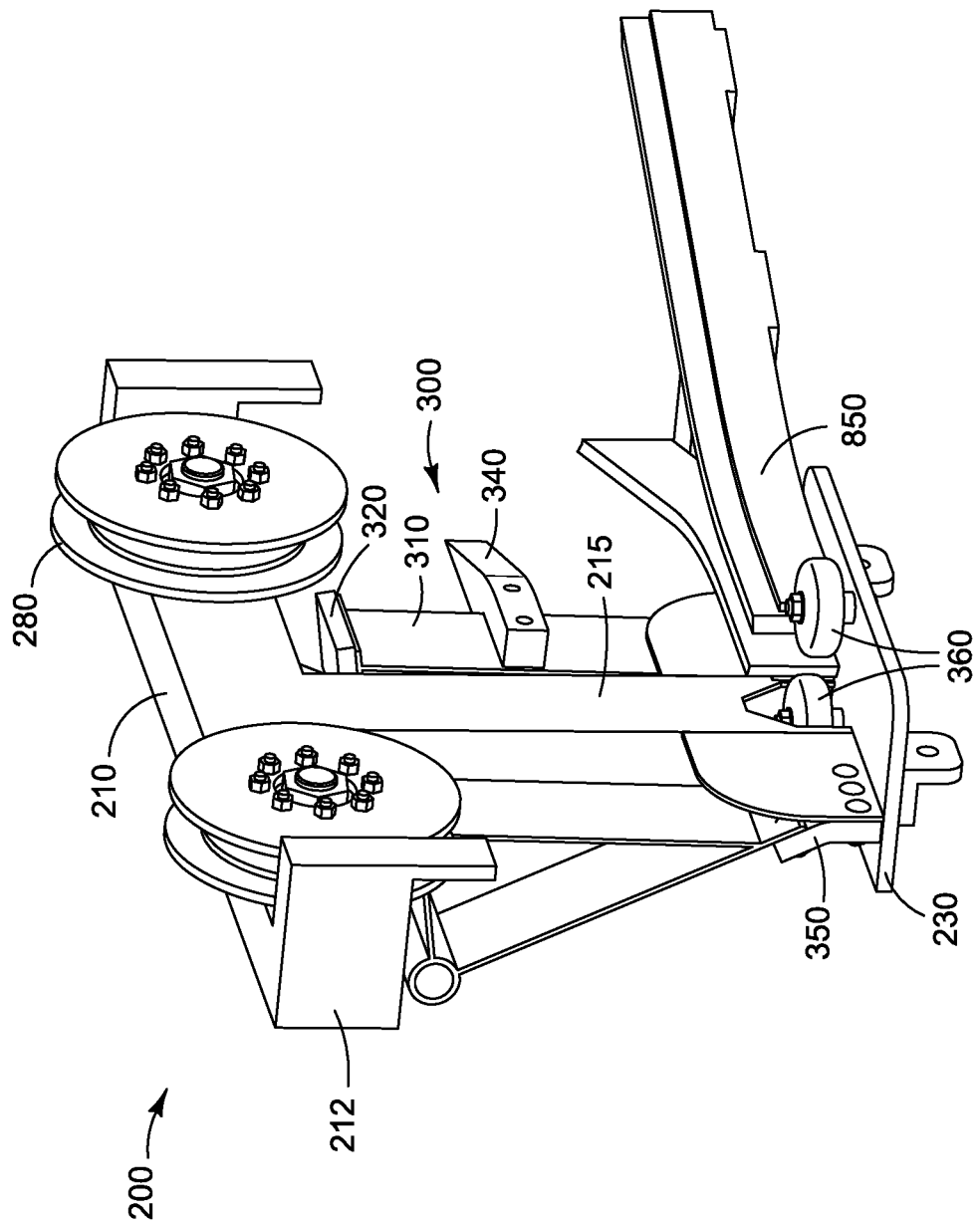
FIG. 41 is a perspective view of the trolley of FIG. 40 with a derailment safeguard device in its open, unlocked position.
Figure 42:
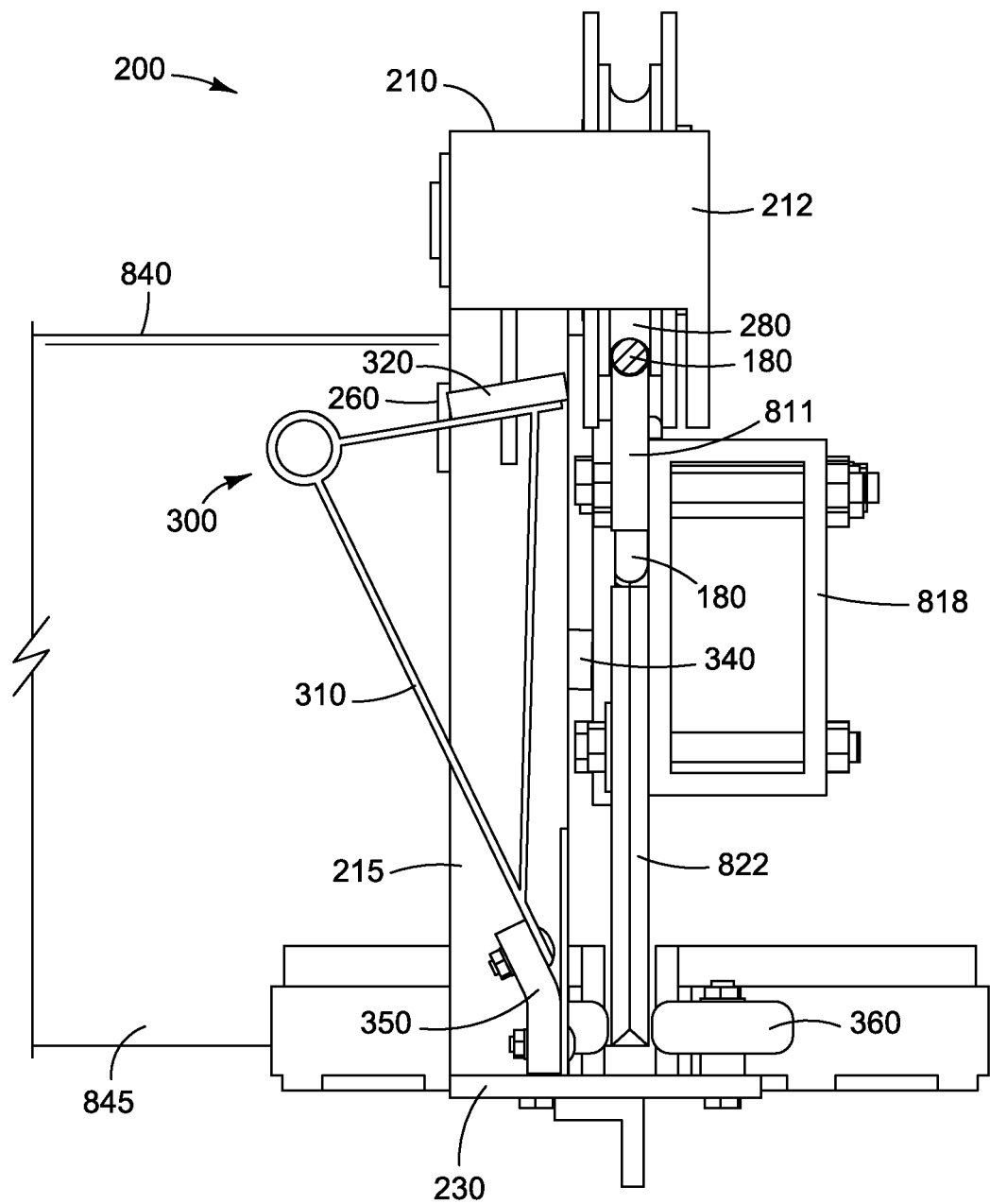
FIG. 42 is a sectioned end view of the trolley of FIG. 41 showing a derailment safeguard device in its open, unlocked position.

For an outside transfer mechanism 810, guide cable 180 is located into cable guide groove 862 by guide cable clamp plate 864 and its associated fasteners as shown in the details of FIGS. 34-36. In this situation the guide cable 180 remains under tension. It is routed by cable support clamps 825 out of the way of the trolley path and then tied to a support tower 120. FIG. 31 shows the detail within such a transition zone 880.

An alternate construction, referred to here as a cable deflection plate transition, is shown throughout FIGS. 28-36. In a plate transition, guide cable 180 is routed by guide cable clamp plate 864 and its associated fasteners into cable guide groove 862 as shown in the details of FIGS. 34-36. A trolley passing through the transition zone 880 is lifted off of the guide cable 180 onto guide track 840 to negotiate the curve and then set back onto the cable at the other end of the transfer mechanism.

Trolley Enhancements

A multi-segmented system has been described that enables a trolley to travel along a multi-vectored zip-line path. Such a system leaves open the possibility of many features that previously have been inaccessible due to the constraints of previous zip-line systems. Independent of whether a zip-line is single or multi-vectored, the presently described system includes many other features related to guide cables and to trolleys and their payloads. Some of those enabled features will now be discussed.

Figure 49:
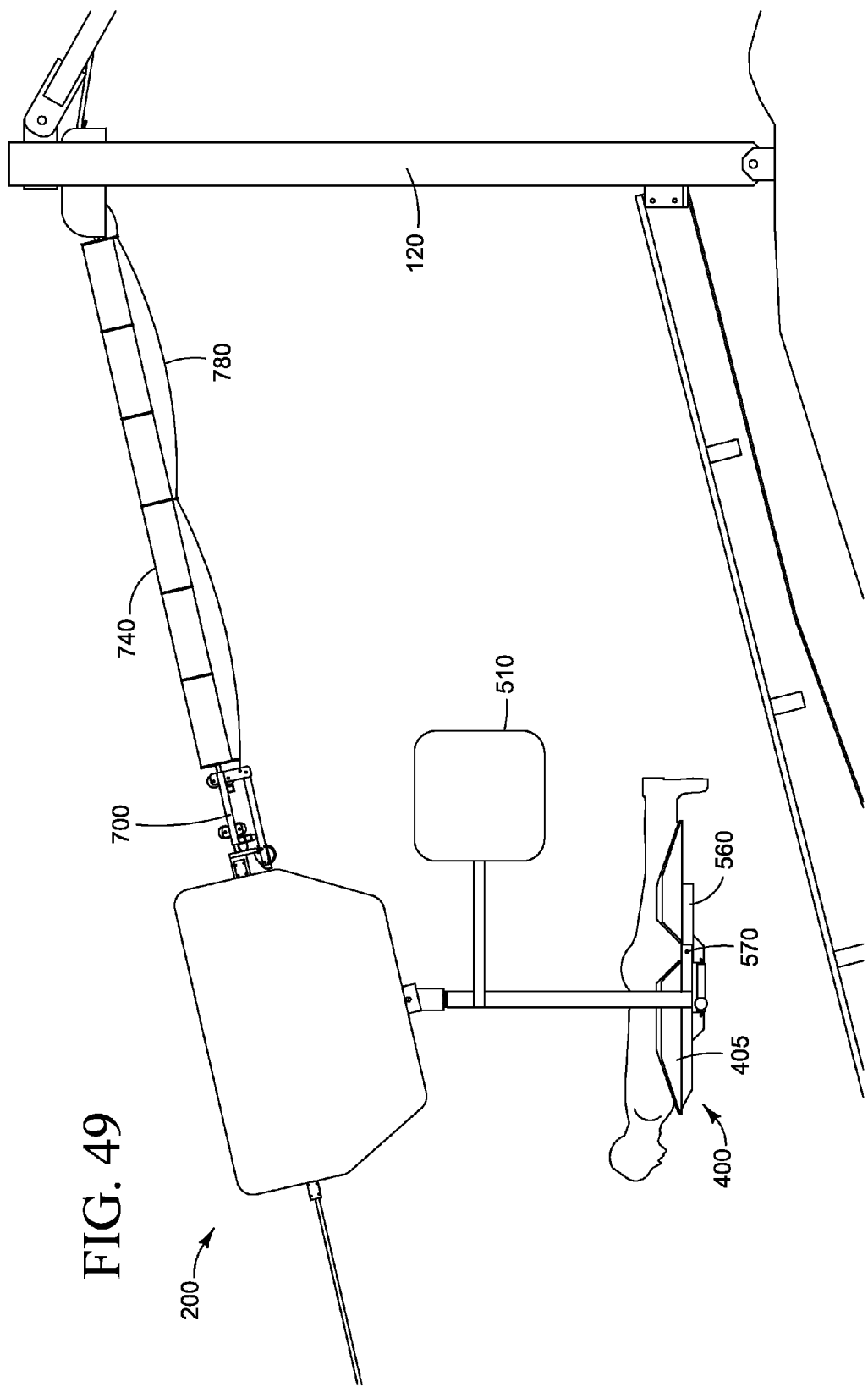
FIG. 49 is an elevation view of a trolley carrying a passenger as payload as it begins its descent from a catch trolley.
Figure 50:
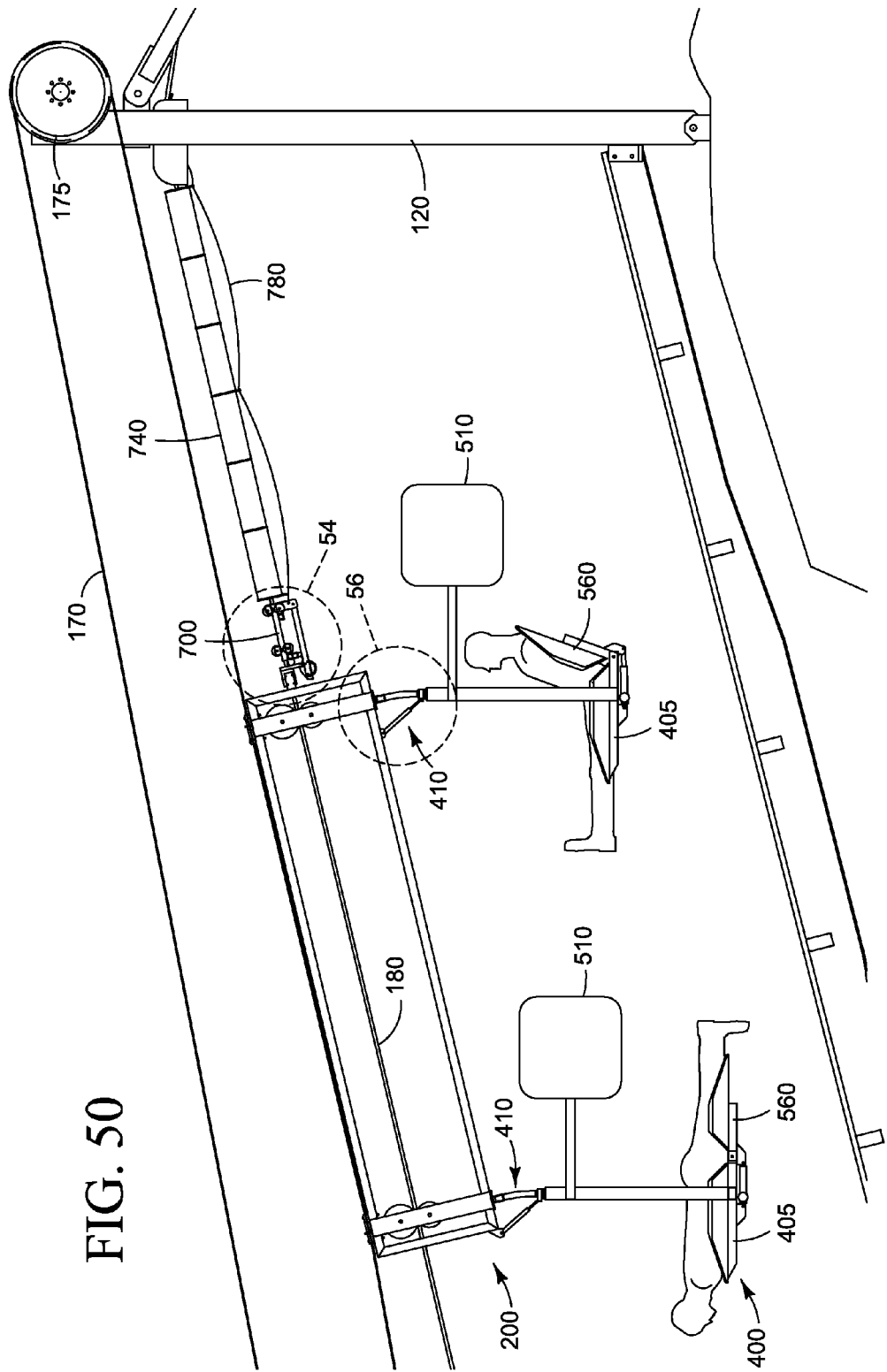
FIG. 50 illustrates a two-passenger in-line trolley in line with a catch trolley.

While the basic zip-line is gravity-powered, as shown in FIG. 49 and others, components of the presently described system are also readily adaptable to a bullwheel-driven system as shown in FIG. 50. In such a system, guide cable 180 may be used in any of its modes as described throughout this document, especially for unrestricted gravity-powered downhill excursions. The addition of bullwheel 175 and drive, or haul, cable 170 allows the trolley 200 to be returned to its starting position, even if that requires that it be moved against gravity. Since the weight of the trolley is fully supported by the guide cable 180, the drive cable 170 needs to be sized only to carry its own weight plus some relatively small load. In most applications, a cable having a diameter of ¼- to 5/16-inch is sufficient to overcome gravity to pull the trolley through a trough, or low spot, due to sag midway through a cable span.

A return trip may be facilitated by coupling the trolley 200 to a haul cable 170 through a secure clamp in which case the trolley 200 may be driven in both directions by the haul cable 170. Alternately, where there is sufficient drop in elevation from one end of the guide cable 180 to the other, the trolley 200 may freely make its downhill traverse under gravity power without any connection to, or wear of, the haul cable 170. Latching a releasable clamp to connect the trolley 200 to the haul cable 170 then affords return of the trolley 200 to the uphill end of the run. Relocation of a trolley 200 in an unloaded state is useful for zip-lines that operate to carry payloads in only one direction. In amusement applications it may be desirable to provide a passenger with a return trip whether for passenger convenience or to reduce the number of operators on the line.

To provide the ability to fly like a bird, the rider may be fitted with a special pair of gloves. These gloves extend the surface area of the rider's hands into a shape that may appear similar to a ping-pong paddle. Manipulation of the gloves by a person riding with their arms extended in the relative wind can cause the platform to rotate, or even oscillate, in any dimension, depending upon the means of attachment which will be described shortly.

A rudder assembly 510 attached to the passenger support structure 400 serves to keep the rider facing into the relative wind caused by a moving trolley. The guidance provided by the rudder assembly 510 is relatively soft and giving at lower speeds but becomes more firm and stiffer at higher speeds adding appropriate control to stabilize the platform. This is especially important when traveling at higher speeds of 35 to 55 mph or more as it limits variations about a vertical axis without overly restricting the rider's freedom of motion about either horizontal or vertical axes. When supported by a bidirectional trolley, the rudder 510 alone is effective to force an automatic reversal of the passenger platform 400 simply due to the wind generated on the return trip, even at relatively low speeds. This action keeps the rider facing into the wind without unduly restricting the rider from creating desirable self-controlled banking or fluttering motions. One embodiment uses a spring-loaded rudder assembly 510 to stabilize the platform so as to maintain a yaw angle within 40-degrees of the direction of travel.

It is to be noted that the preferred embodiment of the passenger platform 405 in the presently described system is capable of supporting a passenger in either an extended horizontal position or a seated position as depicted in FIGS. 49 and 50. In the horizontal configuration a person will generally travel in a prone position facing the ground below with their head forward in the direction of travel, though other orientations are enabled as well. The platform or flying seat 405 is designed to provide suitable back support for a person riding an upright seated position with feet forward and to provide proper leg support when riding in a horizontal orientation.

In one embodiment (shown in FIG. 50 with detail in FIG. 56) the passenger platform 400 is supported from the trolley 200 by a flexible vertical support structure comprising material similar to a steel-reinforced rubber hose 435. A collar 445 near the base of the hollow core vertical support member 435 provides a mounting point for a shock absorber 440. This provides a stiff yet flexible medium to support the passenger platform 400. It also accommodates damped pivoting motion in the fore/aft direction. Such a platform support joint can be applied to a single seat or to two seats carried by a single trolley, as shown in FIG. 50, where the seats are mounted in-line with each platform retaining the ability to swing from side to side independent of the other. The shock absorber dampens higher frequency perturbations for each individual passenger.

Figure 51:
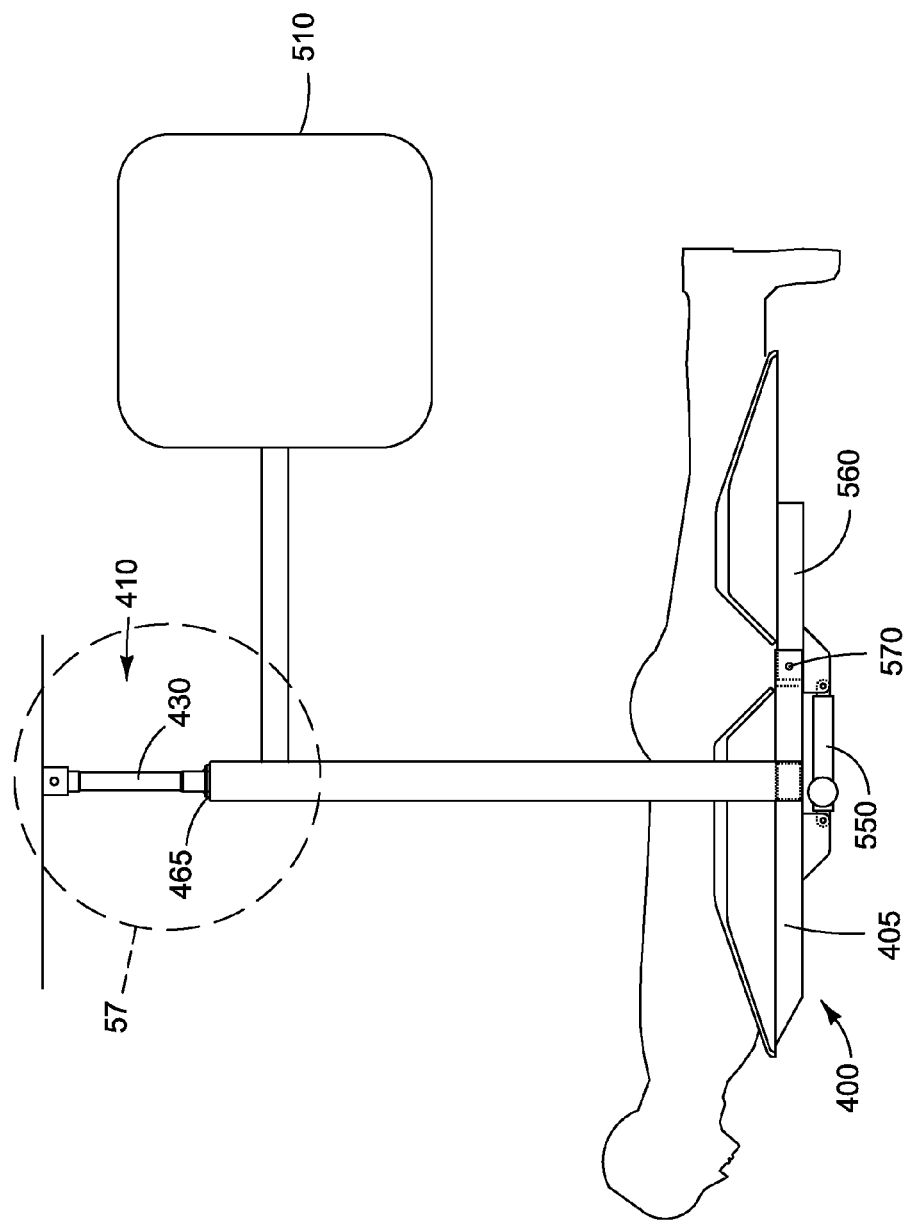
FIG. 51 shows details of a flexible joint for a payload trolley.
Figure 57:
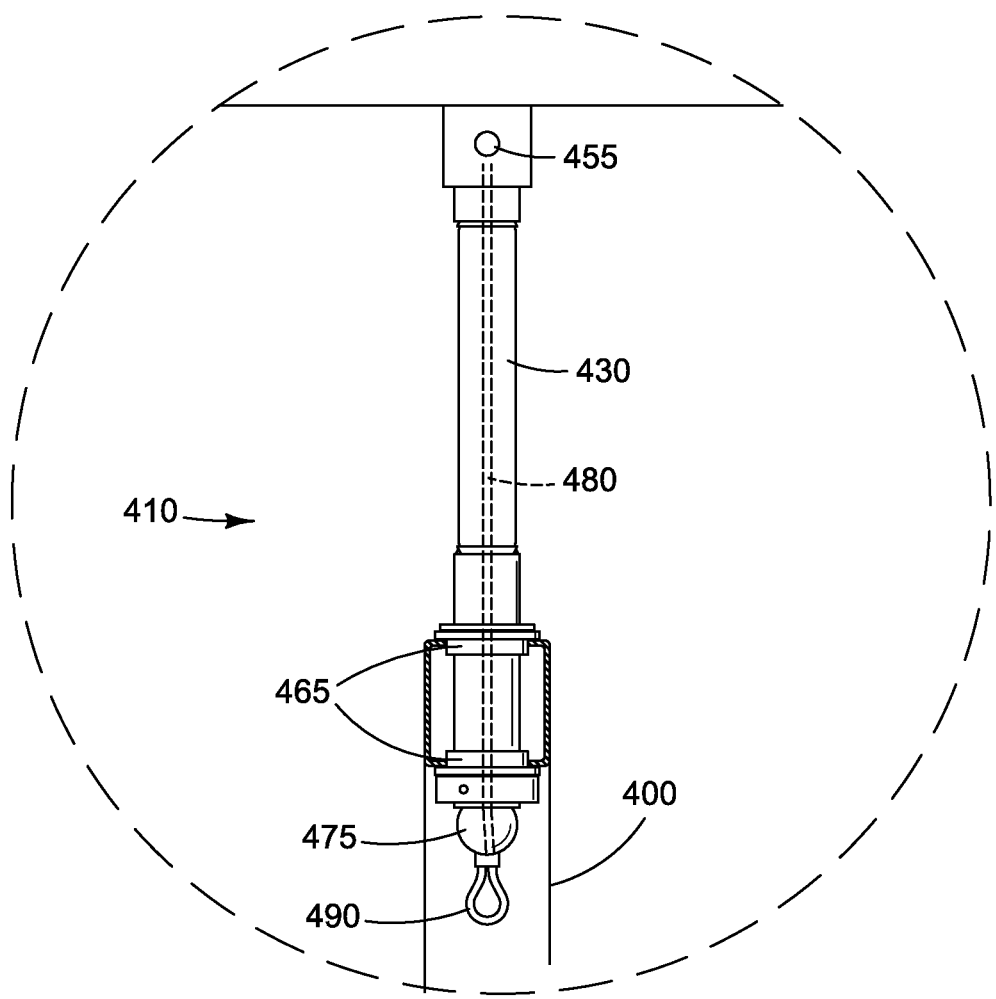
FIG. 57 shows a close-up side view of a rigid single-axis support joint with a pivot attaching a payload to a trolley as shown in FIG. 51.
Figure 58:
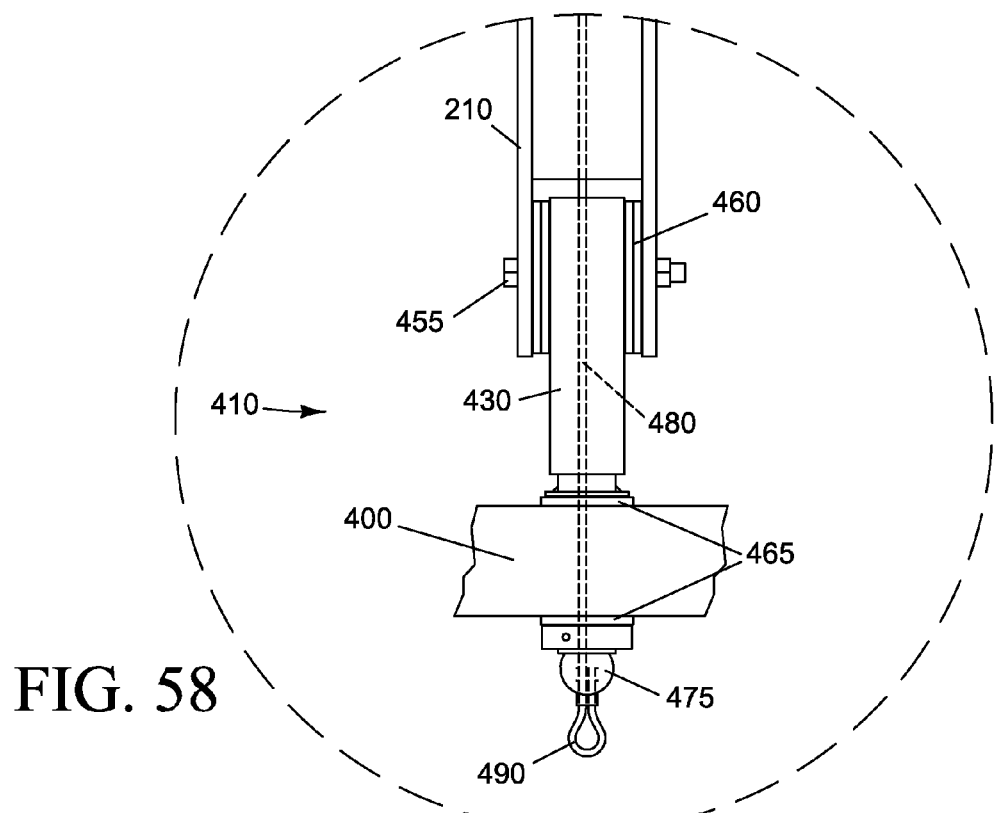
FIG. 58 is a close-up end view of the single-axis platform support joint of FIG. 53 showing the pivot with added friction.
Figure 59:
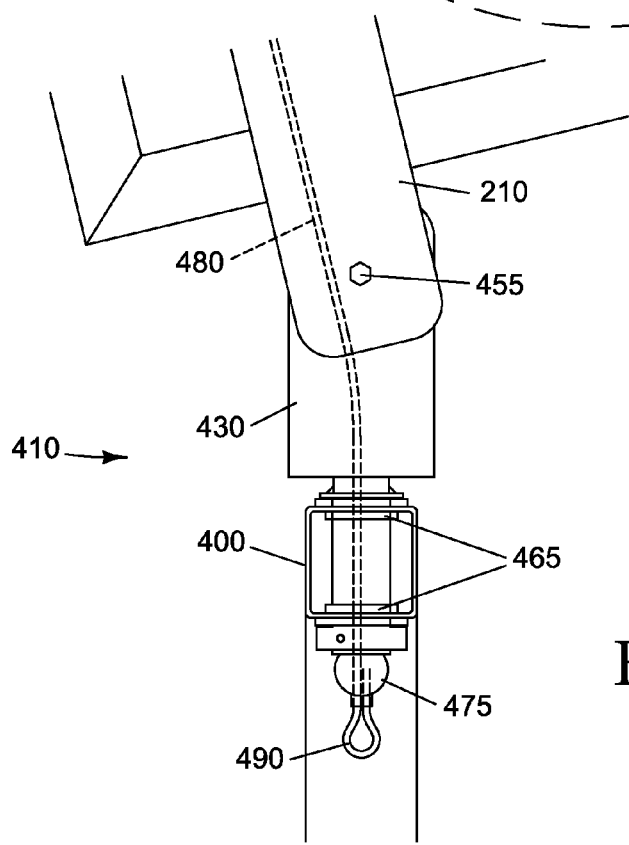
FIG. 59 is a side view of the single-axis platform support joint of FIG. 58.

An alternate suspension is shown in FIG. 51 with details in FIG. 57. In this embodiment the platform support is provided by a rigid member 430 having a hollow core, such as a metal tube or pipe. Low-friction thrust bearings 465 allow potentially for a full 360-degree rotation about the vertical axis of the rider's platform 405. Friction pads 460 seen in FIG. 58 dampen motion to prevent vibration and oscillations in the fore/aft direction.

Figure 56:
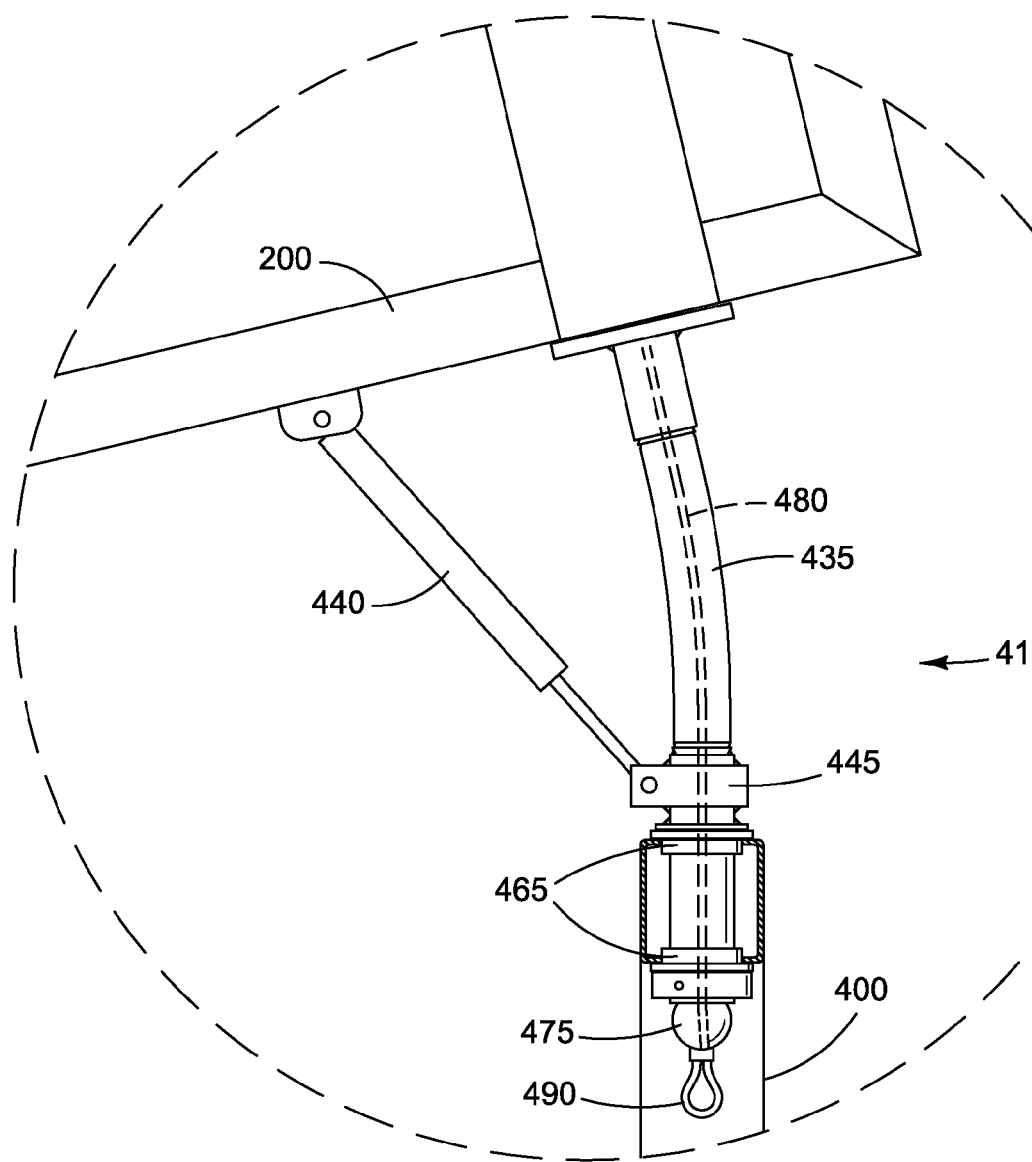
FIG. 56 is a close-up side view of a means of attaching a payload to a trolley using a flexible multi-axis support joint as in FIG. 50.

Whether the platform support is flexible as in FIG. 56 or rigid as in FIG. 57, a safety cable 480 passes through the hollow core support member 435 or 430 back to the trolley 200 proper and is terminated with a cable stop ball 475. A safety loop 490 is provided for attachment of a passenger safety lanyard.

Figure 53:
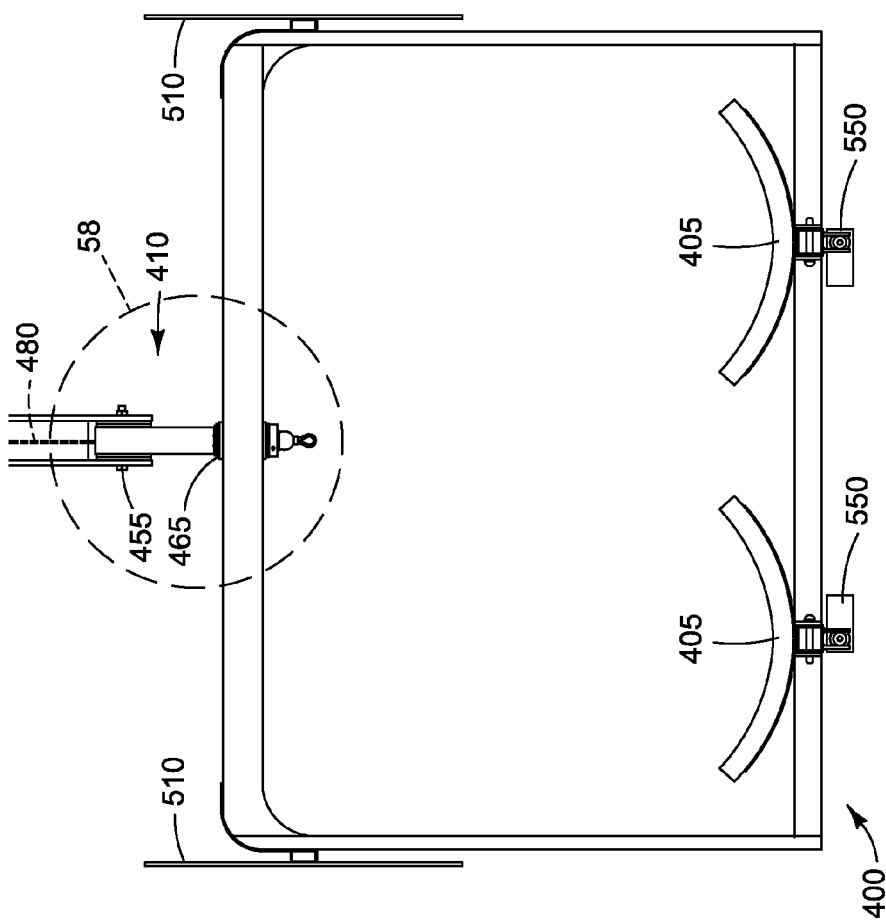
FIG. 53 illustrates an end view of a trolley configured for carrying two passengers side-by-side with a single-axis platform support joint.
Figure 52:
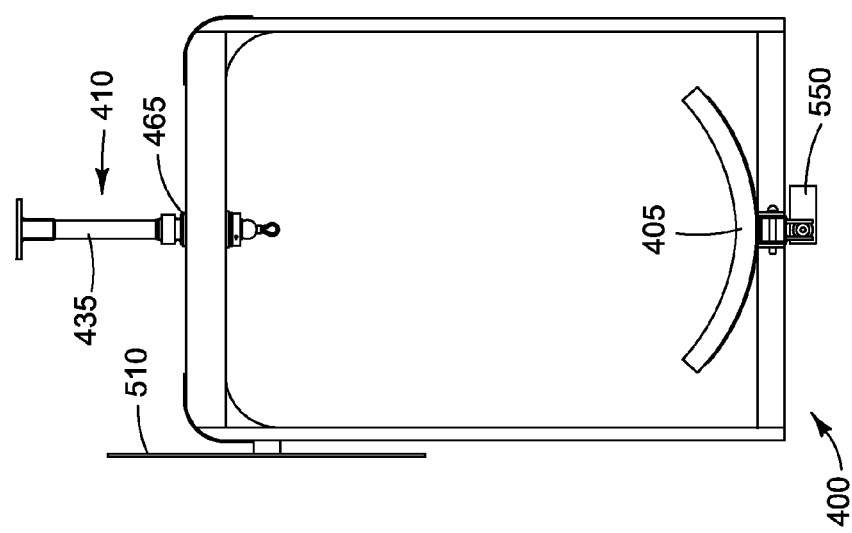
FIG. 52 illustrates in an end view a trolley configuration for carrying a single passenger.

The end view of FIG. 52 is characteristic of the basic one passenger platform (of FIG. 49 and others) when viewed from the rear. Adding a second passenger platform in line with the first, as in the elevation of FIG. 50, results in essentially the same view from the rear. Another embodiment of the payload 400 is shown in FIG. 53 where two passenger platforms 405 are situated side-by-side. It will be noted that in all cases each passenger has their own seat position adjuster 550.

Another type of trolley is the catch trolley 700 shown in FIGS. 49 and 50. The close-up view of FIG. 54 reveals the guide wheels 720 that ride on guide cable 180 to qualify this assembly as a trolley. The purpose of the catch trolley 700 is twofold. First, it serves to hold a passenger trolley in place near a terminal support tower 120 while it is being loaded or unloaded or serviced. Second, the cushion blocks 740 of the catch trolley 700 prevent damaging collisions between trolleys and supports. A damping cord 780, which may take the form of a bungee or other elastic cord, is attached to the support tower 120 and to the far end of the row of cushion blocks 740, perhaps with intermediate tie points as well, to prevent significant separation of the blocks as they rebound in response to impact from another incoming trolley.

Figure 54:
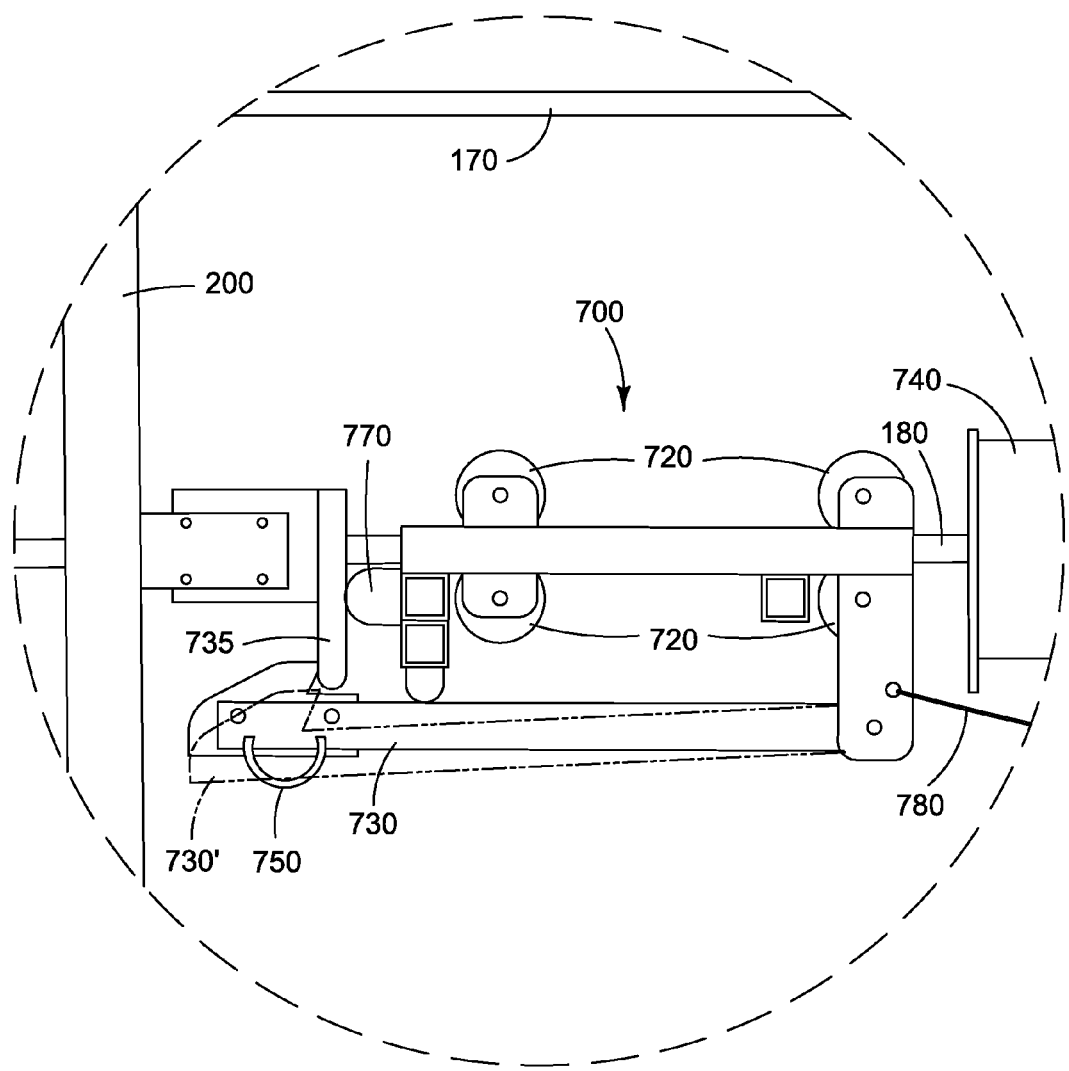
FIG. 54 shows a close-up view of a payload trolley that has been captured by a catch trolley as called out from FIG. 50.

The close-up view of FIG. 54 shows spring-loaded hook assembly 730 in a latched position to capture a latch hold mechanism 735 which is attached to the end of a passenger trolley 200. Rubber bumper 770 serves to absorb some of the initial shock as the passenger trolley 200 approaches the catch trolley 700.

Figure 55:
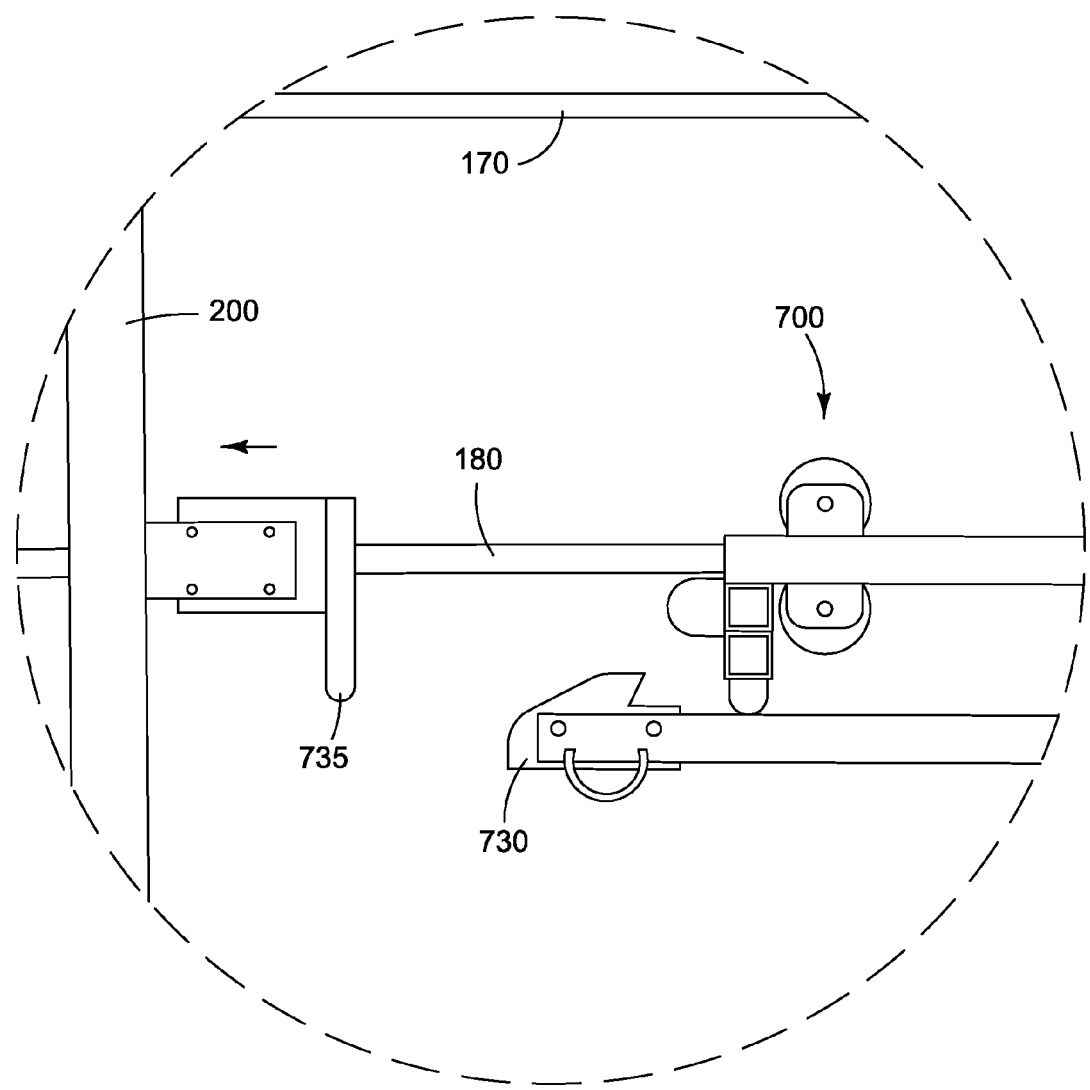
FIG. 55 is a close-up of a payload trolley that has been released and is moving away from a catch trolley.

A loop 750 is activated as a release pull, moving spring-loaded hook assembly 730 to its alternate position 730' disengaging it from latch hold mechanism 735. When released, as shown in FIG. 55, the latch hold mechanism 735 allows trolley 200 to move away from catch trolley 700.

Round Trip on Single Cable

Adding a drive motor to the trolley 200 enables a rider to execute a round-trip from the top of a zip-line run to the bottom, and back up to the top with the initial downhill run being gravity-powered, and the uphill return trip being enabled by the drive motor. Alternately, where it is more convenient to begin the journey at the bottom of the hill, the rider may be carried uphill initially and return to the starting point under gravity power. In the case of terrain that is relatively flat, or where for other reasons the two ends of the cable segment are at similar altitudes, some form of drive system may be used to move the trolley in both directions. Each of these requires some changes to the basic system described previously. In order to accommodate bi-directional travel, some mechanical additions must be made to the system. First, alignment guide rollers 270 are installed on the trailing end of the trolley frame 210 as well as on the leading edge, as was previously shown in FIG. 6. Second, trolley alignment funnel guides 850 are installed at both ends of each of the transfer mechanisms 800 or 810, and referenced in FIGS. 13 and 17.

To drive the trolley 200 for its return trip uphill requires a motor and a power source. Multiple options are available here, including, gas engines, electric motors, and high pressure compressed air driven motors. To avoid noise pollution, and for reliability, an electric drive system may be chosen over a gasoline engine. Power to an electric motor may be provided by either an electrified cable or some form of battery pack. In the preferred embodiment, an electric motor drives a trolley which carries a battery pack as part of its payload. To help to maintain charge on the battery pack, a regenerative braking system is used. On the downhill run through the zip-line course such a braking system, operating under control of an onboard computer, restricts the speed of the trolley within suitable bounds for safety purposes. Such speed control also assists in negotiating transitions (800, 810, 900) between cable segments. When carefully monitored, a regenerative braking system may recover sufficient power during the downhill descents to operate a battery-powered system for several hours without need for any external recharge. By returning the user back uphill to conclude a round trip at the starting point, unlike previous systems which were one-way downhill only, the presently described system offers the advantage that only one end of the zip-line ride needs to be monitored by a full-time attendant.

Figure 60:
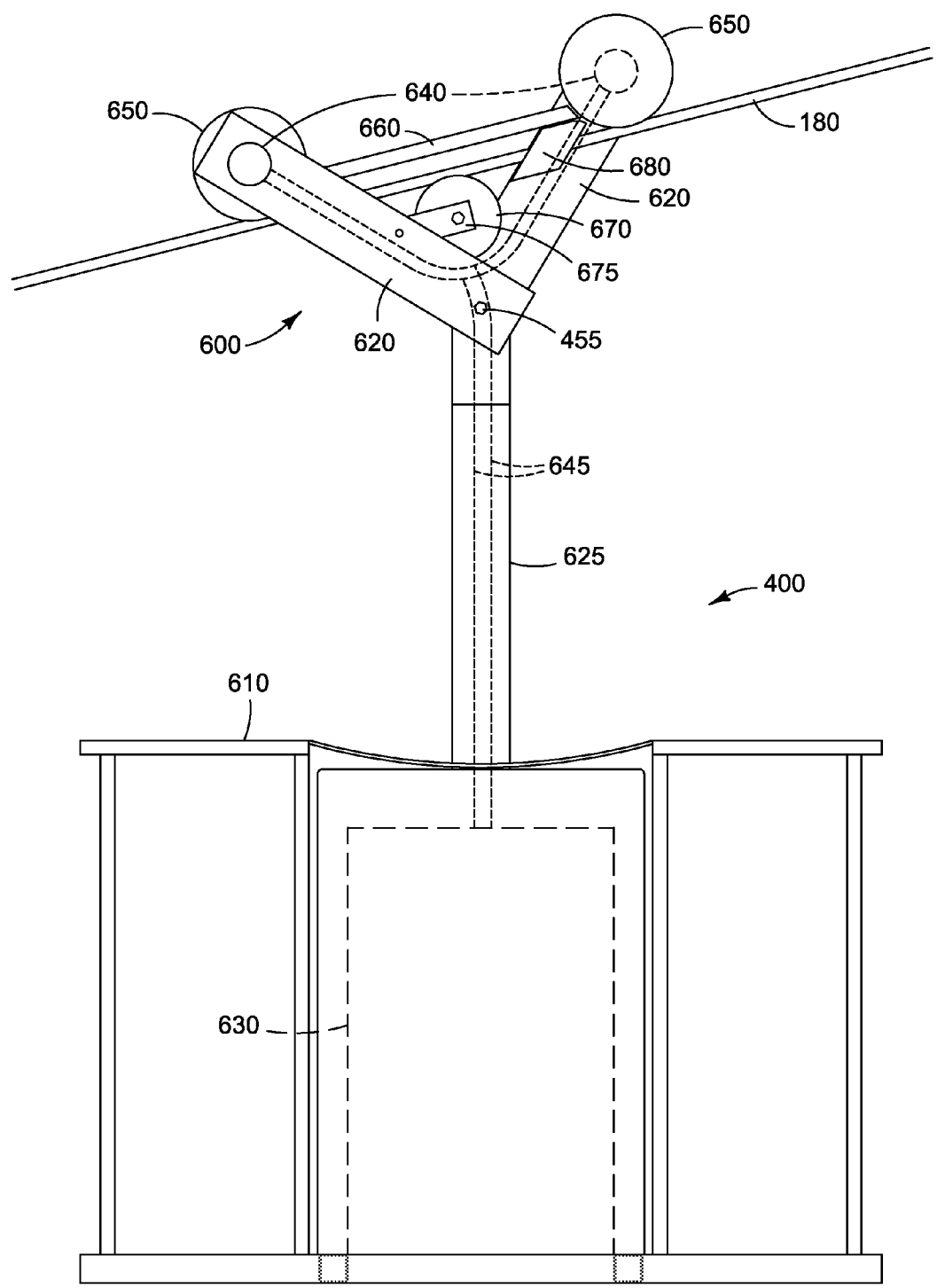
FIG. 60 is a side view of a means of powering a trolley.
Figure 61:
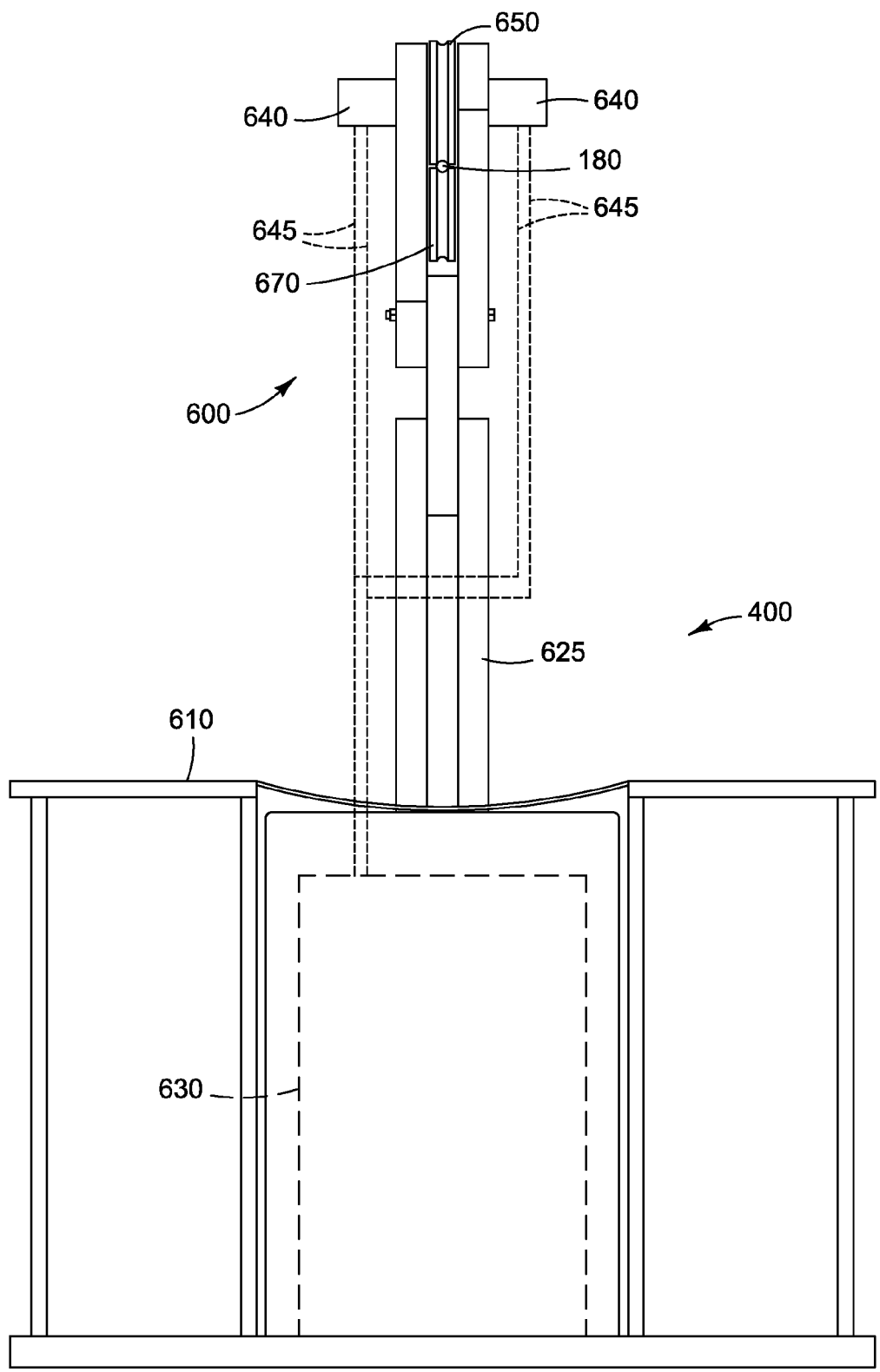
FIG. 61 is an end view of a means of powering a trolley.

One embodiment of a powered trolley 600 is shown in the side view of FIG. 60 and the end view of FIG. 61. A pair of drive wheels 650 placed atop a guide cable 180 support a frame member 620 to draw tension wheel support bracket 675 into place so as to maintain adjustable tension wheel 670 against the underside of the guide cable 180. An alternate version of a derailment prevention guard 680 keeps the powered trolley 600 from jumping off of the cable in case tension wheel 670 loses tension.

Drive motors 640 may be electric or hydraulic. In the case of electric motors power is sourced through power lines 645 which are routed through frame member 620 from the engine power supply compartment 630 within the gondola 610. For a hydraulic system, hydraulic lines 645 feed pressurized hydraulic fluid from the engine compartment 630 to the motors 640. Control systems for either type of drive may be contained within the engine compartment 630 or distributed throughout the frame member 620 as appropriate. Such control systems are frequently computerized and may include regenerative braking, speed control, and control of the position and orientation of the seat, among other features. Such a powered trolley may be used for either passenger payloads or as a maintenance trolley for service of the zip-line system or retrieval or relocation of other trolleys.

Figure 62:
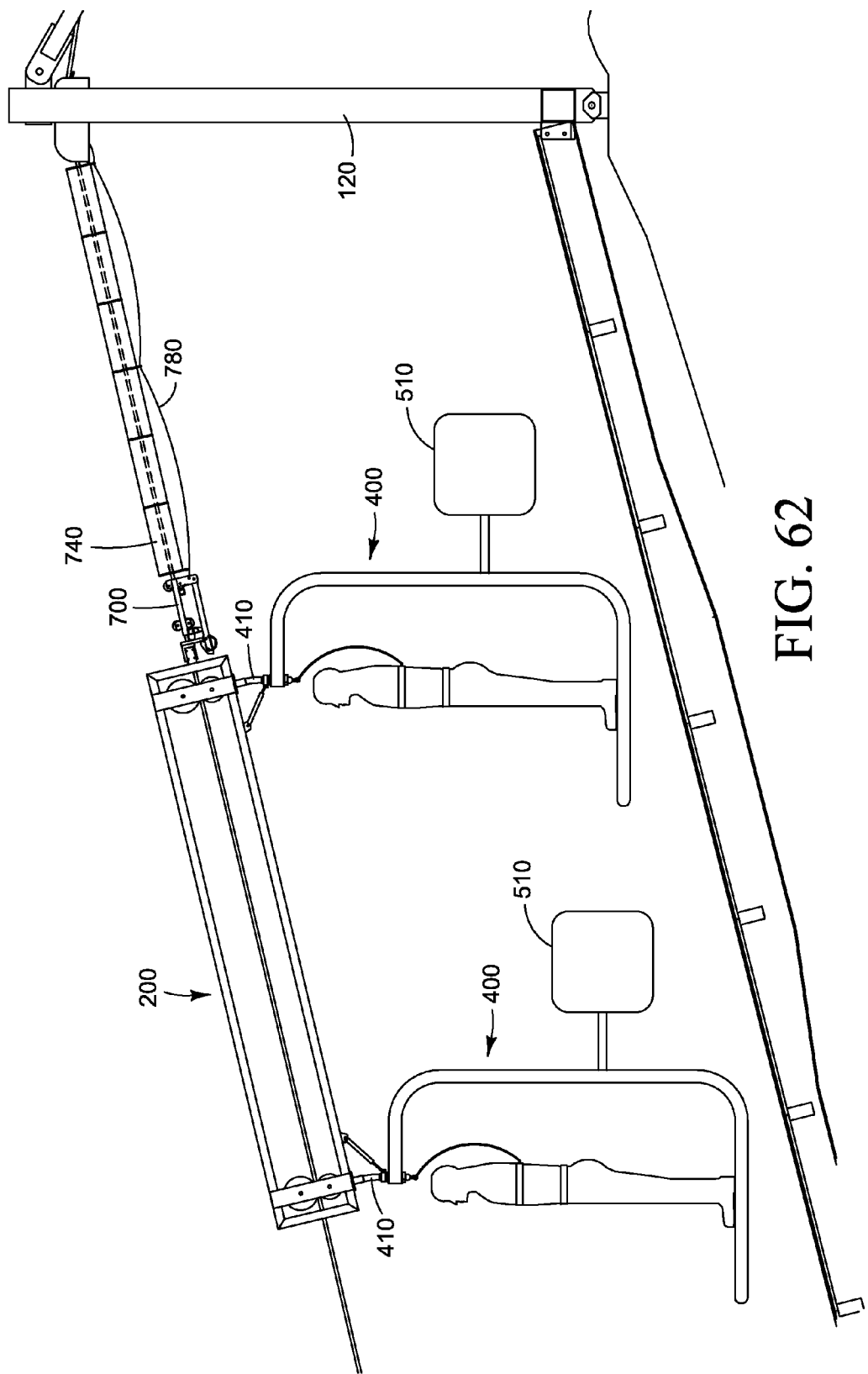
FIG. 62 shows a two-passenger trolley with an alternate platform support joint and yaw control.

In addition to the platforms and orientations shown in previous drawings, FIG. 62 (with FIG. 63 as a rear view) shows an alternative platform that allows a rider to "surf" in a more or less upright, standing position. FIG. 62 shows a rudder assembly 510 to dampen and restrict a surfer from unsafe excessive motion. In all cases riders are tethered from a body harness to a passenger safety lanyard attachment 490.

In FIG. 64 is shown the potential for the addition of parallel cables. As depicted, two guide cables, one each at the right and left, are used for commercial purposes to carry passengers on platforms 405. In this case a haul cable 170 is driven by top-mounted powered bullwheels 175 as also seen in FIG. 50. To maximize its utility, the center payload 400 is likely to be a self-propelled gondola 610 powered either by a gas or electric motor for use as a rescue or maintenance trolley. Such a powered gondola may be manned or operated by remote control.

SUMMARY

A primary intent of the presently disclosed system is to enable Simulation of Human Flight over an Extended Multi-segmented Journey. To support this desire, provision is made for partial rotation of the platform under control of the user. Several components serve to support this feature as it enables the user to experience the sensation of flying like a bird.

In order to provide the user with sufficient freedom of motion, the platform has a special multi-faceted support joint which enables multi-axial movement in each dimension of pitch, roll, and yaw.

Various forms of trolley are capable of supporting users on platforms in any of several positions, including seated or lying face up, or the most often preferred face-down prone position. A computerized control allows for the platform to be rotated automatically by 180-degrees as it approaches the terminal at the far end of the cable in preparation for the user's head-first return trip. Even without computer control, a platform having an attached rudder 510 will automatically rotated 180-degrees when it catches the wind on a return trip. The platform may also be controlled to provide for landing at a 90-degree angle to the dock in order to provide increased clearance.

A computerized motor serves as part of a regenerative braking system that may be used to limit the downhill speed of the user. Any power recovered during the descent can be used to supplement that which is stored in the included battery pack to assist in driving the motor to carry the user back uphill to conclude a round trip at the starting point. Unlike previous systems which were one-way downhill only, the presently described system offers the advantage that only one end of the zip-line ride needs to be monitored by a full-time attendant. The carriage and its rider may be returned to the starting point even though that may be at a higher elevation. Additionally, a passive braking system serves to control the exit speed from a transfer mechanism independent of the incoming speed.

An enhanced system allows a zip-line course to provide an extended multi-vectored journey by using multiple concatenated segments. The equivalent of a single long zip-line may be created by terminating the end of one segment at or near the same anchored support point as the beginning of the next. With segments concatenated in this manner by use of the invented trolley transfer mechanism, there is no need for a rider to leave the cable; the entire course may be run non-stop, without the need for an attendant at intermediate points along the line. From the user's point of view this is a considerable advancement beyond previous single segment zip-lines.

From a construction and maintenance point of view there are also many advantages favoring the presently described system. A few of these are:

1. The cost of multiple shorter cable segments is considerably less than a single cable having the same equivalent length. This is due in part to the fact that a longer cable would require a larger diameter for a given load. Also, it is more difficult, even if possible, to produce and transport a very long cable of appropriate integrity.

2. Wear is limited by shorter segments so that a weak spot in a particular segment only requires replacement of that segment, not of the entire single long cable.

3. Since a portion of each end of each cable is hidden from view by being enclosed in the thick wall pipe or behind clamping plates, it is necessary to provide for a release of cable tension in order to inspect the entire length of the cable. This requirement is easily accommodated so that each cable segment may be inspected at all points along its length.

In addition to typical commercial amusement operations, the zip-line system described here may be used for cargo transport and inspections over remote or otherwise inaccessible areas, for instance for inspections of dams. The use of a bi-directional trolley allows either manned or remote control access to otherwise difficult locations. With its safety features and capability for operation with minimal attendants, the described system is effectively accessible to handicapped individuals who may desire the thrill of riding a zip-line.

It will be obvious to those having skill in the art that changes may be made to the details of the above-described embodiments without departing from the underlying principles of the invention. While described with respect to a preferred embodiment for trolleys on a multi-vectored zip-line system, there is no implication to restrict the present invention to preclude other implementations that will be apparent to those skilled in the related arts. It is easily recognized that the described zip-line system may be implemented with a variety of alternative subsystems serving the functions of those described here. Therefore, it is not intended that the presently described system be limited to the disclosed embodiments or to the specifically described details insofar as variations can be made within the spirit and scope of what is claimed.

What is claimed is:

1. A cable transport system comprising:
    a guide cable;
    a transfer mechanism, wherein the guide cable is fixedly attached to the transfer mechanism; and
    a trolley, wherein the trolley comprises
        a trolley frame, and
        one or more grooved wheels mounted to the trolley frame,
        the grooves of which engage and roll freely upon the guide cable and the transfer mechanism,
    and
    wherein the guide cable comprises two or more guide cable segments, each guide cable segment having a first support and a second support, and
    wherein each support is coupled respectively to a corresponding earth-based support structure, and
    wherein each support is a junction or a terminus, and
    wherein the transfer mechanism supports two guide cable segments or is supported by two guide cable segments at a point near the junction of the two guide cable segments.

2. The cable transport system of claim 1, wherein each transfer mechanism comprises:
    a guide track having an upper surface which supports the trolley at the grooved wheels, wherein the guide track is shaped into a curve;
    a guide track support structure that provides support for the guide track and maintains the curve of the guide track;
    a first guide cable deflector attached to a first guide cable at or near the end of a first guide cable segment to provide a smooth transition of the trolley from the first guide cable segment to an entry end of the guide track;
    a first guide cable support clamp which secures the first guide cable to prevent movement of the first guide cable relative to the transfer mechanism;
    a second guide cable deflector attached to a second guide cable at or near the end of a second guide cable segment to provide a smooth transition of the trolley from an exit end of the guide track to the second guide cable; and a second guide cable support clamp which secures the second guide cable to prevent movement of the second guide cable relative to the transfer mechanism.

3. The cable transport system of claim 2, wherein each transfer mechanism is one of
an inside transfer mechanism,
an outside transfer mechanism, or
a vertical transfer mechanism,
wherein for the inside transfer mechanism the curve of the guide track is about a vertical axis and the guide track support structure is interior to the curve, and
wherein for the outside transfer mechanism the curve of the guide track is about a vertical axis and the guide track support structure is exterior to the curve, and
wherein the curve of the guide track of the vertical transfer mechanism is about a horizontal axis.

4. The cable transport system of claim 3, wherein the inside transfer mechanism further comprises: a bridge to transfer force from the guide track support structure to the corresponding earth-based support structure.

5. The cable transport system of claim 2, wherein the trolley further comprises:
a primary alignment guide mounted to the trolley frame,
wherein the primary alignment guide straddles a lower surface of the guide track when the grooved wheels engage the upper surface of the guide track,
whereby vertical and roll motions of the trolley are restricted to prevent disengagement of the grooved wheels from the guide track.

6. The cable transport system of claim 1, wherein near ends of two consecutive guide cable segments terminate at a common transfer mechanism.

7. The cable transport system of claim 1, wherein cable from a guide cable segment is continuous through the transfer mechanism with a next sequential guide cable segment.

8. The cable transport system of claim 1, further comprising:
an alignment mechanism interactive between the trolley and the transfer mechanism,
wherein the alignment mechanism comprises a funnel and a guide, and
wherein one of the funnel or the guide is integral to the trolley, and the other of the funnel or the guide is included in the transfer mechanism, and
wherein the funnel in combination with the guide comprises one or more of plates, pads, or rollers.

9. The cable transport system of claim 1, wherein the transfer mechanism is rigidly mounted to the corresponding earth-based support structure.

10. The cable transport system of claim 1, wherein the transfer mechanism is flexibly mounted to one or more corresponding earth-based support structures.

11. The cable transport system of claim 1, wherein the trolley further comprises:
a derailment safeguard mechanism mounted to the trolley frame which, when positioned to an engaged position, holds a protective pad so as to prevent the guide cable from escaping the grooves of the wheels.

12. The cable transport system of claim 11, wherein the derailment safeguard mechanism is repositioned to a disengaged position as the trolley encounters any transfer mechanism.

13. The cable transport system of claim 1, wherein the trolley further comprises:
a motor; and a drive wheel, wherein the drive wheel is frictionally coupled to the guide cable and driven by the motor to move the trolley along the guide cable.

14. The cable transport system of claim 13, wherein the motor controls speed and/or direction.

15. The cable transport system of claim 13, wherein the motor is remotely controllable.

16. The cable transport system of claim 13, wherein the trolley further comprises:
an on-board computer, wherein the motor is controlled by the on-board computer.

17. The cable transport system of claim 1, further comprising:
a harness fastened to the trolley to carry a rider.

18. The cable transport system of claim 1, wherein the trolley further comprises a platform to carry one or more riders in a seated, standing, prone or supine position.

19. The cable transport system of claim 18, wherein the platform is rotatable about a vertical axis.

20. The cable transport system of claim 1, further comprising a second trolley, wherein the second trolley comprises:
a motorized drive system to enable movement of the second trolley along the guide cable under self-contained power,
whereby retrieval or maintenance of a first trolley is facilitated.

21. The cable transport system of claim 1, wherein the trolley further comprises a platform rotatably mounted to the trolley frame.

22. The cable transport system of claim 21, wherein the platform enables one or more riders to ride in a seated, standing, prone or supine position.

23. The cable transport system of claim 21, wherein the platform further comprises a rudder to aerodynamically stabilize the platform.

24. The cable transport system of claim 21, wherein the platform is rotatable about a vertical axis.

25. A method of transfer of a cable-borne trolley from a first guide cable segment to a second guide cable segment, the method of transfer comprising:
moving the trolley along the first guide cable segment toward a transfer mechanism;
offloading the trolley from the first guide cable segment to engage a guide track at an entry of the transfer mechanism;
moving the trolley along the guide track of the transfer mechanism toward the second guide cable segment at an exit of the transfer mechanism;
disengaging the trolley from the guide track at the exit of the transfer mechanism; and
loading the trolley onto the second guide cable segment,
wherein the trolley maintains contact with at least one of the first or second guide cable segments or the guide track at all times, and
wherein each step of the transfer of the trolley is executed automatically as the trolley moves in a continuous motion without any significant variation in speed, and all actions depend solely on movement of the trolley and its position with respect to the transfer mechanism.

26. The method of claim 25, wherein the operation of offloading the trolley from the first guide cable segment comprises:
aligning the trolley at the entry of the transfer mechanism to stabilize the trolley within a range of safety as the trolley traverses the transfer mechanism; and wherein the operation of loading the trolley from the transfer mechanism onto the second guide cable segment comprises releasing the trolley at the exit of the transfer mechanism to allow the trolley to move without lateral restriction.

27. The method of claim 25, wherein the operation of moving the trolley along the transfer mechanism comprises restricting vertical and roll motions of the trolley with respect to the transfer mechanism, whereby the trolley is prevented from prematurely disengaging from the guide track.

28. The method of claim 25, wherein a safety device on the trolley is positioned to an engaged position in close proximity to the guide cable while the trolley is moving along the first guide cable segment toward the transfer mechanism;

the safety device is repositioned to a disengaged position away from the guide cable as the trolley approaches the entry of the transfer mechanism to avoid interference with the transfer mechanism;

the safety device remains in the disengaged position as the trolley traverses the transfer mechanism; and the safety device is returned to its engaged position as the trolley passes the exit of the transfer mechanism and is loaded onto the second guide cable segment.

\* \* \* \* \*